US010792661B2

(12) United States Patent
Lim et al.

(10) Patent No.: US 10,792,661 B2
(45) Date of Patent: Oct. 6, 2020

(54) ARRAY PLATES AND METHODS FOR MAKING AND USING SAME

(71) Applicant: CURIOX BIOSYSTEMS PTE LTD., Singapore (SG)

(72) Inventors: Eng Seng Lim, Singapore (SG); Siah Chong Cheong, Singapore (SG); Namyong Kim, Singapore (SG)

(73) Assignee: CURIOX BIOSYSTEMS PTE LTD., Singapore (SG)

( * ) Notice: Subject to any disclaimer, the term of this patent is extended or adjusted under 35 U.S.C. 154(b) by 0 days.

(21) Appl. No.: 15/950,580

(22) Filed: Apr. 11, 2018

(65) Prior Publication Data

US 2018/0229233 A1    Aug. 16, 2018

Related U.S. Application Data

(60) Division of application No. 14/452,172, filed on Aug. 5, 2014, now Pat. No. 9,950,323, which is a (Continued)

(51) Int. Cl.
*B01L 3/00* (2006.01)
*B29C 43/02* (2006.01)
*B29C 43/18* (2006.01)

(52) U.S. Cl.
CPC ........... *B01L 3/5085* (2013.01); *B01L 3/5088* (2013.01); *B29C 43/021* (2013.01); *B29C 43/18* (2013.01);
(Continued)

(58) Field of Classification Search
CPC .... B01L 3/5085; B01L 3/5088; B29C 43/021; B29C 43/18
(Continued)

(56) References Cited

U.S. PATENT DOCUMENTS

| 3,426,108 A | 2/1969 | Britten |
|---|---|---|
| 3,754,872 A | 8/1973 | Zauft |

(Continued)

FOREIGN PATENT DOCUMENTS

| CN | 1460723 A | 12/2003 |
|---|---|---|
| CN | 1858593 A | 11/2006 |

(Continued)

OTHER PUBLICATIONS

Agency for Science, Technology and Research, Decision to Grant, Application No. CN201110401674.9, dated Aug. 7, 2014, 2 pgs.
(Continued)

*Primary Examiner* — Benjamin R Whatley
*Assistant Examiner* — Jacqueline Brazin
(74) *Attorney, Agent, or Firm* — Morgan, Lewis & Bockius LLP

(57) ABSTRACT

A device includes a first structure with a sheet layer with a plurality of discrete through-holes and a second structure coupled to the first structure. At least a portion of a first surface of the sheet layer of the first structure is exposed from the second structure. A top portion of the sheet layer, including the exposed portion of the first surface of the sheet layer, includes fluorocarbon. The second structure includes a material of a higher surface tension than the top of the sheet layer. A second surface of the sheet layer, opposite to the first surface of the sheet layer, is embedded in the second structure. The second structure extends at least partially into the plurality of discrete through-holes of the first structure.

20 Claims, 46 Drawing Sheets

Related U.S. Application Data continuation-in-part of application No. PCT/IB2013/000623, filed on Feb. 5, 2013.

(60) Provisional application No. 61/711,127, filed on Oct. 8, 2012, provisional application No. 61/595,131, filed on Feb. 5, 2012.

(52) U.S. Cl.
CPC ... *B01L 2200/12* (2013.01); *B01L 2300/0822* (2013.01); *B01L 2300/0829* (2013.01); *B01L 2300/161* (2013.01)

(58) Field of Classification Search
USPC .......................................................... 422/553
See application file for complete search history.

(56) References Cited

U.S. PATENT DOCUMENTS

| | | | |
|---|---|---|---|
| 5,041,266 | A | 8/1991 | Fox |
| 5,219,528 | A | 6/1993 | Clark |
| 5,229,163 | A | 7/1993 | Fox |
| 5,506,121 | A | 4/1996 | Skerra et al. |
| 5,560,811 | A | 10/1996 | Briggs et al. |
| 5,691,147 | A | 11/1997 | Draetta et al. |
| RE35,894 | E | 9/1998 | Ellison et al. |
| 5,817,510 | A | 10/1998 | Pandey et al. |
| 6,048,908 | A | 4/2000 | Kitagawa |
| 6,086,825 | A | 7/2000 | Sundberg et al. |
| 6,103,493 | A | 8/2000 | Skerra et al. |
| 6,130,098 | A | 10/2000 | Handique et al. |
| 6,238,626 | B1 | 5/2001 | Higuchi et al. |
| 6,331,441 | B1 | 12/2001 | Balch et al. |
| 6,534,014 | B1 | 3/2003 | Mainquist et al. |
| 6,565,813 | B1 | 5/2003 | Garyantes |
| 6,578,952 | B1 | 6/2003 | Sugiyama et al. |
| 6,664,044 | B1 | 12/2003 | Sato |
| 6,699,437 | B1 | 3/2004 | Astle |
| 6,716,629 | B2 | 4/2004 | Hess et al. |
| 6,767,733 | B1 | 7/2004 | Green |
| 6,891,156 | B2 * | 5/2005 | DiCesare ............... B01L 3/5085 250/288 |
| 6,902,705 | B1 | 6/2005 | Caillat et al. |
| 7,163,823 | B2 | 1/2007 | Patno et al. |
| 7,344,877 | B1 | 3/2008 | Camacho et al. |
| 7,439,056 | B2 | 10/2008 | Duffy et al. |
| 7,579,056 | B2 * | 8/2009 | Brown ...................... B01L 3/00 422/292 |
| 7,666,362 | B2 | 2/2010 | Shanler |
| 7,794,799 | B1 | 9/2010 | Kim |
| 7,854,343 | B2 | 12/2010 | Ellson et al. |
| 7,858,044 | B2 | 12/2010 | Coassin et al. |
| 8,221,697 | B2 | 7/2012 | Nichols et al. |
| 8,337,778 | B2 | 12/2012 | Stone et al. |
| 8,987,174 | B2 | 3/2015 | Routenberg |
| 2002/0016009 | A1* | 2/2002 | Ogura .................. G01N 21/253 436/518 |
| 2002/0064482 | A1 | 5/2002 | Tisone et al. |
| 2002/0094533 | A1 | 7/2002 | Hess |
| 2003/0032046 | A1 | 2/2003 | Duffy et al. |
| 2003/0083474 | A1 | 5/2003 | Schmidt |
| 2003/0113813 | A1 | 6/2003 | Heidaran et al. |
| 2003/0116707 | A1* | 6/2003 | Brown .................. B01L 3/5088 250/288 |
| 2003/0124599 | A1 | 7/2003 | Chen |
| 2003/0148401 | A1 | 8/2003 | Agrawal et al. |
| 2003/0209560 | A1 | 11/2003 | Hui et al. |
| 2004/0106156 | A1 | 6/2004 | Perez |
| 2004/0106191 | A1 | 6/2004 | Muser |
| 2004/0136876 | A1 | 7/2004 | Fouillet et al. |
| 2004/0142460 | A1 | 7/2004 | Cima |
| 2004/0208792 | A1 | 10/2004 | Linton et al. |
| 2004/0234966 | A1 | 11/2004 | Bryning |
| 2005/0045539 | A1 | 3/2005 | Yu et al. |
| 2005/0079105 | A1 | 4/2005 | Hunter et al. |
| 2005/0084423 | A1 | 4/2005 | Zarowitz |
| 2005/0186579 | A1 | 8/2005 | Dellinger |
| 2006/0013031 | A1 | 1/2006 | Ravkin et al. |
| 2006/0051249 | A1 | 3/2006 | Knebel et al. |
| 2006/0078893 | A1 | 4/2006 | Griffiths |
| 2006/0105453 | A1 | 5/2006 | Brenan et al. |
| 2006/0105462 | A1 | 5/2006 | Sellek-Prince |
| 2006/0142468 | A1* | 6/2006 | Downing, Jr. ............ C08K 7/22 524/544 |
| 2007/0003448 | A1 | 1/2007 | Kanigan et al. |
| 2007/0005169 | A1 | 1/2007 | Rohnert et al. |
| 2007/0077651 | A1 | 4/2007 | Guarino |
| 2007/0099208 | A1 | 5/2007 | Drmanac |
| 2007/0117765 | A1 | 5/2007 | Sauve et al. |
| 2008/0003671 | A1 | 1/2008 | Martin |
| 2008/0173544 | A1 | 7/2008 | Seul |
| 2009/0142564 | A1 | 6/2009 | Plissonnier et al. |
| 2009/0148348 | A1 | 6/2009 | Pettigrew et al. |
| 2009/0227474 | A1 | 9/2009 | Gordon et al. |
| 2009/0286317 | A1 | 11/2009 | Demmler et al. |
| 2010/0000304 | A1 | 1/2010 | Kim et al. |
| 2010/0167950 | A1 | 7/2010 | Juang et al. |
| 2010/0297767 | A1 | 11/2010 | Hattori et al. |
| 2012/0220497 | A1 | 8/2012 | Jacobson et al. |
| 2015/0018248 | A1 | 1/2015 | Kim |
| 2016/0169867 | A1 | 6/2016 | Khine et al. |

FOREIGN PATENT DOCUMENTS

| | | |
|---|---|---|
| CN | 101031363 A | 9/2007 |
| DE | 10043042 C2 | 6/2002 |
| EP | 0812693 A1 | 12/1997 |
| EP | 1348533 B1 | 7/2002 |
| EP | 1358939 A2 | 4/2003 |
| EP | 1316360 B1 | 6/2003 |
| EP | 1386657 A1 | 2/2004 |
| EP | 1399263 B1 | 3/2004 |
| EP | 1473079 A1 | 11/2004 |
| EP | 1788047 A1 | 8/2005 |
| EP | 1683571 A1 | 1/2006 |
| GB | 1291610 | 10/1972 |
| GB | 2332273 A | 6/1999 |
| GB | 2334954 A | 9/1999 |
| JP | 3120453 B2 | 12/2000 |
| JP | 2002-502955 A | 1/2002 |
| JP | 2003-033177 A | 2/2003 |
| JP | 2004-020280 A | 1/2004 |
| JP | 2004-077476 A | 3/2004 |
| JP | 2004-535176 A | 11/2004 |
| JP | 2005-003803 A | 1/2005 |
| JP | 2005-099004 A | 4/2005 |
| WO | WO 1996-23879 | 8/1996 |
| WO | WO 1998-055852 | 12/1998 |
| WO | WO 99/39829 A1 | 8/1999 |
| WO | WO 2000-014311 | 3/2000 |
| WO | WO 00-58735 | 10/2000 |
| WO | WO 99/55826 | 10/2000 |
| WO | WO 2001-004144 A2 | 1/2001 |
| WO | WO 2003-029462 A1 | 4/2003 |
| WO | WO 2004-030820 A2 | 4/2004 |
| WO | WO 2004-111610 A2 | 12/2004 |
| WO | WO 2005/019254 A1 | 3/2005 |
| WO | WO 2005/019255 A1 | 3/2005 |
| WO | WO 2005/019256 A2 | 3/2005 |
| WO | WO 2006/004739 A2 | 1/2006 |
| WO | WO 2006/046699 A1 | 5/2006 |
| WO | WO 2007/102785 A1 | 9/2007 |
| WO | WO 2008/063136 A1 | 5/2008 |
| WO | WO 98/47003 | 10/2008 |
| WO | WO 2010/120249 A1 | 10/2010 |
| WO | WO 2012/011877 A2 | 1/2012 |

OTHER PUBLICATIONS

Agency for Science, Technology and Research, International Preliminary Report on Patentability, PCT/SG2007/000393, dated May 26, 2009, 4 pgs.

(56) References Cited

OTHER PUBLICATIONS

Agency for Science, Technology and Research, International Search Report and Written Opinion of the ISA, PCT/SG2007/000393, dated Feb. 20, 2008, 4 pgs.
Agency for Science, Technology and Research, Communication Pursuant to Article 94, EP07835548-4, dated Jul. 17, 2015, 3 pgs.
Agency for Science, Technology and Research, Communication Pursuant to Article 94, EP07835548-4, dated Oct. 2, 2018, 3 pgs.
Agency for Science, Technology and Research, Notification of First Office Action, CN 201110401674.9, dated Dec. 30, 2013, 9 pgs.
Agency for Science, Technology and Research, First Examination Report, IN3674/CHEN/P2009, dated Oct. 7, 2016, 9 pgs.
Agency for Science, Technology and Research, Notification of Reasons for Refusal, JP 2009-538373, dated Nov. 10, 2011, 7 pgs.
Agency for Science, Technology and Research, Decision to Grant, JP2012-196318, dated Sep. 12, 2014, 3 pgs.
Agency for Science, Technology and Research, Notification of Reasons for Refusal, JP 2012-196318, dated Dec. 10, 2013, 3 pgs.
Agency for Science, Technology and Research, Notification of the First Office Action, CN 200780048922.8, dated Nov. 12, 2010, 4 pgs (available in Chinese only).
Agency for Science, Technology and Research, Notification of the Second Office Action, CN 200780048922.8, dated May 17, 2011, 4 pgs.
Agency for Science, Technology and Research, Notification on the Grant of Patent Right for Invention, CN 200780048922.8, dated Sep. 22, 2011, 1 pg.
Agency for Science, Technology and Research, Supplementary Search Report, EP 07835548.4, dated Jun. 30, 2010, 4 pgs.
Asberg, Surgace Energy Modified Chips for Detection of Conformational States and Enzymatic Activity in Biomolecules, Langmuir, 2006, pp. 2205-2211.
Beck, Improving Stamps for 10 nm Level Wafer Scale Nanoimprint Lithography, Microelectron. Eng., 2002, pp. 61-62 and 441.
Benor, Microstructuring by Microcontact Printing and Selective Surface Dewetting, J. of Vacuum Science & Technology B, 2007, pp. 1321-1326.
Beste, Small Antibody-like Proteins with Prescrived Ligand Specificities Derived from the Lipocalin Fold, Proc. Natl. Acad. Sci, USA, 1999, pp. 1898-1903.
Biffinger, The Polar Hydrophobicity of Cluorinated Compounds, ChemBioChem, 2004, pp. 622-627.
Burbulis, Quantifying Small Number of Antibodies with a 'Near-Universal' Protein-DNA Chimera, Nature Methods, Nov. 2007, 39 pgs.
Cheng, Office Action, U.S. Appl. No. 14/050,321, dated Feb. 26, 2016, 31 pgs.
Cheng, Office Action, U.S. Appl. No. 14/050,321, dated Mar. 31, 2017, 38 pgs.
Cheng, Final Office Action, U.S. Appl. No. 14/050,321, dated Jan. 24, 2018, 33 pgs.
Chiriac, Magnetic GMI Sensor for Detection of Biomolecules, J. Magnetism and Magnetic Materials, 2005, pp. 671-676.
Churaev, Wetting of Low-Energy Surgfaces, Advances in Colloid and Interface Science, 2007, pp. 134-135, 15-23.
Curiox Biosystems Pte Ltd, International Preliminary Report on Patentability, PCT/SG2010/000153, dated Oct. 18, 2011, 15 pgs.
Curiox Biosystems Pte Ltd, International Preliminary Report on Patentability, PCT/SG2011/000263, dated Dec. 21, 2012, 5 pgs.
Curiox Biosystems Pte Ltd, International Search Report and Written Opinion, PCT/IB2013/000623, dated Jul. 10, 2013, 10 pgs.
Curiox Biosystems Pte Ltd, International Preliminary Report on Patentablity, PCT/IB2013/000623, dated Aug. 5, 2014, 7 pgs.
Curiox Biosystems Pte Ltd, International Search Report and Written Opinion, PCT/SG2006/000050, dated May 8, 2006, 6 pgs.
Curiox Biosystems Pte Ltd, International Search Report and Written Opinion, PCT/SG2010/000153, dated Sep. 17, 2010, 20 pgs.
Curiox Biosystems Pte Ltd, International Search Report and Written Opinion, PCT/SG2011/000263, dated Feb. 29, 2012, 18 pgs.
Curiox Biosystems Pte Ltd, International Search Report and Written Opinion, PCT/US2015/019760, dated Jun. 2, 2015, 12 pgs.
Daniel, Vibration-Actuated Drop Motion on Surfaces bor Batch Microfluidic Processes, Langmuir, 2005, pp. 4220-4228.
Dill, Modeling Water, The Hydrophobic Effect and Ion Solvation, Annu. Rev. Biophys. Biomol. Struc, 2005, pp. 173-199.
Erfle et al., "Reverse Transfections on Cell Arrays for High Content Screening Microscopy," Nature Protocols, Mar. 1, 2007, vol. 2 No. 2, 8 pgs.
Gao, A Commercially Available Perfectly Hydrophobic Material, Langmuir, 2007, pp. 9125-9127.
Gascoyne, Dielectrophoresis-based Programmable Fluidic Processors, Lab-on-a-Chip, 2004, pp. 299-309.
Genua, Functional Patterns Obtained by Nanoimprinting Lithography and Subsequent Growth of Polymer Brushes, Nanotechnology, 2007, 215301, 7 pgs.
Gill, Pharmaceutical Drug Discovery Using Novel Protein Scaffolds, Current Opinion in Biotechnology, 2006, 653-658.
Giovambattista, Effect of Surface Polarity on Water Contact Angle and Interfacial Hydration Structure, J. Phys. Chem., 2007, pp. 9581-9587.
Goddard, Polymer Surface Modification for the Attachment of Bioactive Compounds, Progress in Polymer Science, 2007, pp. 698-725.
Griffiths, Miniaturising the Laboratory in Emulsion Droplets, Trends in Biotechnology, 2006, pp. 395-402.
Herrmann, Enxymatically-Generated Fluorescent Detection in Micro-Channels with Internal Magnetic Mixing for the Development of Parallel Miicrofluidic ELISA, Lab-on-a-Chip, 2006, pp. 555-560.
Holt, Domain Antibodies: Proteins for Therapy, Trends Biotechnol, 2003, pp. 484-490.
Hutten, New Magnetic Nanoparticles for Biotechnology, J. Biotech., 2004, pp. 47-63.
Iliades, Triabodies: Single Chain Fv Fragments without a Linker Form Trivalent Trimers, FEBS Lett, 1997, pp. 437-441.
Jakobs, Micrometer Scale Gel Patterns, Colloids & Surfaces A: PhysioChem. Eng. Aspects, 2006, pp. 33-40.
Jung, Wetting Transition of Water Droplets on Superhydrophobic Patterned Surfaces, Scripta Materialia, 2007, pp. 1057-1060.
Kanta, Preparation of Silica-on-Titania Patterns with a Wettability Contrast, Langmuir, 2005, 5790-5794.
Kim, Final Office Action, U.S. Appl. No. 13/264,913, dated Jun. 21, 2013, 11 pgs.
Kim, Notice of Allowance, U.S. Appl. No. 12/282,162, dated May 14, 2012, 7 pgs.
Kim, Office Action, U.S. Appl. No. 12/282,162, dated Jun. 27, 2011, 8 pgs.
Kim, Office Action, U.S. Appl. No. 13/264,913, dated Nov. 7, 2012, 9 pgs.
Kim, Office Action, U.S. Appl. No. 13/264,913, dated Sep. 26, 2013, 10 pgs.
Kim, Office Action, U.S. Appl. No. 13/811,638, dated Sep. 11, 2015, 29 pgs.
Kim, Final Office Action, U.S. Appl. No. 13/811,638, dated Apr. 21, 2016, 24 pgs.
Kim, Final Office Action, U.S. Appl. No. 13/811,638, dated Feb. 9, 2017, 29 pgs.
Kim, Office Action, U.S. Appl. No. 14/326,780, dated Oct. 28, 2015, 13 pgs.
Kim, Final Office Action, U.S. Appl. No. 14/326,780, dated May 10, 2016, 11 pgs.
Kim, Notice of Allowance, U.S. Appl. No. 14/326,780, dated Sep. 22, 2016, 7 pgs.
Kim, Office Action, U.S. Appl. No. 14/452,172, dated Oct. 23, 2015, 16 pgs.
Kim, Final Office Action, U.S. Appl. No. 14/452,172, dated Jun. 3, 2016, 17 pgs.
Kim, Notice of Allowance, U.S. Appl. No. 14/452,172, dated Dec. 12, 2017, 9 pgs.
Kim, Office Action, U.S. Appl. No. 14/338,168, dated Nov. 6, 2015, 8 pgs.
Kim, Office Action, U.S. Appl. No. 14/338,168, dated Jun. 22, 2016, 9 pgs.

(56) References Cited

OTHER PUBLICATIONS

Kim, Notice of Allowance, U.S. Appl. No. 14/338,168, dated Sep. 13, 2017, 8 pgs.
Kusumaatmaja, Controlling Drop Size and Polydispersity Using Chemically Patterned Surfaces, Langmuir, 2007, pp. 956-959.
Kwon, Quantitative Evaluation of the Relative Cell Permeability of Peptoids and Peptides, J. AM. Chem. Soc., 2007, pp. 1508-1509.
Leck, Final Office Action, U.S. Appl. No. 11/984,197, dated May 8, 2012, 10 pgs.
Leck, Office Action, U.S. Appl. No. 11/984,197, dated Mar. 14, 2013, 11 pgs.
Leck, Office Action, U.S. Appl. No. 11/984,197, dated May 26, 2011, 11 pgs.
Leck, Office Action, U.S. Appl. No. 11/984,197, dated Jul. 31, 2013, 12 pgs.
Leck, Notice of Allowance, U.S. Appl. No. 14/246,004, dated Sep. 15, 2016, 8 pgs.
Leck, Office Action, U.S. Appl. No. 15/424,604, dated Aug. 11, 2017, 7 pgs.
Li, What Do We Need for a Superhydrophobic surface? A review on the recent progress in the preparation of superhydrophobic surfaces, Chem. Soc. Rev, 2007, pp. 1350-1368.
Lowe et al., "Perfluorochemicals: Their Applications and Benefits to Cell Culture," Tibtech, Jun. 1998, vol. 16, 6 pgs.
Luca, Preparation of TIOx Thin Films by Reactive Pulsed-Laser Ablation, J. Optoelectronics and Adv. Materials, Apr. 2005, pp. 625-630.
Lundgren, Modeling of Wetting: A Study of Nanowetting at Rough and Heterogeneous Surfaces, Langmuir, 2007, pp. 1187-1194.
Ma, Superhydrophobic Surfaces, Current Opinion in Colloid & Interface Science, 2006, pp. 193-202.
Mardare, Microelectrochemical Lithography: A method for Direct Writing of Surface Oxides, Electrochimica Acta, 2007, pp. 7865-7869.
Matsuda, Phosphorylcholine-Endcapped Oligomer and Block Co-Oligomer and Surface Biological Reactivity, Biomaterials, 2003, pp. 4517-4527.
Meyer, Recent Progress in Understanding Hydrophobic Interactions, Proc. Netl. Acad. Sci USA, 2006, pp. 15739-15746.
Mosavi, The Ankyrin Repeat as Molecular Architecture for Protein Recognition, Protein Science, 2004, pp. 1435-1448.
Opdahl, Polymer Surface Science, The Chemical Record, 2001, pp. 101-122.
Perfulorodecalin-FluoroMed, downloaded on Sep. 5, 2013, from http://fluoromed.com/products/perfluorodecalin.html, 1 pg.
Pollack, Electrowetting-based Actuation of Liquid Droplets for Microfluidic Applications, Appl. Phys. Lett., 2000, pp. 1725-1726.
Popp, Sortagging: A versatile Method for Protein Labeling, Nature Chemical Biology, 2007, pp. 707-708.
Rastogi, Development and Evaluation of Realistic Microbioassys in Freely Suspended Droplets on a Chip, Biomicrofludics, 2007, 014107-1-014107-17.
Roach, Controlling Nonspecific Protein Adsorption in a Plug-Based Microfluidic System by Controlling Interfacial Chemistry Using Fluorous-Phase Surfactants, Analytical Chemistry, vol. 77, No. 3, Feb. 1, 2005, pp. 785-796.
Ronaghi, Pyrosequestering Sheds Light on DNA Sequestering, Genome Research, 2001, pp. 3-11.
Rose, Microdispensing Technologies in Drug Discovery, Drug Discovery Today, 1999, pp. 411-419.
Satriano, Bacterial Adhesion Onto Nanopatterned Polymer Surfaces, Materials Science & Engineering C, 2006, pp. 942-946.
Silverman, Multivalent Avimer Proteins Evolved by Exon Shuffling of a Family of Human Receptor Domains, Nature Biotechnology, 2005, pp. 1556-1561.
Skerra, Engineered Protein Scaffolds for Molecular Recognition, J. Mol. Recognit., 2000, pp. 167-187.
Song, Miniature Biochip System for Detection of Sscherichi coli O157:H7 Based on Antibody-Immobilized Capillary Reactors and Enzyme-linked Immunosorbent Assay, Analytica Chimica Acta, 2004, pp. 115-121.
Stephenson, Quantifying the Hydrophobic Effect: A Computer Simulation-Molecular-Thermodynamic Model for the Self-Assembly of Hydrophibic and Amphiphilic Solutes in Aqueous Solution, Jp. Phys. Chem. B, 2007, 1025-1044.
Stone, The Assembly of Single Domain Antibodies into Bispecific Decavalent Molecules, J. Immunological Methods, 2007, pp. 88-94.
Sundberg, Contact Angle Measurements by Confocal Microscopy for Non-Destructive Microscale Surface Characterization, J. Colloid and Interface Science, 2007, pp. 454-460.
Takahashi et al., Induction of Pluripotent Stem Cells from Mouse Embryonic and Adult Fibroblast Cultures by Defined Factors, Cell, Aug. 25, 2006, 126, 14 pgs.
Vancha et al., "Use of Polyethyleneimine Polymer in Cell Culture as Attachment Factor and Lipofection Enhancer," BMC Biotechnology, Oct. 15, 2004, 12 pgs.
Van Oss, Long-Rage and Short-Range Mechanisms of Hydrophobic Attraction and Hydrophilic Repulsion in Specific and Aspecific Interactions, J. Mol. Recognit., 2003, pp. 177-190.
Wang, Flow-Focusing Generation of Monodisperse Water Droplets Wrapped by Ionic Liquid on Microfluidic Chips: From Plug to Sphere, langmuir, 2007, pp. 11924-11931.
Wang, In-Situ Wilhelmy Balance Surface Energy Determination of Poly(3-hexylthiophere) and Poly(3,4-ethylenedioxythiophere) during Electrochemical Doping-Dedoping, Langmuir, 2006, pp. 9287-9294.
Washizu, Elecrostatic Actuation of Liquid Droplets for Microreactor Applications, IEEE Transactions on Industry Applications, vol. 34, No. 4, Jul.-Aug. 1998.
West, Microplasma Writing for Surface-Directed Millifludics, Lab-on-a-Chip, 2007, pp. 981-983.
Widom, The Hydrophobic Effect, Phys. Chem. Chem. Phys., 2003, pp. 3085-3093.
Wixforth, Flatland Fluidics, mstnews, 2002, pp. 42-43.

* cited by examiner

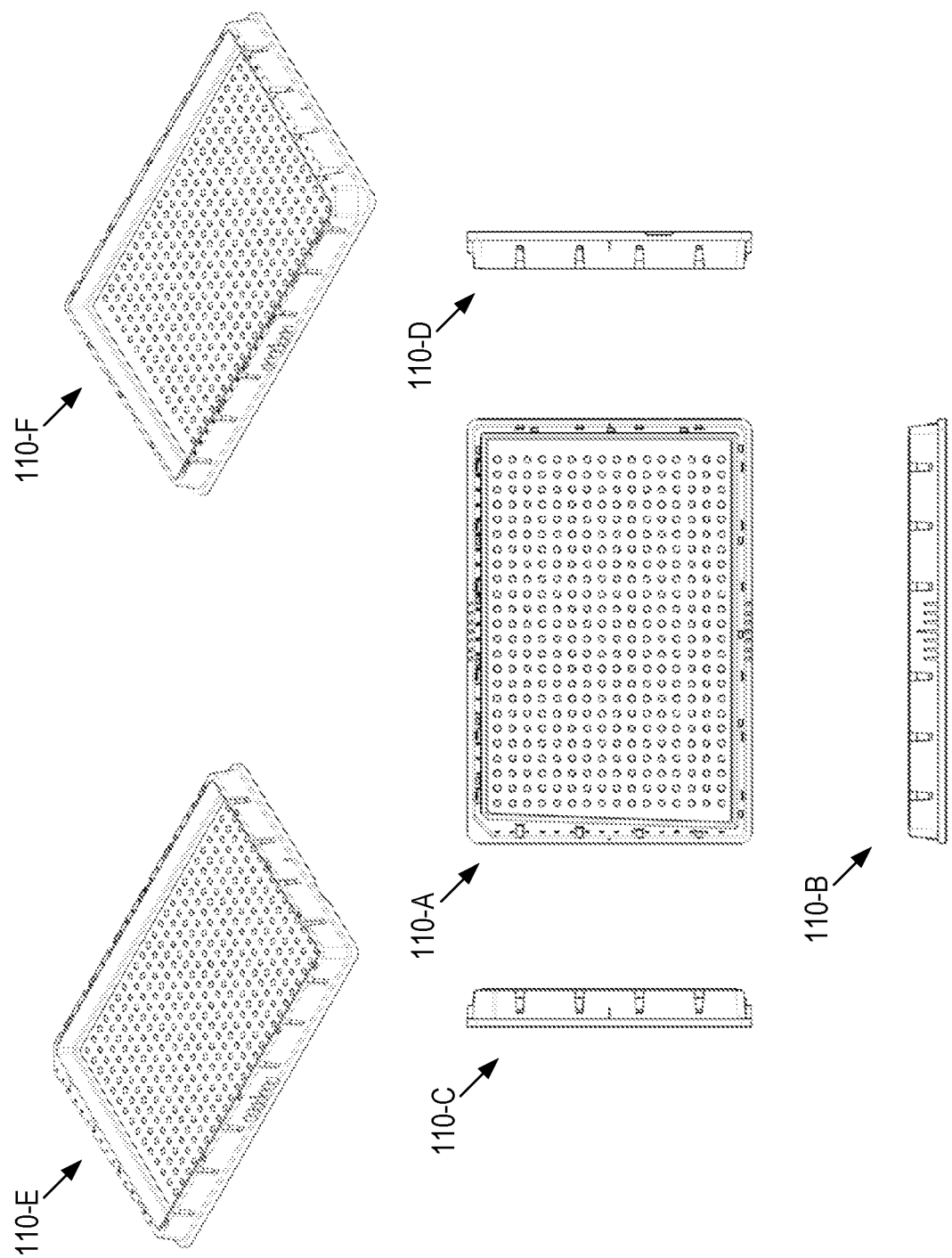

600

602 Provide a first structure, the first structure including a sheet layer with a plurality of discrete through holes

604 The sheet layer includes at least 50% of fluorocarbon by weight

606 The sheet layer includes at least 90% of fluorocarbon by weight

608 Press the first structure against a first surface of a mold

610 Pressing the first structure against the first surface of the mold includes pressing the first surface of the sheet layer against the first surface of the mold with a plurality of pins at least on the second surface of the sheet layer

612 Provide vacuum suction on the first surface of the sheet layer

614 Provide a heated plastic material into the mold

616 The plastic material includes polycarbonates

618 The plastic material includes cyclic olefin polymer or copolymer (A)

Figure 6A

620 Cool the plastic material to form a second structure so that the first structure and the second structure are coupled, the second structure including a base layer and one or more vertical structures along a periphery of the base layer, adjacent a first surface of the base layer. At least a portion of a first surface of the sheet layer of the first structure is exposed from the second structure, and a second surface of the sheet layer, opposite to the first surface of the sheet layer, is embedded in the base layer of the second structure adjacent the first surface of the base layer.

622 The plastic material of the second structure is optically transparent

624 Couple a third structure with at least the second structure over at least a portion of the one or more vertical structures, the third structure including one or more side walls 626 The one or more vertical structures of the second structure include a plurality of pins vertically protruding from the rest of the one or more vertical structures 628 Mold the third structure over at least a portion of the one or more vertical structures with a second mold so as to couple the second structure and the third structure, and remove a combination of the second structure and the third structure from the second mold by pushing respective locations on the third structure that correspond to the plurality of pins of the second structure.

630 The one or more side walls are made of a plastic material that has a glass transition temperature lower than the glass transition temperature of the second structure 632 The one or more vertical structures include one or more side walls

Figure 6B

634 The one or more side walls are made of a material that has Shore A hardness of 85 or less 636 The one or more side walls each have an inner surface, an outer surface, a bottom adjacent the sheet layer of the first structure, and a top surface opposite the bottom, and a respective side wall of the one or more side walls includes one or more lips on the top surface, at least one of the one or more lips aligned with the inner surface of the respective side wall 638 The one or more side walls each have an inner surface, an outer surface, a bottom adjacent the sheet layer of the first structure, and a top surface opposite the bottom, and a respective side wall of the one or more side walls includes one or more vertical indentations along the outer surface of the respective side wall 640 The one or more side walls are made of a hydrophobic material of a surface tension lower than 35 dynes/cm 642 The one or more side walls each have an inner surface, an outer surface, a bottom adjacent the sheet layer of the first structure, and a top surface opposite the bottom, and the inner surface of a respective side wall of the one or more side walls is coated to expose a hydrophobic surface of a surface tension lower than 35 dynes/cm 644 The second structure includes a plurality of holding locations, the method comprising aligning the first structure and the second structure so that the plurality of discrete through holes defined in the sheet layer of the first structure is offset from the plurality of holding locations in the second structure

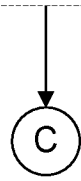

Figure 6C

646 The mold is configured so that a top surface of the sheet layer of the first structure is aligned with a top surface of the base layer of the second structure 648 The mold is configured so that a top surface of the sheet layer of the first structure is above a top surface of the base layer of the second structure 650 The mold is configured so that a top surface of the sheet layer of the first structure is below a top surface of the base layer of the second structure 652 The first surface of the mold has one or more of: a plurality of indentations and a plurality of protrusions corresponding to the plurality of discrete through holes defined in the sheet layer 654 At least one of the side walls include one or more handles, each handle comprising a plurality of parallel fins

702 Provide a first structure in a mold. The first structure includes a sheet layer with a plurality of discrete through-holes.

704 The sheet layer includes at least 50% of fluorocarbon by weight

706 The sheet layer includes at least 90% of fluorocarbon by weight

708 The sheet layer includes at least 95% of fluorocarbon by weight

710 The sheet layer includes at least 99% of fluorocarbon by weight

712 The sheet layer includes at least 90% of polytetrafluoroethylene by weight

714 The sheet layer includes at least 95% of polytetrafluoroethylene by weight

716 The sheet layer includes at least 99% of polytetrafluoroethylene by weight

718 Press the first structure against a first surface of a mold

720 Pressing the first structure against the first surface of the mold includes pressing the first surface of the sheet layer against the first surface of the mold with a plurality of pins at least on the second surface of the sheet layer

722 Provide vacuum suction on the first surface of the sheet layer (A)

Figure 12A

736 At least a portion of a first surface of the sheet layer of the first structure is exposed from the second structure, and a second surface of the sheet layer, opposite to the first surface of the sheet layer, is embedded in the second structure

746 At least 90% of the exposed portion of the first surface is covered by fluorocarbon 748 At least 95% of the exposed portion of the first surface is covered by fluorocarbon 750 At least 99% of the exposed portion of the first surface is covered by fluorocarbon 752 At least 90% of the exposed portion of the first surface is covered by polytetrafluoroethylene 754 At least 95% of the exposed portion of the first surface is covered by polytetrafluoroethylene 756 At least 99% of the exposed portion of the first surface is covered by polytetrafluoroethylene 758 The exposed portion of the first surface is characterized (758) by advancing and receding contact angles, for a liquid selected from a group including water, ethanol, and isopropanol, that are similar to advancing and receding contact angles, for the selected liquid, on polytetrafluoroethylene 760 The second structure includes a plurality of holding locations. Align the first structure and the second structure so that the plurality of discrete through-holes defined in the sheet layer of the first structure is offset from the plurality of holding locations in the second structure.

Figure 12C

762 The mold is configured so that a top surface of the sheet layer of the first structure is aligned with a top surface of a base layer of the second structure 764 The mold is configured so that a top surface of the sheet layer of the first structure is above a top surface of a base layer of the second structure 766 The mold is configured so that a top surface of the sheet layer of the first structure is below a top surface of a base layer of the second structure 768 The first surface of the mold has one or more of: a plurality of indentations and a plurality of protrusions corresponding to the plurality of discrete through-holes defined in the sheet layer 770 At least a portion of the first surface of the sheet layer is embedded in the second structure 772 The first structure includes one or more connectors coupled to one or more sides of the sheet layer 774 The one or more connectors are embedded in the second structure 776 At least a portion of the sides of the sheet layer is angled 778 An inner wall of at least one discrete through-hole of the sheet layer is angled 780 The second surface of the sheet layer has a larger area than the first surface of the sheet layer 782 Coat a portion of the second structure with oil 784 Coat a portion of the first surface of the sheet layer of the first structure with the oil 786 The oil is selected from the group consisting of a mineral oil, a silicone oil, a hydrocarbon compound, a hydrofluorocarbon compound and a perfluorocarbon compound

Figure 12D

ARRAY PLATES AND METHODS FOR MAKING AND USING SAME

RELATED APPLICATIONS

This application is a divisional application of U.S. patent application Ser. No. 14/452,172, filed Aug. 5, 2014, which is a continuation-in-part application of PCT Patent Application Serial No. PCT/IB2013/000623 filed on Feb. 5, 2013, which claims the benefit of and priority to U.S. Provisional Patent Application Ser. No. 61/595,131, filed on Feb. 5, 2012 and U.S. Provisional Patent Application Ser. No. 61/711,127, filed on Oct. 8, 2012, all of which are hereby incorporated by reference in their entireties.

TECHNICAL FIELD

The disclosed embodiments relate generally to array plates and slides, and methods for making and using the same. More particularly, the disclosed embodiments relate to array plates and slides for biological and/or chemical reactions, and methods for making and using the same.

BACKGROUND

An array plate is also called a microtiter plate, microplate, or microwell plate. Array plates are typically used to hold respective liquid droplets separately for biological and/or chemical reaction. For example, a well-type array plate includes a plurality of wells so that each liquid droplet or each sample may be dispensed into a separate well for further processing. Typically, the number of wells is selected from 6, 24, 96, 384, 1536, 3456, and 9600.

Polytetrafluoroethylene (PTFE) matrix-coated slides have been used for holding larger volumes of droplets on a microscope slide surface. The PTFE matrix is patterned on a glass slide (e.g., a microscope slide) so that the PTFE matrix covers portions of the glass microscope slide and the remaining portions of the glass microscope slide are not covered by the PTFE matrix. The PTFE matrix has hydrophobic characteristics and the portions of the glass microscope slide that are not covered by the PTFE matrix have hydrophilic characteristics.

The PTFE matrix-coated slides are typically made by depositing a mixture of resin and PTFE powder on glass slides. The resin in the PTFE matrix holds the PTFE powder together and also onto the glass slides.

However, the PTFE matrix has a lower hydrophobicity than pure PTFE, because the resin in the PTFE matrix has a lower hydrophobicity than the pure PTFE. When the PTFE matrix-coated slides are used in biological/chemical processing, the PTFE matrix is easily contaminated by biological and/or chemical materials used in the biological/chemical processing. For example, proteins in biological samples may attach to the PTFE matrix during biological assays. This leads to contamination of samples and inaccurate assay results.

SUMMARY

Accordingly, there is need for plates and slides with hydrophobic surfaces with higher hydrophobicity. Such plates and slides may replace the PTFE matrix-coated slides in performing biological and/or chemical reactions. Such plates and slides reduce or eliminate adsorption of biological and/or chemical materials onto hydrophobic surfaces, thereby reducing contamination of samples and improving accuracy in assays.

A number of embodiments that overcome the limitations and disadvantages of existing array plates and slides are presented in more detail below. These embodiments provide array plates and slides for biological and/or chemical reactions and methods for making and using the same.

As described in more detail below, some embodiments involve a method for manufacturing an array plate. The method includes providing a first structure, the first structure including a sheet layer with a plurality of discrete through holes. The method includes pressing the first structure against a first surface of a mold, providing a heated plastic material into the mold, and cooling the plastic material to form a second structure so that the first structure and the second structure are coupled. The second structure includes a base layer and one or more vertical structures along a periphery of the base layer, adjacent a first surface of the base layer. At least a portion of a first surface of the sheet layer of the first structure is exposed from the second structure, and a second surface of the sheet layer, opposite to the first surface of the sheet layer, is embedded in the base layer of the second structure adjacent the first surface of the base layer.

In accordance with some embodiments, an apparatus includes an array plate manufactured by the aforementioned method.

In accordance with some embodiments, an apparatus includes a first structure, the first structure including a sheet layer with a plurality of discrete through holes. The apparatus includes a second structure coupled to the first structure, the second structure including a base layer and one or more vertical structures along a periphery of the base layer, adjacent a first surface of the base layer. At least a portion of a first surface of the sheet layer of the first structure is exposed from the second structure, and a second surface of the sheet layer, opposite to the first surface of the sheet layer, is embedded in the base layer of the second structure adjacent the first surface of the base layer.

In accordance with some embodiments, a method includes providing an apparatus of the aforementioned apparatuses, the apparatus defining a reservoir. The method includes storing a liquid medium in the reservoir of the apparatus so that the first surface of the sheet layer is covered by the liquid medium, and dispensing respective liquid droplets on respective locations on the base layer. The respective locations correspond to locations of the plurality of discrete through holes defined in the sheet layer, and the respective liquid droplets are immiscible with the liquid medium. In some embodiments, the method includes adding one or more solutions to one or more liquid droplets of the respective liquid droplets. In some embodiments, the method includes performing an immunoassay by: immobilizing one of one or more antibodies and one or more antigens in one or more respective liquid droplets to the base layer; adding one or more solutions to the one or more respective liquid droplets of the respective liquid droplets, at least one of the one or more solutions including the other of the one or more antibodies and the one or more antigens; and detecting a binding of the at least one antigen with at least one antibody in the one or more respective liquid droplets. In some embodiments, the method includes washing the respective liquid droplets on the apparatus by: removing a portion of the liquid medium; adding a wash buffer to the reservoir; shaking the apparatus so that the wash buffer and the respective liquid droplets are mixed; draining at least a portion of the wash buffer from the reservoir; and providing a liquid medium in the reservoir of the apparatus so that the first surface of the sheet layer is covered by the liquid medium.

Some embodiments involve a method for manufacturing an array slide. The method includes providing a first structure in a mold. The first structure includes a sheet layer with a plurality of discrete through-holes. The method also includes providing a heated plastic material into the mold and cooling the plastic material to form a second structure so that the first structure and the second structure are coupled. At least a portion of a first surface of the sheet layer of the first structure is exposed from the second structure, and a second surface of the sheet layer, opposite to the first surface of the sheet layer, is embedded in the second structure.

Some embodiments involve an array slide manufactured by the aforementioned method.

In accordance with some embodiments, an array slide includes a first structure including a sheet layer with a plurality of discrete through-holes; and a second structure coupled to the first structure. At least a portion of a first surface of the sheet layer of the first structure is exposed from the second structure. A top portion of the sheet layer, including the exposed portion of the first surface of the sheet layer, includes at least 95% of fluorocarbon by weight. A second surface of the sheet layer, opposite to the first surface of the sheet layer, is embedded in the second structure.

In accordance with some embodiments, a device includes a first structure with a sheet layer with a plurality of discrete through-holes and a second structure coupled to the first structure. At least a portion of a first surface of the sheet layer of the first structure is exposed from the second structure. A top portion of the sheet layer, including the exposed portion of the first surface of the sheet layer, includes fluorocarbon. The second structure includes a material of a higher surface tension than the top of the sheet layer. A second surface of the sheet layer, opposite to the first surface of the sheet layer, is embedded in the second structure. The second structure extends at least partially into the plurality of discrete through-holes of the first structure.

In accordance with some embodiments, a method includes providing a first structure in a mold, the first structure including a sheet layer with a plurality of discrete through-holes and providing a heated plastic material into the mold. The method also includes cooling the plastic material to form a second structure so that the first structure and the second structure are coupled. At least a portion of a first surface of the sheet layer of the first structure is exposed from the second structure. A top portion of the sheet layer, including the exposed portion of the first surface of the sheet layer, includes fluorocarbon. The second structure includes a material of a higher surface tension than the top of the sheet layer. A second surface of the sheet layer, opposite to the first surface of the sheet layer, is embedded in the second structure. The second structure extends at least partially into the plurality of discrete through-holes of the first structure.

BRIEF DESCRIPTION OF THE DRAWINGS

For a better understanding of the aforementioned embodiments as well as additional embodiments, reference should be made to the Description of Embodiments below, in conjunction with the following drawings in which like reference numerals refer to corresponding parts throughout the figures.

FIG. 3C-1 is a partial sectional view of the exemplary array plate corresponding to a portion of the cross-sectional view illustrated in FIG. 3C in accordance with some embodiments.

FIG. 3E-1 is a partial sectional view of the exemplary array plate corresponding to a portion of the cross-sectional view illustrated in FIG. 3E in accordance with some embodiments.

FIG. 3G-1 is a partial sectional view of the exemplary array plate corresponding to a portion of the cross-sectional view illustrated in FIG. 3G in accordance with some embodiments.

FIGS. 6A-6D are flow charts representing a method of making an array plate in accordance with some embodiments.

FIGS. 12A-12D are flow charts representing a method of making an array slide in accordance with some embodiments.

Like reference numerals refer to corresponding parts throughout the drawings.

DESCRIPTION OF EMBODIMENTS

Array plates and slides and methods for making and using the array plates and slides are described. Reference will be made to certain embodiments, examples of which are illustrated in the accompanying drawings. While the claims will be described in conjunction with the embodiments, it will be understood that it is not intended to limit the claims to these particular embodiments alone. On the contrary, the embodiments are intended to cover alternatives, modifications and equivalents that are within the spirit and scope of the appended claims.

Moreover, in the following description, numerous specific details are set forth to provide a thorough understanding of the embodiments. However, it will be apparent to one of ordinary skill in the art that the embodiments may be practiced without these particular details. In other instances, methods, procedures, components, and networks that are well-known to those of ordinary skill in the art are not described in detail to avoid obscuring aspects of the embodiments.

It will also be understood that, although the terms first, second, etc. may be used herein to describe various elements, these elements should not be limited by these terms. These terms are only used to distinguish one element from another. For example, a first surface could be termed a second surface, and, similarly, a second surface could be termed a first surface, without departing from the scope of the embodiments. The first surface and the second surface are both surfaces, but they are not the same surface.

The terminology used in the description of the embodiments herein is for the purpose of describing particular embodiments only and is not intended to be limiting of the invention. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Array Plates and Methods for Making the Array Plates

Figure 3A:
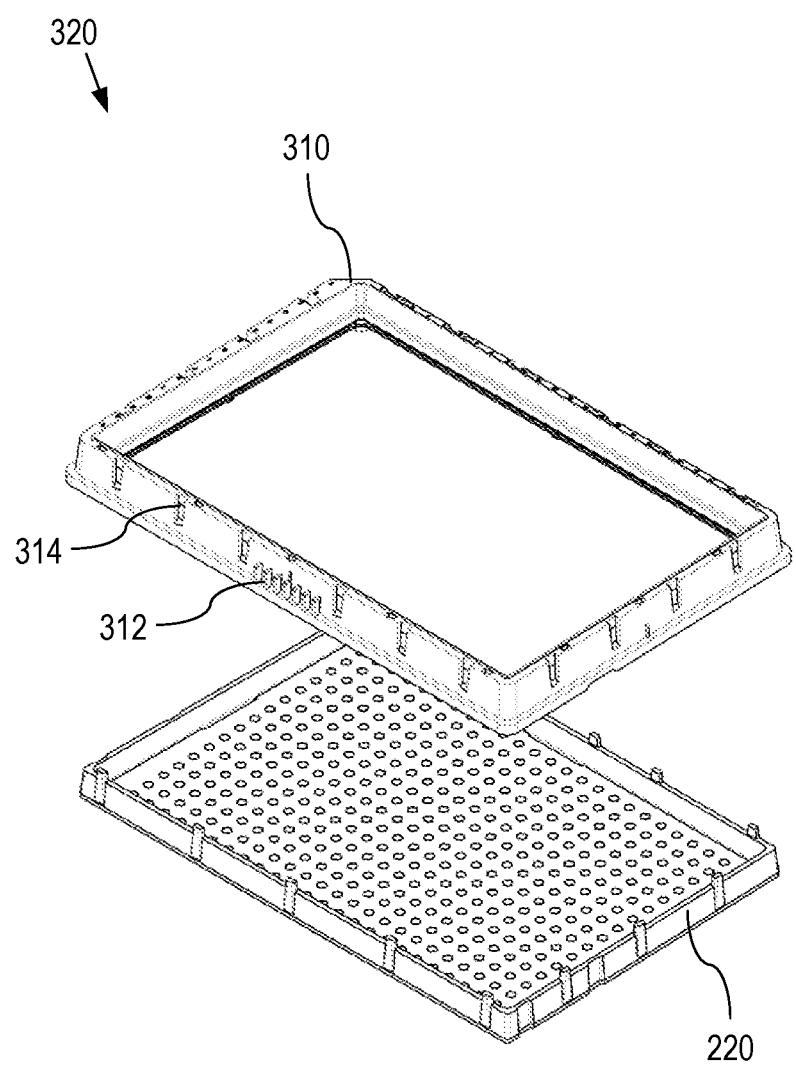
FIG. 3A is an exploded view of an exemplary array plate in accordance with some embodiments.
Figure 3B:
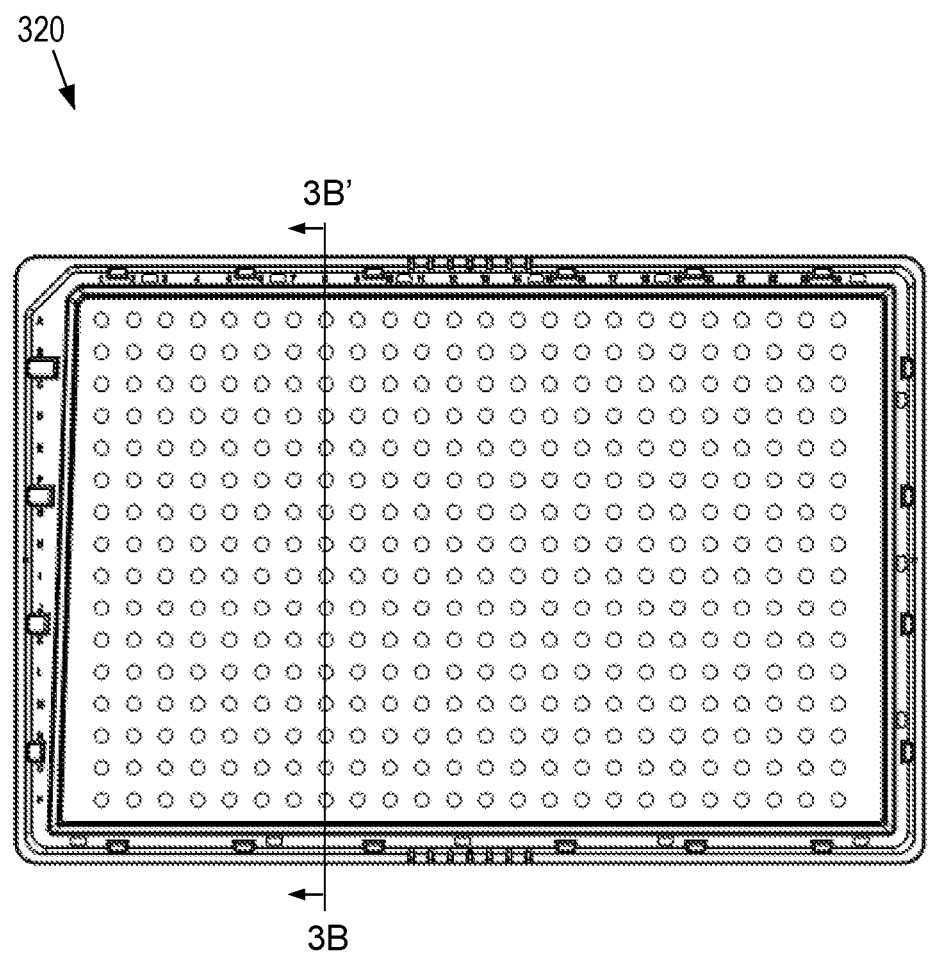
FIGS. 3B, 3D, and 3F are top perspective views of an exemplary array plate in accordance with some embodiments.
Figure 3C:
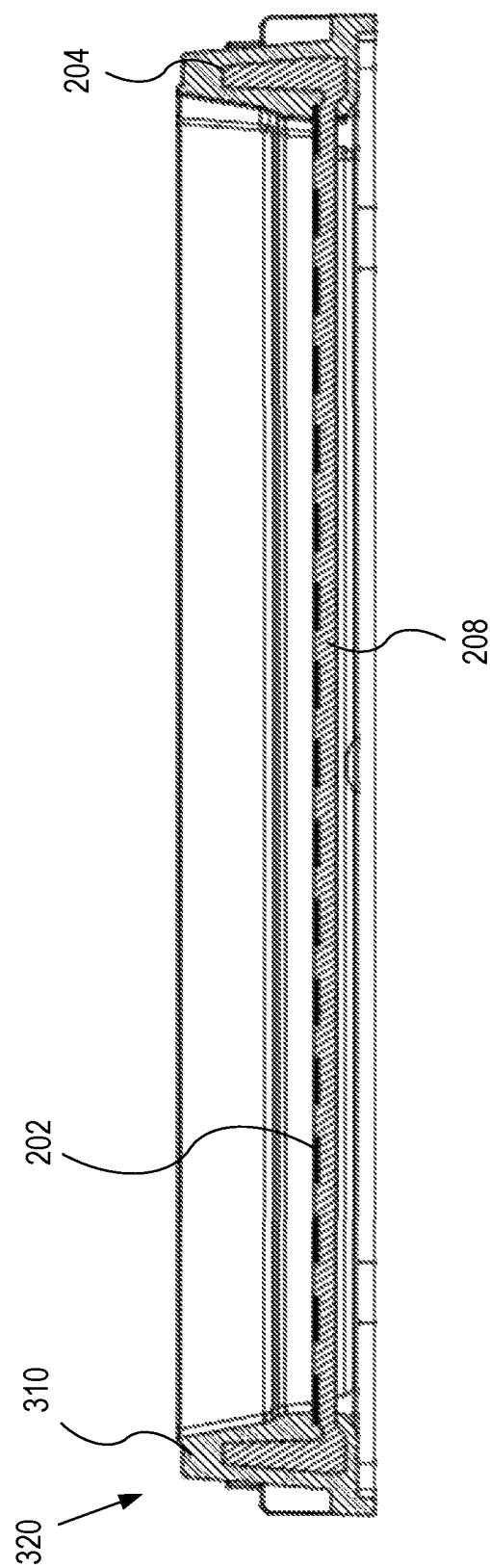
FIG. 3C is a cross-sectional view of the exemplary array plate corresponding to a section indicated in FIG. 3B in accordance with some embodiments.
Figures 1, 3C:
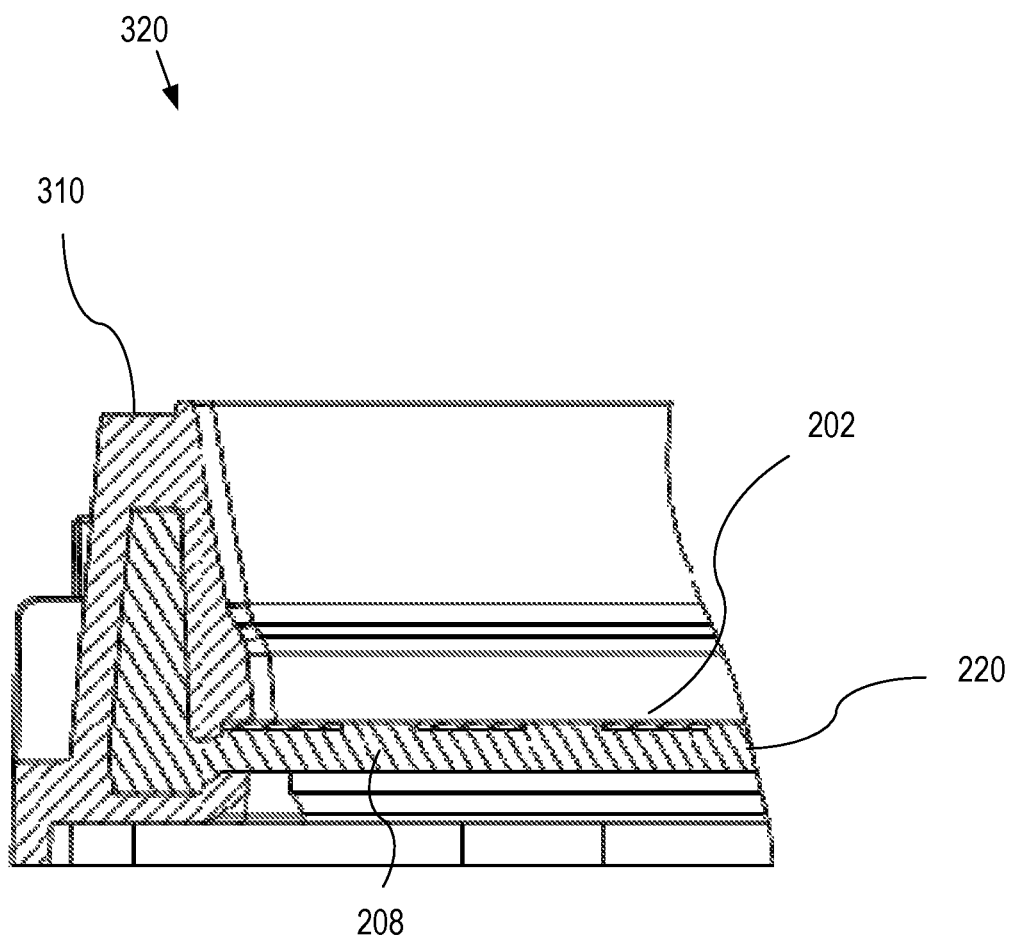
FIG. 1 is perspective views of an exemplary array plate in accordance with some embodiments.

FIG. 1 is perspective views of an exemplary array plate in accordance with some embodiments. In particular, FIG. 1 includes a top perspective view 110-A, a front perspective view 110-B, a left perspective view 110-C, a right perspective view 110-D, and oblique perspective views 110-E and 110-F of an exemplary array plate 110.

The exemplary array plate 110 includes at least a combination of a first structure (e.g., a plate) and a second structure (e.g., a frame). The details of the first structure and the second structure are described with respect to FIGS. 2A-2G below.

Figure 2A:
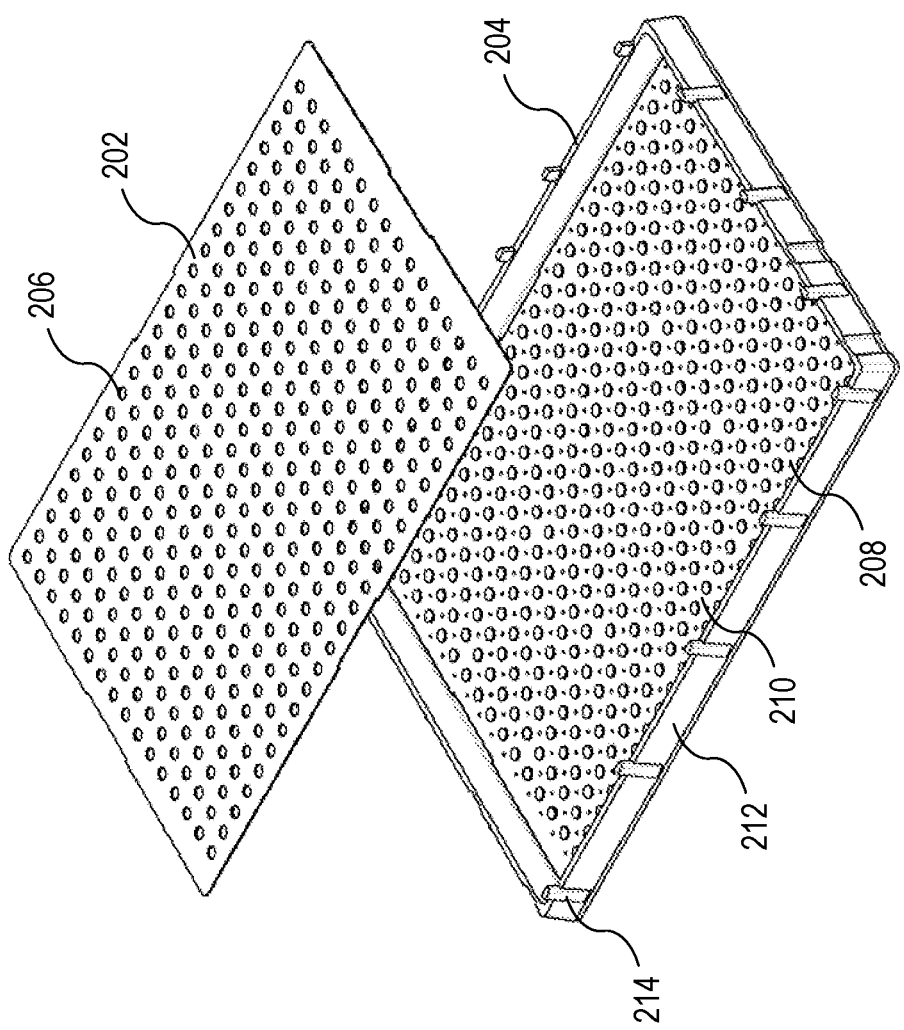
FIG. 2A is an exploded view of an exemplary combination of a first structure and a second structure in accordance with some embodiments.

FIG. 2A is an exploded view of an exemplary combination of a first structure 202 and a second structure 204 in accordance with some embodiments. The first structure 202 includes a sheet layer that typically has a square or rectangular planar shape. Alternatively, the sheet layer of the first structure 202 may have a round shape, such as a circle or an oval. Optionally, the first structure 202 may also include additional features, such as one or more vertical structures described below (e.g., the first structure 202 may be a tray including the sheet layer and one or more short sidewalls).

In some embodiments, the sheet layer of the first structure 202 includes a sheet of a preselected material of a predefined thickness. The preselected material includes a polymer (e.g., polytetrafluoroethylene, any other perfluorocarbon polymer, or any other fluorocarbon polymer). The sheet layer has a thickness typically of 0.01-10 mm, 0.1-2 mm, 0.2-1 mm, or 1-2 mm.

A plurality of discrete through holes 206 are defined in the sheet layer of the first structure 202. The plurality of discrete through holes 206 are formed by punching holes through the sheet layer of the first structure 202 (which typically includes a polymer). Typically, the plurality of discrete through holes have substantially the same diameter (e.g., with less than 50, 30, 20, 10, or 5% variation among the holes). In some embodiments, a respective through hole has a 1 mm-5 mm diameter, or 2 mm-3 mm diameter. In some embodiments, the discrete through holes are arranged in a predefined pattern. For example, when 96 discrete through holes are defined in the sheet layer of the first structure 202, the 96 discrete through holes are arranged in an 8×12 array. In some embodiments, the discrete through holes have a predefined spacing.

In some embodiments, the sheet layer of the first structure 202 includes at least 50% of fluorocarbon by weight. Alternatively, the sheet layer of the first structure 202 may include at least 60, 70, 80, 90, 95, or 99% of fluorocarbon by weight. In some embodiments, the sheet layer of the first structure 202 includes at least 90% of polytetrafluoroethylene by weight. Alternatively, the sheet layer of the first structure 202 may include at least 50, 60, 70, 80, 95, or 99% of polytetrafluoroethylene by weight.

In some embodiments, a first surface (e.g., a surface facing away from the second structure 204) of the first structure 202 is roughened to increase the hydrophobicity and/or oleophobicity.

In some embodiments, at least the first surface of the first structure 202 is coated with a material of at least 50% of fluorocarbon by weight. The thickness of the coated material may be as thin as 1 nm, 2 nm, 5 nm, or 10 nm.

The second structure 204 includes a base layer 208 and one or more vertical structures 212 along, or adjacent to, a periphery of the base layer 208, adjacent a first surface of the base layer 208 (e.g., a top surface of the base layer 208 facing the first structure 202 as illustrated in FIG. 2A). As used herein, a vertical structure 212 refers to a structure protruding from a plane defined by the base layer 208. The vertical structure 212 typically defines a plane that is substantially perpendicular to the plane defined by the base layer 208 (e.g., the angle formed by the vertical structure 212 and the base layer 208 is 45° or less). In some embodiments, the one or more vertical structures 212 typically have at least 3 mm height. Alternatively, the one or more vertical structures 212 may have 1 mm, 2 mm, 4 mm, 5 mm, 6 mm, 8 mm, 10 mm, 12 mm, 14 mm, or 15 mm height. In some embodiments, the one or more vertical structures 212 have 0.1-5 mm width. Alternatively, the one or more vertical structures 212 may have 1-4 mm, 1-3 mm, 2-4 mm, 1-2 mm, or 2-3 mm width. In some embodiments, the one or more vertical structures 212 are configured to form a reservoir with the base layer 208. In other words, the reservoir is defined by the one or more vertical structures 212 and the base layer 208. In such embodiments, the reservoir formed by the one or more vertical structures of the second structure hold liquid without leaks. In some embodiments, the reservoir formed by the first structure and the second structure is configured to store at least a predefined volume of liquid (e.g., 1 ml, 5 ml, 10 ml, 20 ml, 50 ml, 100 ml, etc.).

In some embodiments, the base layer 208 of the second structure 204 includes a plurality of structures 210 that correspond to the plurality of discrete through holes in the first structure 202. In some embodiments, the second structure 204 is configured to mate with the first structure 202.

In some embodiments, the one or more vertical structures 212 include a plurality of pins 214. In some embodiments, the plurality of pins 214 vertically protrudes from the rest of the one or more vertical structures (e.g., a tip of a pin 214 is located further away from the rest of the one or more vertical structures). In some embodiments, the pins 214 provide additional stiffness for the one or more vertical structures 212. In some embodiments, the pins 214 also provide additional stiffness for the one or more side walls formed over the one or more vertical structures 212 so that the one or more side walls may maintain a flat top surface. In some embodiments, the pins 214 are used to remove an array plate from a mold, the process of which is described below with respect to FIG. 3J.

The second structure 204 typically includes a plastic material. In some embodiments, the plastic material includes polycarbonates. In some embodiments, the plastic material includes cyclic olefin polymer or copolymer.

In some embodiments, the plastic material of the second structure 204 is optically transparent. This allows the second structure 204 to be optically imaged from a bottom surface side of the base layer 208 facing away from the first structure 202. In order to obtain high quality images, it is important to keep the first structure and the second structure.

Figure 2B:
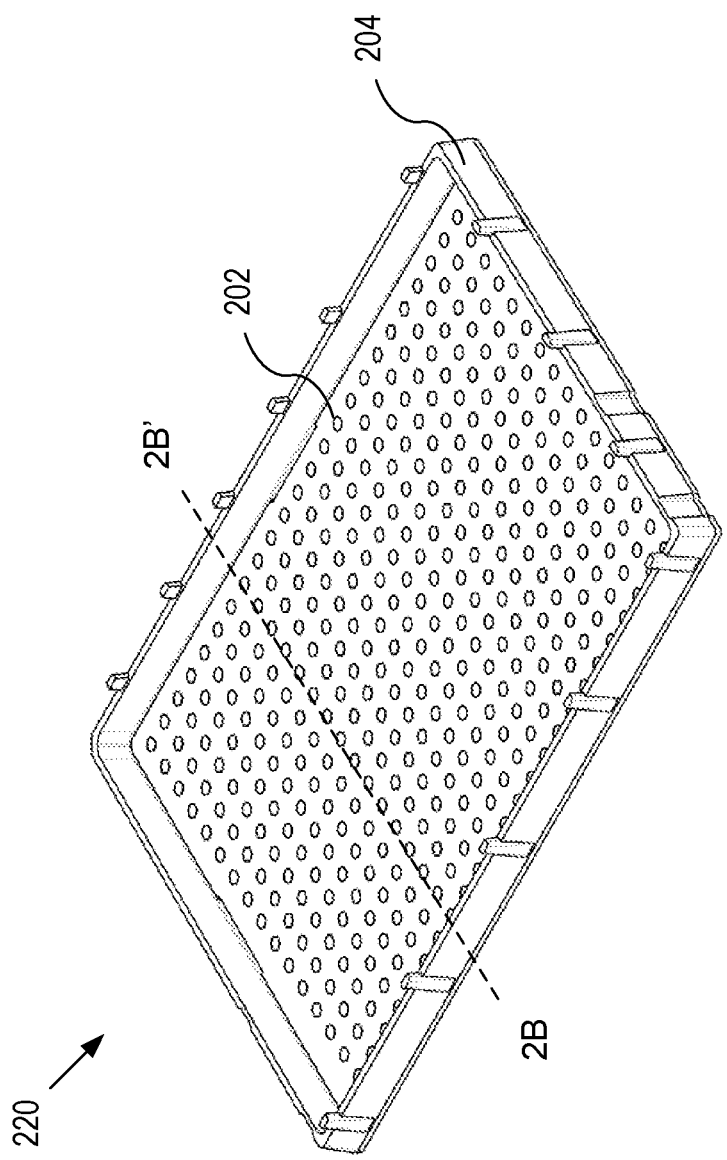
FIG. 2B is a perspective view of the exemplary combination of the first structure and the second structure in accordance with some embodiments.

FIG. 2B is a perspective view of the exemplary combination 220 of the first structure 202 and the second structure 204 in accordance with some embodiments.

In some embodiments, the combination 220 of the first structure 202 and the second structure 204 is made by forming the second structure 204 through a molding process while the first structure is placed in a mold. The details of the molding process are described with respect to FIGS. 2E-2H below. Alternatively, the first structure 202 and the second structure 204 may be separately manufactured and subsequently attached together. However, forming the second structure through the molding process provides several advantages, including a better seal between the first structure and the second structure, the absence of glue or adhesives in forming the combination 220 of the first structure 202 and the second structure 204, and also a reduced number of manufacturing steps. The absence of glue or adhesives reduces the interference on biological experiments on the plate.

FIG. 2B also indicates a line 2B-2B' across the combination 220 of the first structure 202 and the second structure 204. The line 2B-2B' corresponds to the cross-sectional view illustrated in FIG. 2C.

Figure 2C:
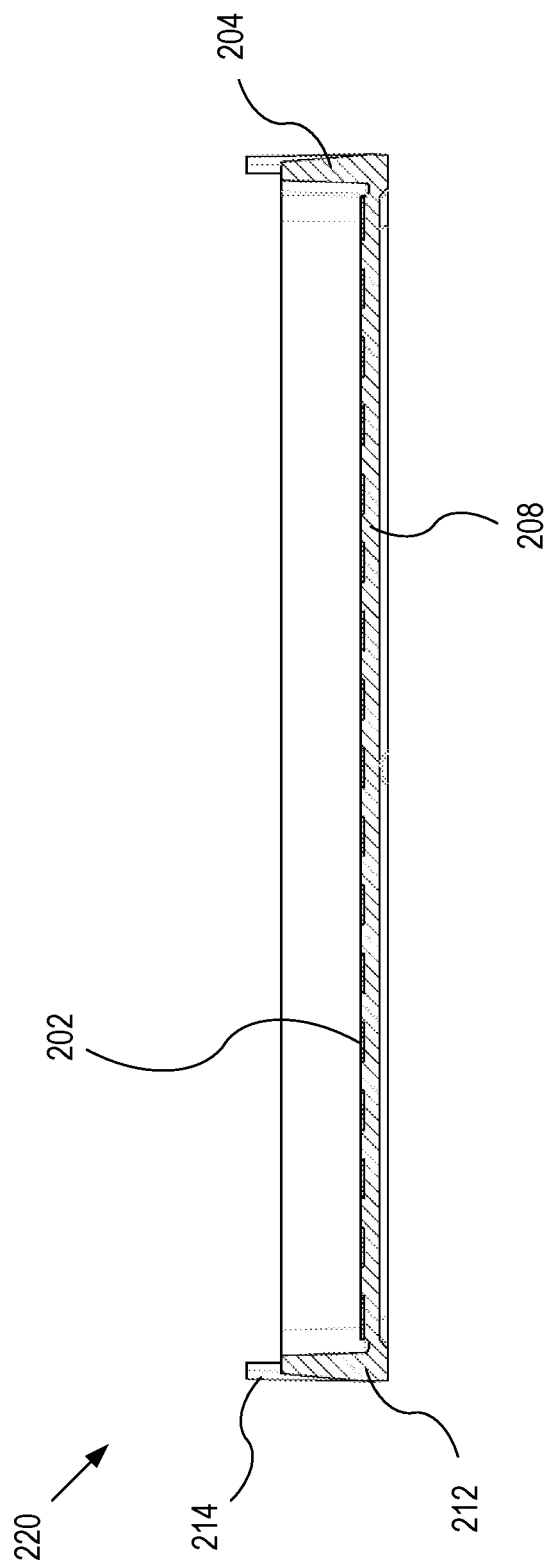
FIG. 2C is a cross-sectional view of the exemplary combination of the first structure and the second structure in accordance with some embodiments.

FIG. 2C is a cross-sectional view of the exemplary combination 220 of the first structure 202 and the second structure 204 in accordance with some embodiments. FIG. 2C also illustrates a pin 214 that vertically protrudes from the rest of the second structure 204 and a base layer 208.

Figure 2D:
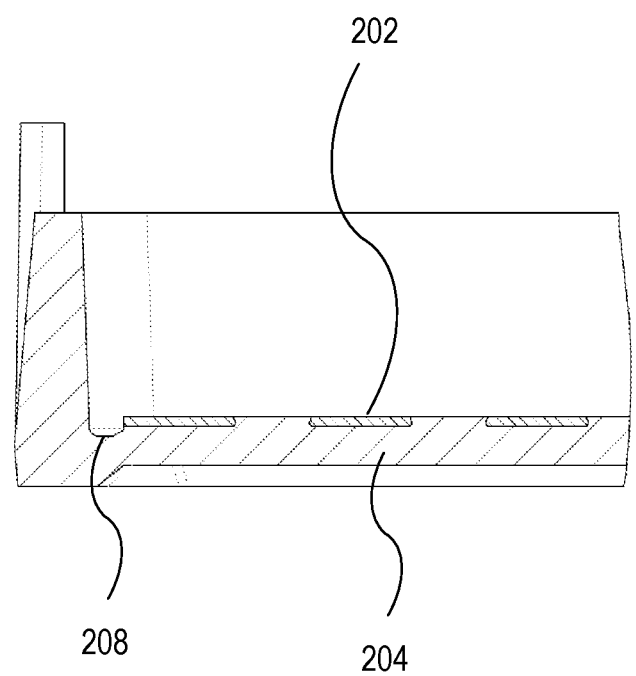
FIG. 2D is a partial sectional view of the exemplary combination illustrated in FIG. 2C in accordance with some embodiments.

FIG. 2D is a partial sectional view of the exemplary combination 220 illustrated in FIG. 2C, near the junction of the base layer 208 and the one or more vertical structures 212, in accordance with some embodiments. When the second structure 204 is formed by a molding process, the base layer 208 and the one or more vertical structures 212 are integrally formed so that there is no hole or gap through which liquids leak.

As shown in FIG. 2D, in the combination 220 of the first structure 202 and the second structure 204, at least a portion of a first surface of the sheet layer of the first structure 202 (e.g., a top surface of the sheet layer of the first structure 202 facing away from the second structure 204) is exposed from the second structure 204, and a second surface of the sheet layer, opposite to the first surface of the sheet layer, (e.g., a bottom surface of the sheet layer of the first structure 202 facing the base layer 208 of the second structure 204) is embedded in the base layer 208 of the second structure 204 adjacent the first surface of the base layer 208. In other words, the top surface of the sheet layer of the first structure 202 is not entirely covered by the second structure 204. However, in some embodiments, a portion of the top surface of the sheet layer of the first structure 202 is covered by the second structure 204 along the periphery of the first structure. The bottom surface of the sheet layer of the first structure 202 is in contact with the base layer 208 of the second structure 204.

In some embodiments, the first structure 202 and the second structure 204 have a surface tension difference of more than 10 dynes/cm. In some embodiments, the second structure 204 is more hydrophilic than the first structure 202, and the first structure 202 is more hydrophobic than the second structure 204.

FIGS. 2E-2H are schematic diagrams illustrating selected steps for manufacturing an exemplary combination 220 of a first structure 202 and a second structure 204 in accordance with some embodiments. The elements in FIGS. 2E-2H are not drawn to scale.

Figure 2E:
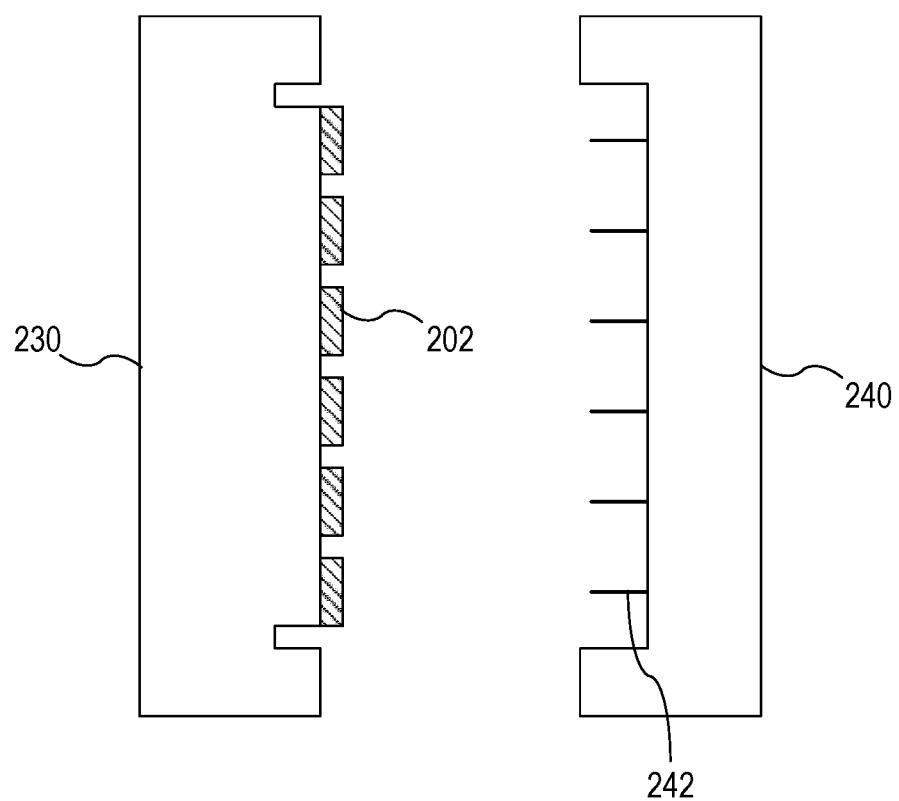
FIGS. 2E-2H are schematic diagrams illustrating selected steps for manufacturing an exemplary combination of a first structure and a second structure in accordance with some embodiments.

FIG. 2E illustrates that the first structure 202 is held in a first mold component 230 by vacuum suction. The vacuum suction pulls the first structure 202 toward the first mold component 230 so that the first structure 202 remains flat through the molding process. Typically, the vacuum suction is applied over a plurality of locations on the first structure 202. The vacuum suction typically leaves one or more indentations on the surface of the first structure 202 facing the first mold component 230. In some embodiments, the first mold component 230 includes a plurality of vacuum holes (not shown).

In some embodiments, a plurality of pins 242 coupled with the second mold component 240 are spring loaded so that the plurality of pins 242 are configured to apply force on the first structure 202 toward the first mold component 230 when the first mold component 230 and the second mold component 240 are assembled together.

In some embodiments, the bottom surface of the first structure 202 (e.g., the surface facing the second mold component 240) is treated, typically before the first structure 202 is held in the first mold component 230, to facilitate coupling with the second structure 204. In some embodiments, the bottom surface of the first structure 202 is treated to reduce the hydrophobicity (e.g., increase the surface tension) of the first structure 202. In some embodiments, the bottom surface of the first structure 202 is roughened to increate the contact area with the second structure 204.

In some embodiments, the first mold component 230 has a flat surface or a portion of the surface that is flat facing the first structure 202. In some embodiments, the surface of the first mold component 230 has protrusions and/or indentations, the impact of which is described below with respect to FIGS. 5A-5C below.

Figure 2F:
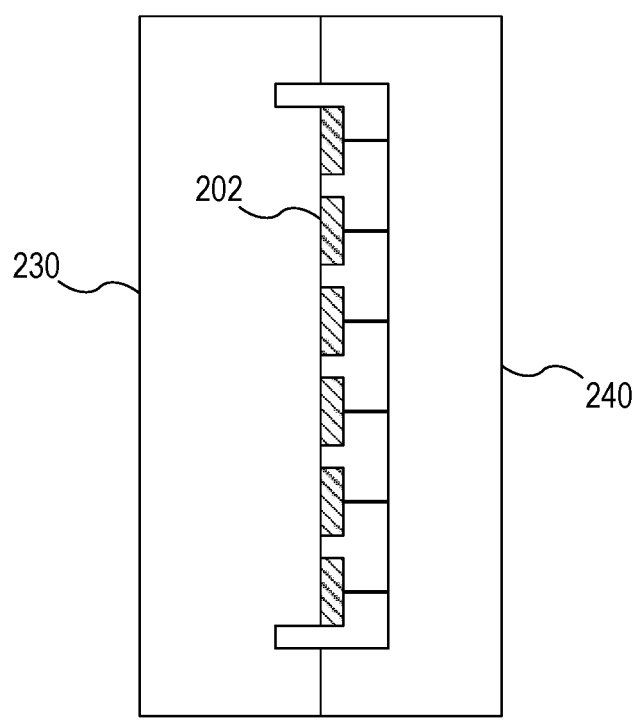

FIG. 2F illustrates that the first mold component 230 and the second mold component 240 are assembled, thereby forming a cavity inside, into which a heated plastic material is introduced for a molding process.

Figure 2G:
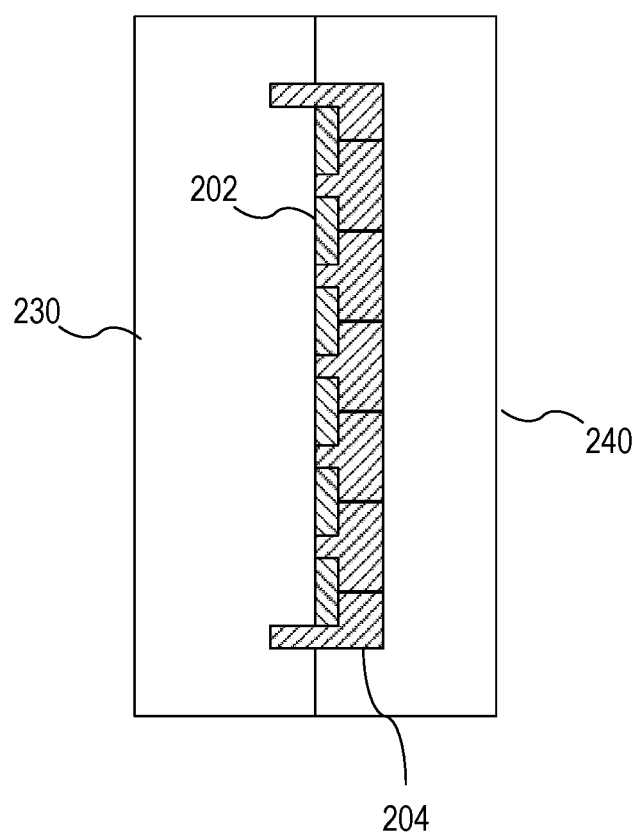

FIG. 2G illustrates that a heated plastic material is introduced into the cavity. In some embodiments, the plastic material includes polycarbonates. In some embodiments, the plastic material includes cyclic olefin polymer or copolymer.

Once the heated plastic material is cooled, the plastic material forms the second structure 204. When the second structure 204 is formed, the second structure 204 is coupled with the first structure 202 so as to form the combination 220 of the first structure 202 and the second structure 204.

Figure 2H:
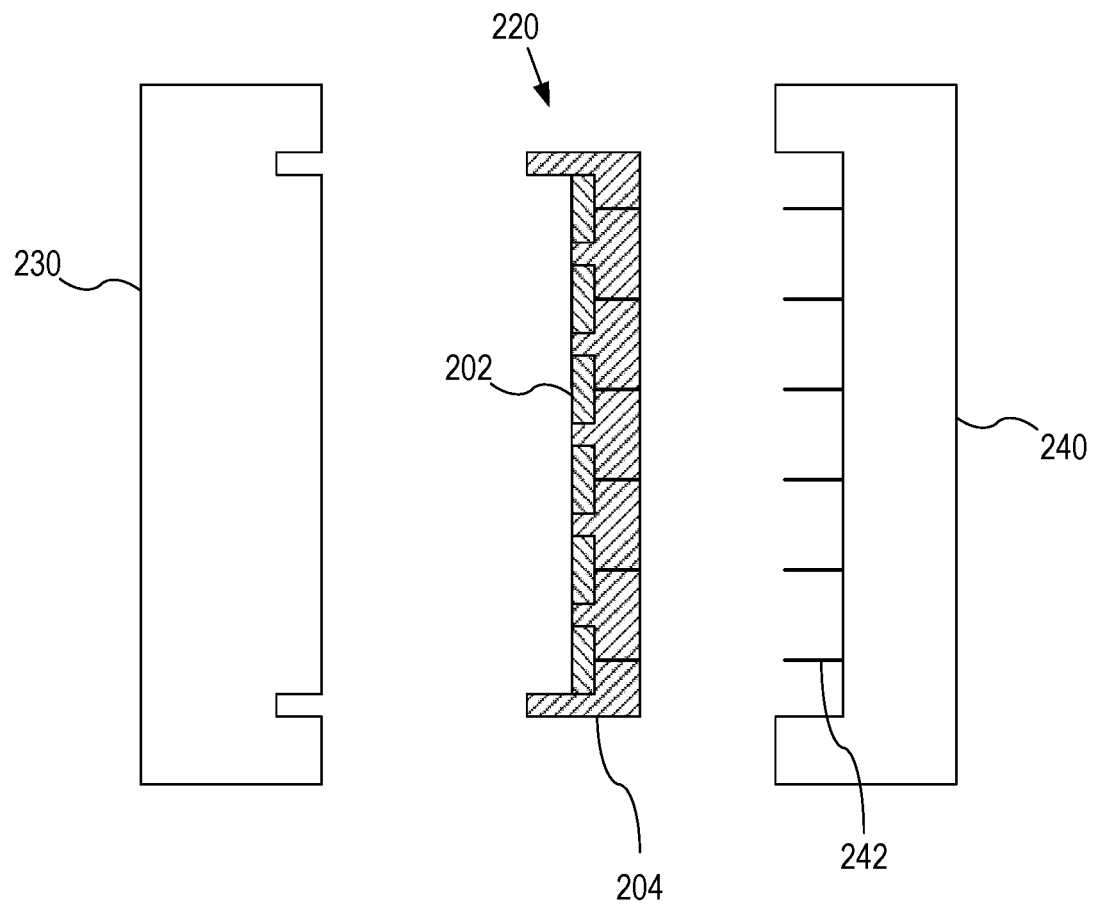

FIG. 2H illustrates that the combination 220 is removed from the first mold component 230 and the second mold component 240.

Note that the combination 220 removed from the first mold component 230 and the second mold component 240 has pin marks corresponding to the plurality of pins 242 coupled with the second mold component 240. When optical measurements (e.g., collection of optical images or optical signals) are performed through respective portions of the second structure 204 corresponding to the plurality of discrete through holes defined in the first structure 202, if the pin marks are located at the respective portions of the second structure 204 corresponding to the plurality of discrete through holes defined in the first structure 202, the pin marks interfere optical measurements. Thus, to avoid the interference by the pin marks, the plurality of pins 242 are located offset from the plurality of discrete through holes defined in the first structure 202. Alternatively, the first structure 202 and the second structure 204 are aligned so that the plurality of discrete through holes defined in the sheet layer of the first structure 202 is offset from the plurality of holding locations in the second structure 204.

Although FIGS. 2E-2H illustrate forming the combination 220 of the first structure 202 and the second structure 204 by a molding process, the combination 220 of the first structure 202 and the second structure 204 may be manufactured by attaching the first structure 202 to a preformed second structure 204.

FIG. 3A is an exploded view of an exemplary array plate 320 in accordance with some embodiments. The exemplary array plate 320 includes a third structure 310 and the combination 220 of the first structure 202 and the second structure 204 described above with respect to FIGS. 2E-2H.

In some embodiments, the third structure 310 includes a plurality of vertical indentations 314 along the outside of the third structure 310. In some embodiments, a respective side of the third structure 310 defines a longitudinal axis, and respective vertical indentations 314 located on the respective side of the third structure 310 are substantially perpendicular to the longitudinal axis formed by the respective side of the third structure 310 (e.g., a respective vertical indentation 314 forms 60-120° with the longitudinal axis of the respective portion of the third structure 310). In some embodiments, the vertical indentations 314 are substantially perpendicular to the plane defined by the base layer 208 of the second structure 202 of the combination 220 (e.g., a respective vertical indentation 314 forms 45° or less with a surface normal of the base layer 208 of the second structure 202 of the combination 220). In some embodiments, the plurality of vertical indentations 314 reduces distortion of the third structure 310, thereby maintaining a flatness of the top surface of the third structure 310.

In some embodiments, the third structure 310 includes one or more handles 312, each handle 312 including a plurality of fins.

Figure 3D:
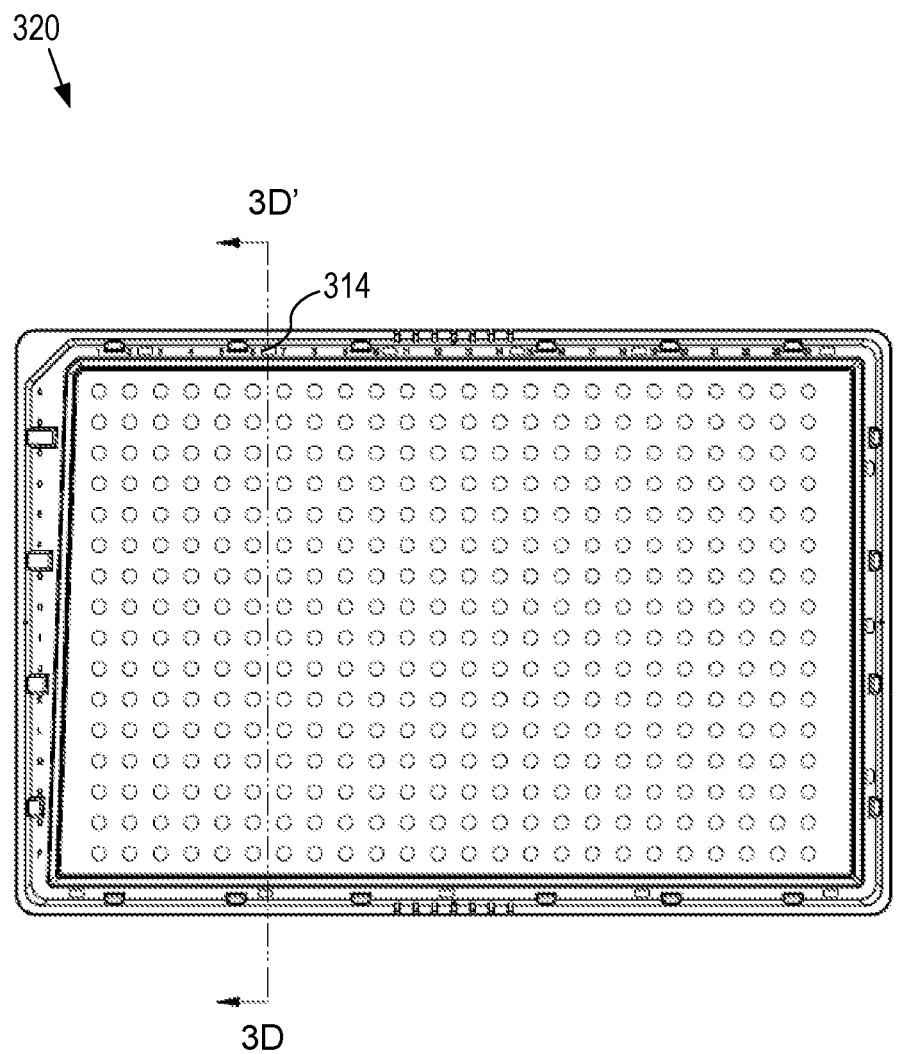
Figure 3E:
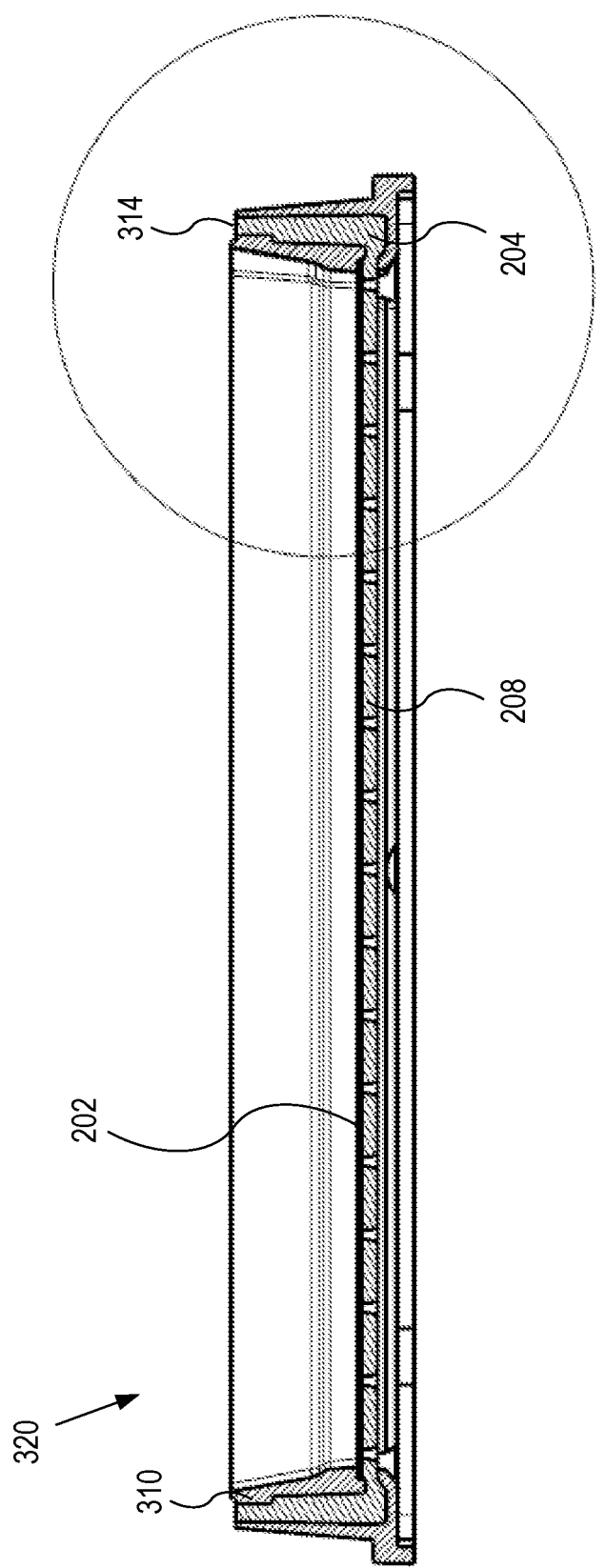
FIG. 3E is a cross-sectional view of the exemplary array plate corresponding to a section indicated in FIG. 3D in accordance with some embodiments.
Figures 1, 3E:
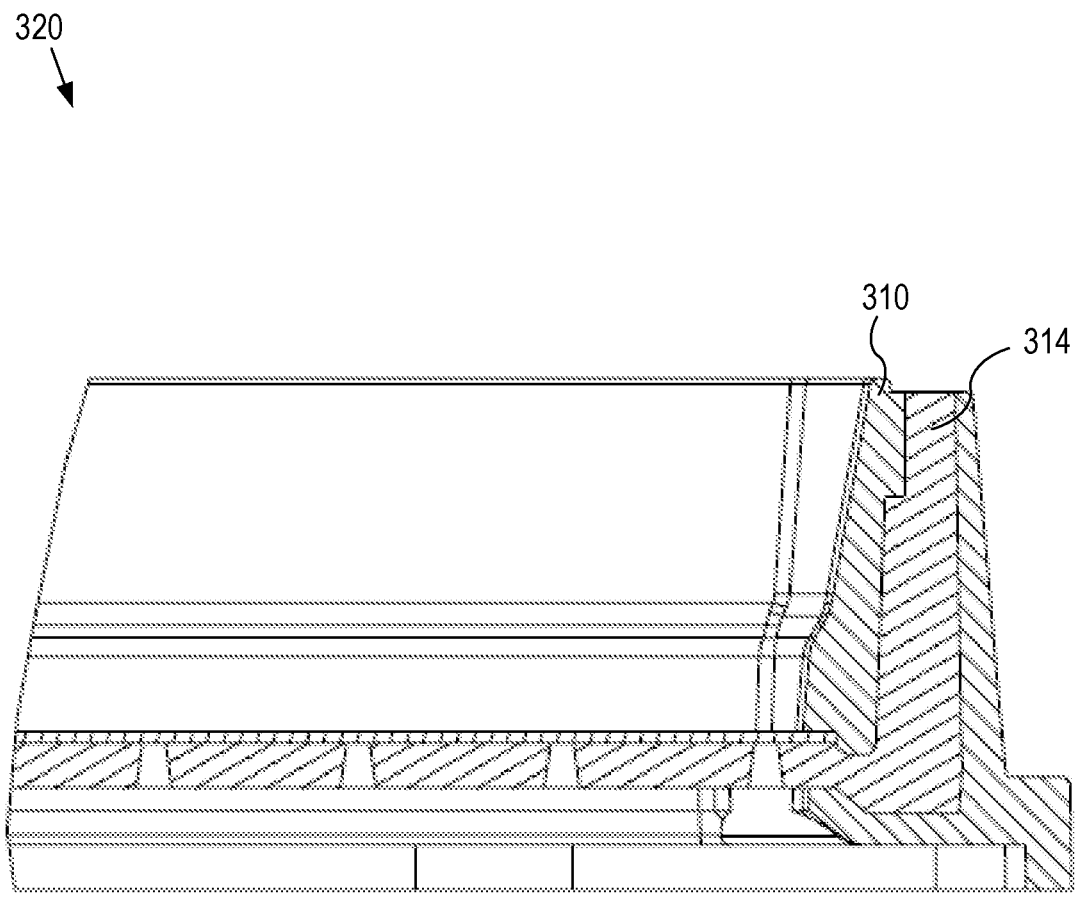
Figure 3F:
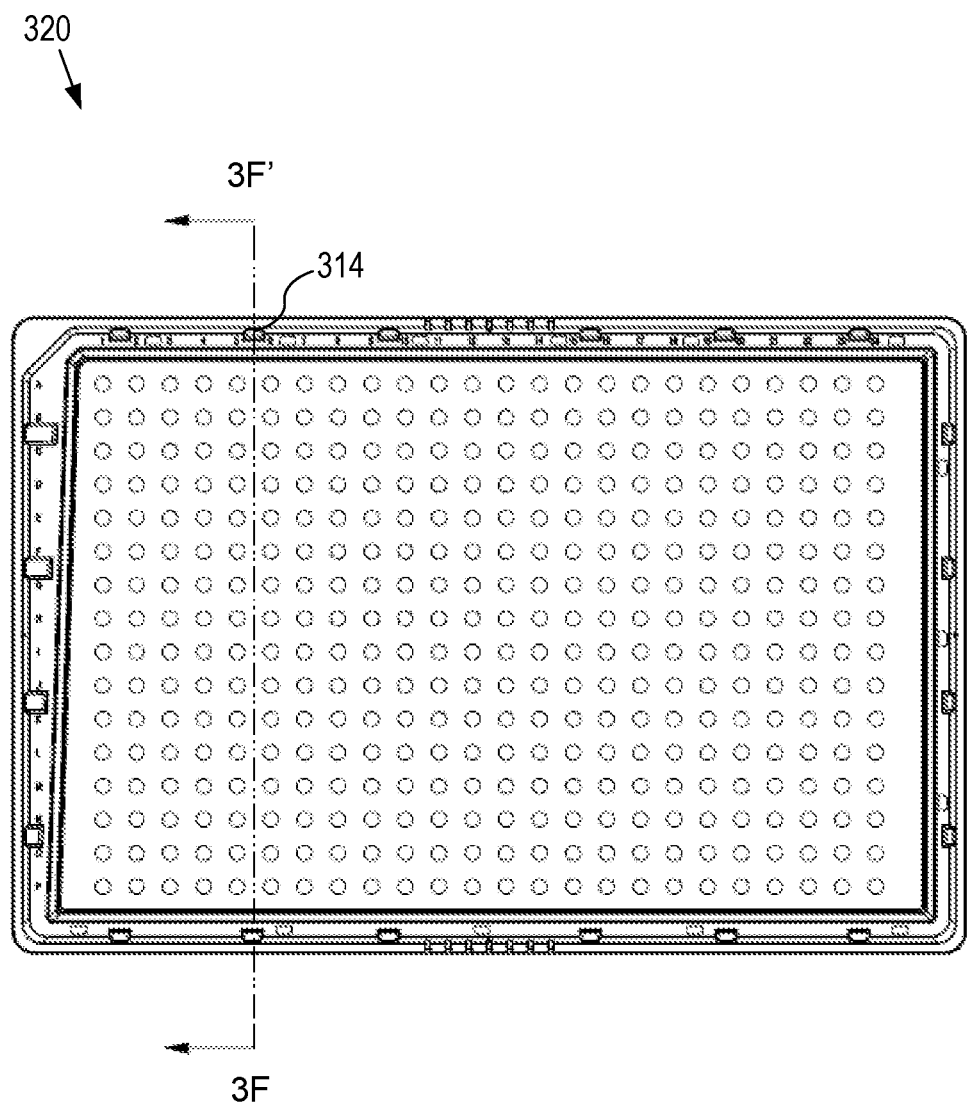

FIGS. 3B, 3D, and 3F are top perspective views of an exemplary array plate in accordance with some embodiments.

FIG. 3B also indicates a line 3B-3B' across the array plate 320. The line 3B-3B' traverses a plurality of the discrete through holes in the sheet layer of the first structure 202. The line 3B-3B' corresponds to the cross-sectional view illustrated in FIG. 3C.

FIG. 3C is a cross-sectional view of the exemplary array plate 320 corresponding to a section indicated in FIG. 3B in accordance with some embodiments. FIG. 3C-1 is a partial sectional view of a side wall region of the exemplary array plate 320 illustrated in FIG. 3C. FIGS. 3C and 3C-1 show that, in some embodiments, at least a portion of the first structure 202 is covered by the third structure 310 so that the first structure 202 is securely coupled, and any leak or retention of a liquid solution along the line between the first structure 202 and the third structure 310.

FIG. 3D also indicates a line 3D-3D' across the array plate 320. The line 3D-3D' corresponds to the cross-sectional view illustrated in FIG. 3E. The line 3D-3D' traverses the pins 314 in the vertical structures of the second structure 204. The line 3D-3D' corresponds to the cross-sectional view illustrated in FIG. 3E.

FIG. 3E is a cross-sectional view of the exemplary array plate 320 corresponding to a section indicated in FIG. 3D in accordance with some embodiments. FIG. 3E-1 is a partial sectional view of a side wall region (corresponding a circle illustrated in FIG. 3E) of the exemplary array plate 320 illustrated in FIG. 3E. As illustrated in FIG. 3E, in some embodiments, the pin 314 extends through the third structure 310 so that a top of the pin 314 is exposed.

FIG. 3F also indicates a line 3F-3F' across the array plate 320. The line 3F-3F' corresponds to the cross-sectional view illustrated in FIG. 3E. The line 3F-3F' traverses vertical indentations 314 on the side walls. The line 3F-3F' corresponds to the cross-sectional view illustrated in FIG. 3G.

Figure 3G:
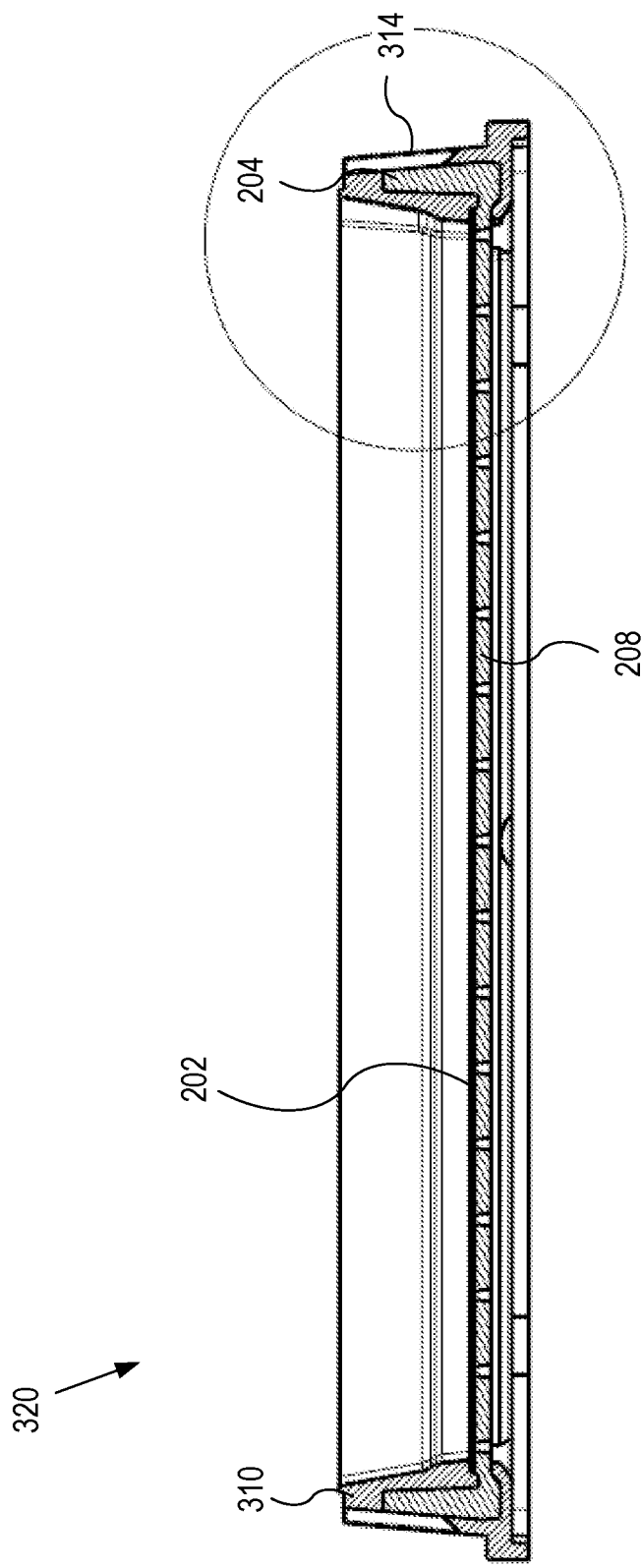
FIG. 3G is a cross-sectional view of the exemplary array plate corresponding to a section indicated in FIG. 3F in accordance with some embodiments.
Figures 1, 3G:
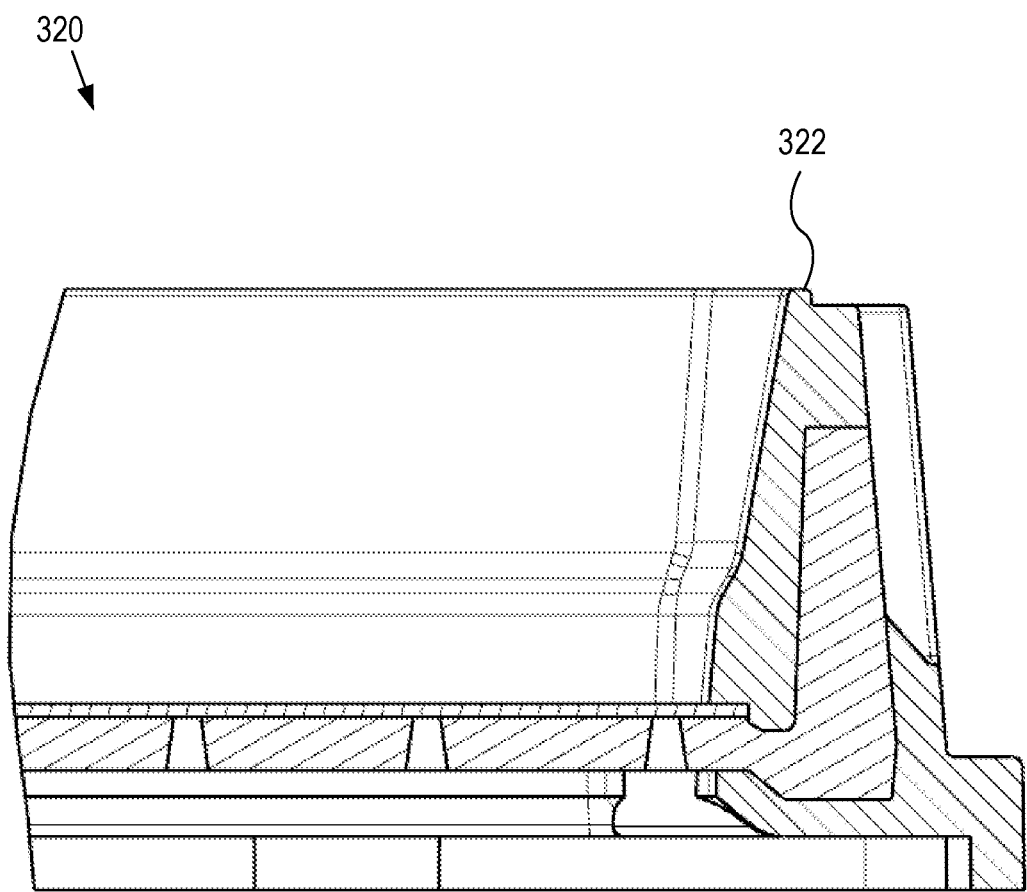

FIG. 3G is a cross-sectional view of the exemplary array plate corresponding to a section indicated in FIG. 3F in accordance with some embodiments. FIG. 3G-1 is a partial sectional view of a side wall region (corresponding to a circle illustrated in FIG. 3G) of the exemplary array plate 320 illustrated in FIG. 3G. In some embodiments, the one or more side walls each have an inner surface, an outer surface, a bottom adjacent the sheet layer of the first structure 202, and a top surface opposite the bottom, and a respective side wall of the one or more side walls includes one or more lips 322 on the top surface, at least one of the one or more lips aligned with the inner surface of the respective side wall.

Figure 3H:
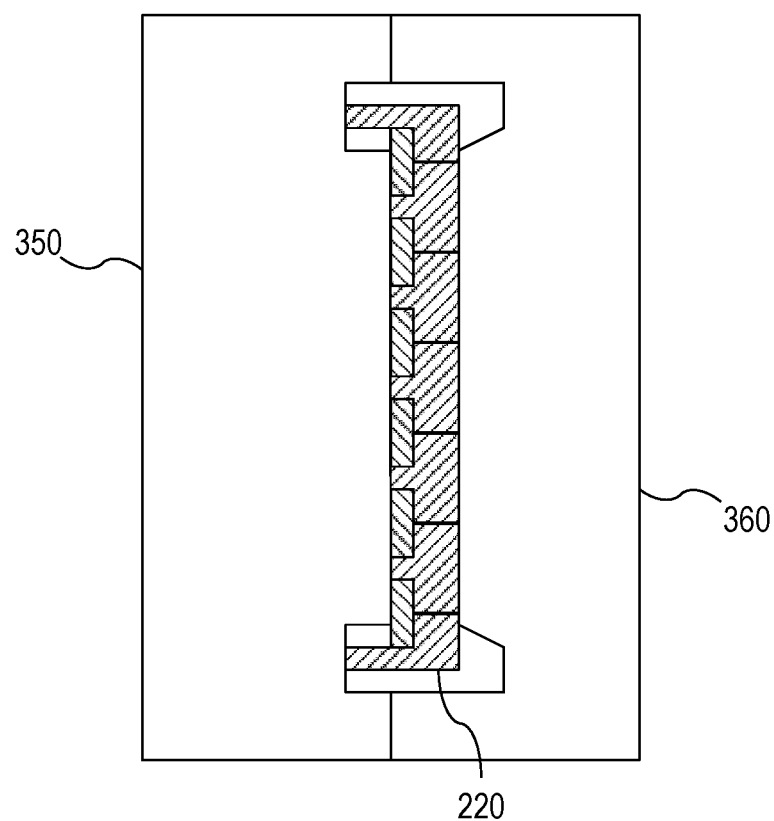
FIGS. 3H-3J are schematic diagrams illustrating selected steps for manufacturing an exemplary array plate in accordance with some embodiments.
Figure 3I:
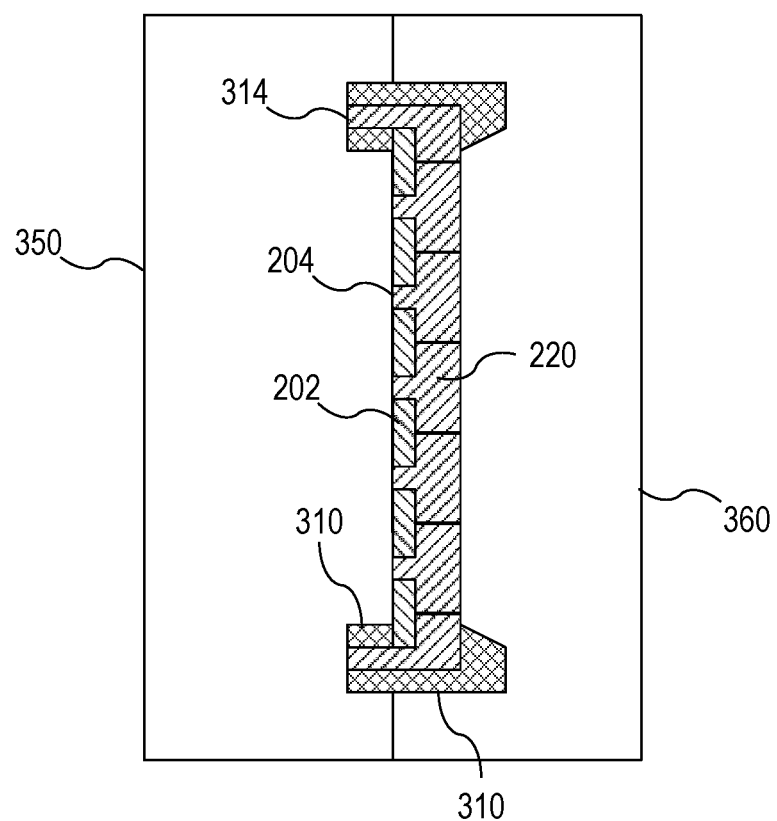
Figure 3J:
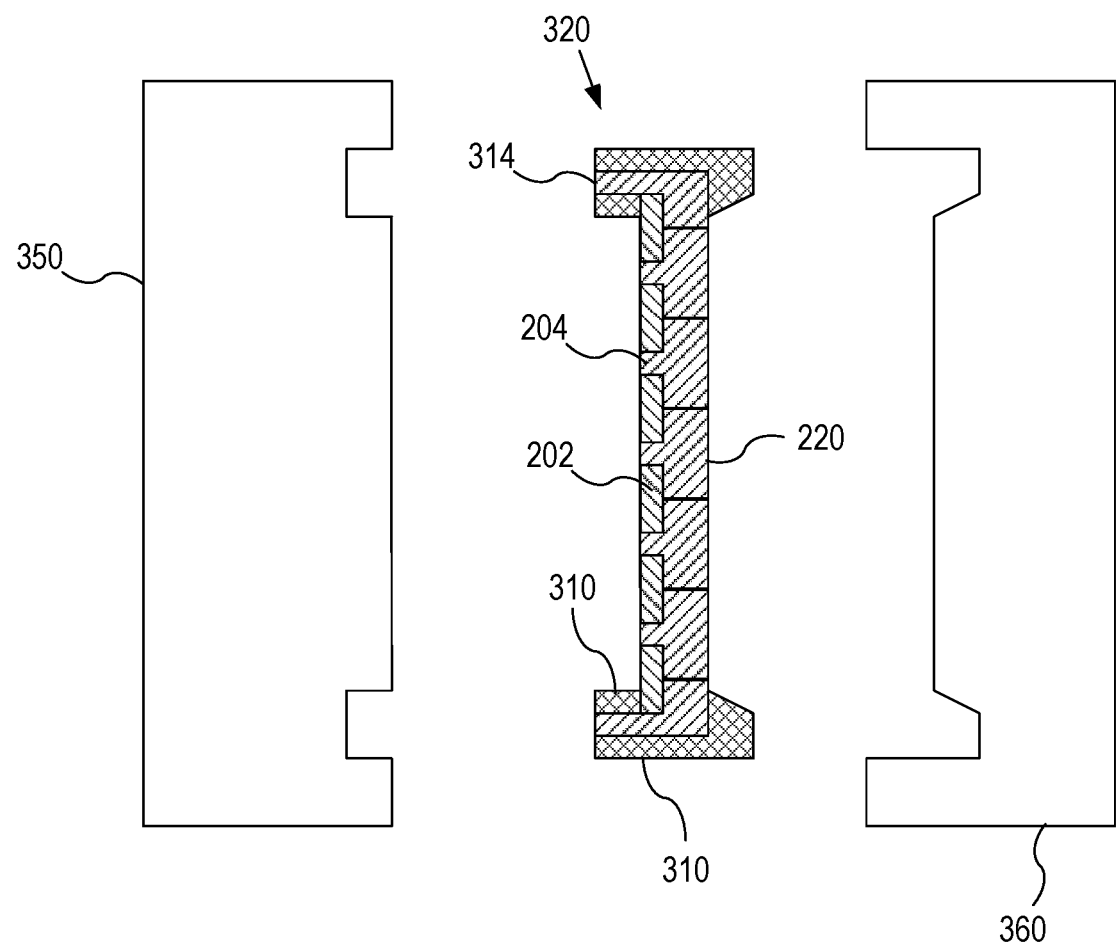

FIGS. 3H-3J are schematic diagrams illustrating selected steps for manufacturing an exemplary array plate with a second molding process in accordance with some embodiments. The elements in FIGS. 3H-3J are not drawn to scale.

FIG. 3H illustrates that the combination 220 of the first structure 202 and the second structure 204 is located in a cavity formed by a third mold component 350 and a fourth mold component 360.

FIG. 3I illustrates that the cavity formed by the third mold component 350 and the fourth mold component 360 is filled with a heated second plastic material. In some embodiments, the second plastic material is distinct from the plastic material used to form the second structure. In some embodiments, the second plastic material is identical to the plastic material used to form the second structure. In some embodiments, the second plastic material has a glass transition temperature lower than the glass transition temperature of the plastic material used for the second structure 204. This reduces the glass transition of the plastic material in the second structure 204 during the second molding process so that the second structure 204 maintains its shape and flatness during the second molding process. Exemplary glass transition temperatures are ~95° C. for polystyrene, ~130° C. for polyfluorotetraethylene, and 145-150° C. for polycarbonates. The glass transition temperature of cyclic olefin copolymer may exceed 150° C. In some embodiments, the melting temperature for the second plastic material is typically not higher than 200° C.

Once the second plastic material is cooled, the third structure 310 is formed. The third structure 310 is coupled with the combination 220 of the first structure 202 and the second structure 204. In some embodiments, the third structure 310 covers at least the one or more vertical structures of the second structure 204. In some embodiments, the third structure 310, when included, covers at least a portion of an inner surface of respective vertical structures 204, thereby forming one or more side walls. In other words, in such embodiments, the reservoir of the array plate 320 is defined by the third structure 310 on the sides, and the first structure 202 and the second structure 204 on the bottom. In some embodiments, a respective side wall of the one or more side walls has 1-8 mm, 2-5 mm, 2-4 mm, 2-3 mm, or 3-4 mm width. In some embodiments, a respective side wall of the one or more side walls has 1-10 mm, 2-9 mm, 3-8 mm, 4-7 mm, or 5-6 mm height.

In some embodiments, the one or more side walls each have an inner surface, an outer surface, a bottom adjacent the sheet layer of the first structure 202, and a top surface opposite the bottom, and a respective side wall of the one or more side walls includes one or more vertical indentations 314 (FIG. 3G) along the outer surface of the respective side wall.

In some embodiments, the one or more side walls are made of a hydrophobic material of a surface tension lower than 35 dynes/cm (e.g., hydrocarbon polymer, polypropylene, polytetrafluoroethylene, and their derivative, etc.). In some embodiments, the one or more side walls are made of a hydrophobic material of a surface tension lower than 25 dynes/cm.

In some embodiments, the one or more side walls each have an inner surface, an outer surface, a bottom adjacent the sheet layer of the first structure, and a top surface opposite the bottom, and the inner surface of a respective side wall of the one or more side walls is coated to expose a hydrophobic surface of a surface tension lower than 35 dynes/cm.

Array plates with the one or more side walls made with an elastic material can better handle thermal stress. Thus, in some embodiments, the hardness of the second plastic material is Shore A hardness of 85 or less. In some embodiments, the hardness of the second plastic material is Shore A hardness of 80 or less. In some embodiments, the hardness of the second plastic material is Shore A hardness of 75 or less. In some embodiments, the second plastic material has a tensile modulus of less than 2 GPa.

FIG. 3J illustrates that the array plate 320 is released from the third mold component 350 and the fourth mold component 360. In some embodiments, releasing the array plate 320 from the third mold component 350 includes pushing the plurality of pins 214 of the second structure 204. In some embodiments, the second structure 204 and the plurality of pins 214 of the second structure 204 are made of a stiffer material (e.g., a material with a higher elastic modulus, such as a spring constant, Young's modulus, etc.) than the third structure 310.

Although FIGS. 3H-3J illustrate forming the array plate 320 by a molding process, the array plate 320 may be manufactured by interposing the combination 220 of the first structure 202 and the second structure 204 between a top layer and a bottom layer, both of which are prefabricated, and attaching the top layer and the bottom layer to each other and/or to the combination 220 of the first structure 202 and the second structure 204.

Although FIGS. 2E-2H and FIGS. 3H-3J illustrate manufacturing an exemplary array plate using two-step molding processes, it is also possible to make an array plate with a single molding process.

In some embodiments, the one or more vertical structures formed during the first molding process may be configured to form one or more side walls, thereby eliminating the need for a second molding process to form one or more side walls over the one or more vertical structures.

Alternatively, in some embodiments, the first structure 202 includes one or more vertical structures (e.g., the first structure 202 includes a tray that has the sheet layer and one or more vertical structures, such as short walls, along the periphery of the sheet layer). In such embodiments, the molding step to form the vertical structures is skipped. In a molding step for forming one or more side walls, the first structure 202 is placed inside a mold, and a heated plastic is introduced to form one or more side walls over the one or more vertical structures of the first structure.

Figure 4A:
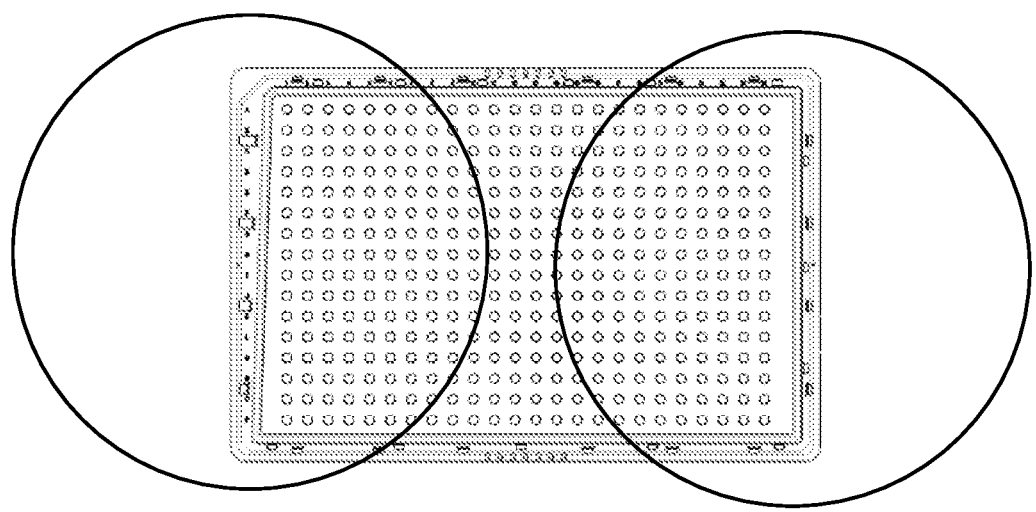
FIG. 4A is a top perspective view of an exemplary array plate in accordance with some embodiments.
Figure 4B:
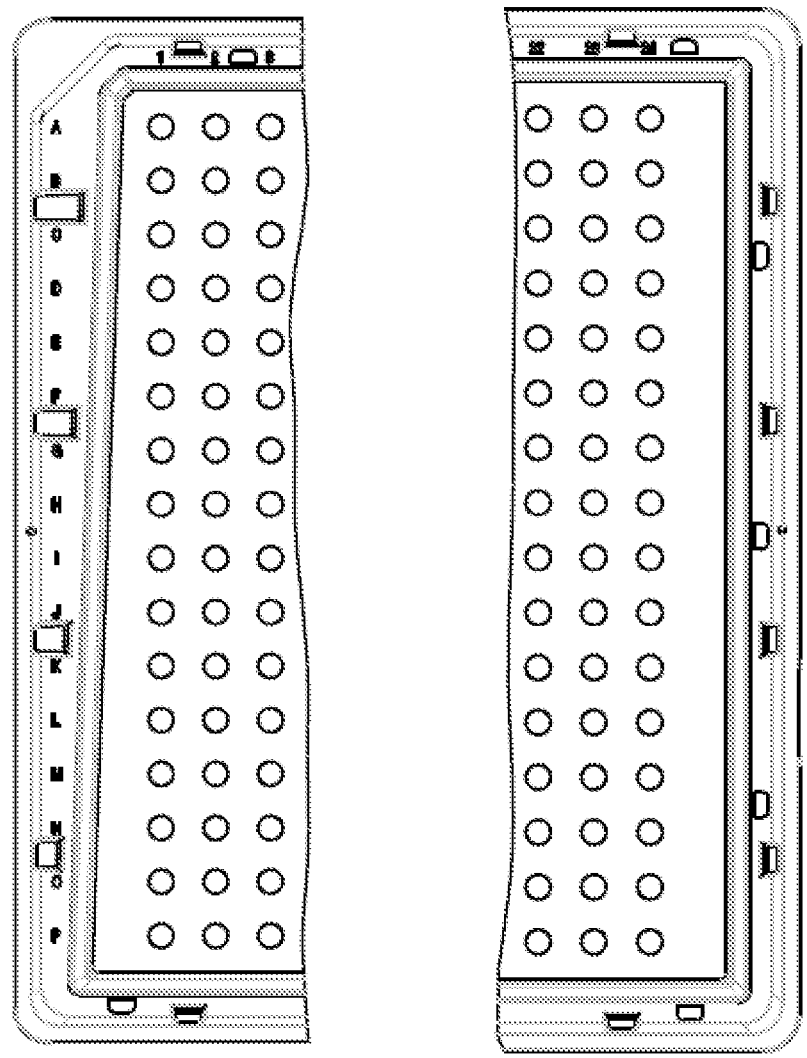
FIG. 4B are partial top views of an exemplary array plate in accordance with some embodiments.

FIG. 4A is a top perspective view of an exemplary array plate in accordance with some embodiments. FIG. 4B are partial top views of an exemplary array plate, corresponding to regions indicated with circles in FIG. 4A, in accordance with some embodiments.

When the inner side walls and the base layer form sharp corners (e.g., the inner side walls and the base layer form 90 degree angle), the sharp corners hold more residual wash solution due to increased surface interaction, i.e. adhesion between the plastic surface and the solution. Therefore, in some embodiments, the contact lines between the inner side walls and the base layer of the second structure have a curved transition (e.g., rounded) as shown in FIG. 4. The rounded four corners of the circumferential wall reduce residual solution after a washing process.

FIGS. 4A-4B illustrate that, in some embodiments, at least one side wall is tilted outward an angle of 2-20 degrees so that the top of the side wall (e.g., the end of the side wall that is away from the base layer) is positioned outside the bottom of the side wall (e.g., the end of the side wall that is closer to the base layer). In some embodiments, all side walls are tilted by between 2-5 degrees.

Figure 5A:
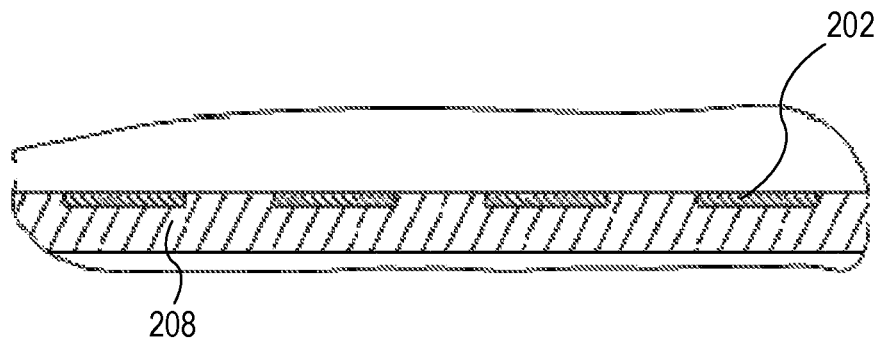
FIGS. 5A-5C are partial sectional views of exemplary array plates in accordance with various embodiments.
Figure 5B:
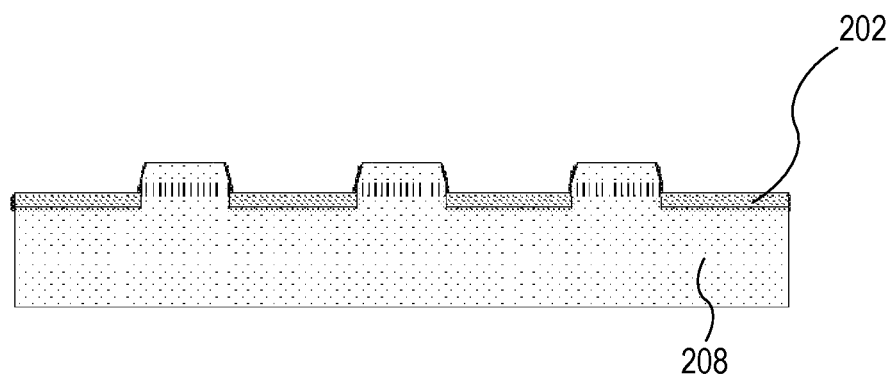
Figure 5C:
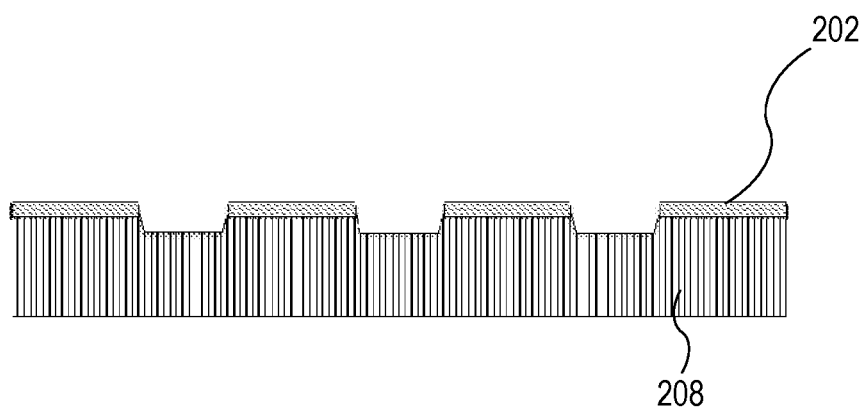

FIGS. 5A-5C are partial sectional views of exemplary array plates in accordance with various embodiments.

FIG. 5A illustrates that, in some embodiments, a top surface of the sheet layer of the first structure 202 is aligned with a top surface of the base layer 208 of the second structure 204. In some embodiments, the alignment of the top surface of the sheet layer of the first structure 202 and the top surface of the base layer 208 of the second structure 204 is achieved by using a mold component (e.g., the first mold component 230, FIG. 2E) that has a flat surface at least over a portion of the surface facing the top surface of the first structure 202. As shown in FIG. 2G, the heated plastic material fills up the plurality of discrete through holes defined in the first structure 202 up to the surface of the mold component 230 that faces the first structure 202, which is aligned with the top surface of the first structure 202.

In some embodiments, a mold surface that has indentations and/or protrusions is used. When the mold surface facing the top surface of the first structure 202 has indentations at locations corresponding to the plurality of discrete through holes defined in the first structure 202, the heated plastic material, when introduced into the cavity formed by mold components, fills the indentations. As a result, the top surface of the second structure is located above the top surface of the first structure as shown in FIG. 5B. Alternatively, when the mold surface facing the top surface of the first structure 202 has protrusions at locations corresponding to the plurality of discrete through holes defined in the first structure 202, the heated plastic material, when introduced into the cavity formed by mold components, underfills the discrete through holes defined in the first structure 202. As a result, the top surface of the second structure is located below the top surface of the first structure as shown in FIG. 5C. In some embodiments, the top surface of the second structure includes a plurality of concave surfaces. In some embodiments, a mold surface that has both indentations and protrusions is used. When the mold surface facing the top surface of the first structure 202 has indentations and protrusions at locations corresponding to the plurality of discrete through holes defined in the first structure 202, complex structures can be formed at the locations corresponding to the plurality of discrete through holes defined in the first structure 202.

FIGS. 6A-6D are flow charts representing a method 600 of making an array plate in accordance with some embodiments.

The method includes (602) providing a first structure. The first structure includes a sheet layer with a plurality of discrete through holes.

In some embodiments, the sheet layer includes (604) at least 50% of fluorocarbon by weight.

In some embodiments, the sheet layer includes (606) at least 90% of fluorocarbon by weight.

The method includes placing the first structure adjacent to a first surface of a mold. In some embodiments, the method includes (608) pressing the first structure against the first surface of the mold.

In some embodiments, includes placing the first structure adjacent to the first surface of the mold includes placing the first structure adjacent to the first surface of the mold with a plurality of pins. In some embodiments, pressing the first structure against the first surface of the mold includes pressing the first surface of the sheet layer against the first surface of the mold with a plurality of pins. In some embodiments, pressing the first structure against the first surface of the mold includes (610) pressing the first surface of the sheet layer against the first surface of the mold with a plurality of pins at least on the second surface of the sheet layer.

In some embodiments, the method includes (612) providing vacuum suction on the first surface of the sheet layer.

The method includes (614) providing a heated plastic material into the mold.

In some embodiments, the plastic material includes (616) polycarbonates.

In some embodiments, the plastic material includes (618) cyclic olefin polymer or copolymer.

The method includes cooling the plastic material to form a second structure. In some embodiments, the method includes (620, FIG. 6B) cooling the plastic material to form a second structure so that the first structure and the second structure are coupled. The second structure includes a base layer. In some embodiments, the second structure includes a base layer and one or more vertical structures along a periphery of the base layer, adjacent a first surface of the base layer. At least a portion of a first surface of the sheet layer of the first structure is exposed from the second structure, and a second surface of the sheet layer, opposite to the first surface of the sheet layer, is embedded in the base layer of the second structure adjacent the first surface of the base layer.

In some embodiments, the plastic material of the second structure is (622) optically transparent.

In some embodiments, the method includes (624) coupling a third structure with at least the second structure over at least a portion of the one or more vertical structures, the third structure including one or more side walls.

In some embodiments, the one or more vertical structures of the second structure include (626) a plurality of pins vertically protruding from the rest of the one or more vertical structures.

In some embodiments, the method includes (628) molding the third structure over at least a portion of the one or more vertical structures with a second mold so as to couple the second structure and the third structure, and removing a combination of the second structure and the third structure from the second mold by pushing respective locations on the third structure that correspond to the plurality of pins of the second structure.

In some embodiments, the one or more side walls are (630) made of a plastic material that has a glass transition temperature lower than the glass transition temperature of (the material for) the second structure.

In some embodiments, the one or more vertical structures include (632) one or more side walls.

In some embodiments, the one or more side walls are (634, FIG. 6C) made of a material that has Shore A hardness of 85 or less.

In some embodiments, the one or more side walls each have (636) an inner surface, an outer surface, a bottom adjacent the sheet layer of the first structure, and a top surface opposite the bottom, and a respective side wall of the one or more side walls includes one or more lips on the top surface, at least one of the one or more lips aligned with the inner surface of the respective side wall.

In some embodiments, the one or more side walls each have (638) an inner surface, an outer surface, a bottom adjacent the sheet layer of the first structure, and a top surface opposite the bottom, and a respective side wall of the one or more side walls includes one or more vertical indentations along the outer surface of the respective side wall.

In some embodiments, the one or more side walls are (640) made of a hydrophobic material of a surface tension lower than 35 dynes/cm.

In some embodiments, the one or more side walls each have (642) an inner surface, an outer surface, a bottom adjacent the sheet layer of the first structure, and a top surface opposite the bottom, and the inner surface of a respective side wall of the one or more side walls is coated to expose a hydrophobic surface of a surface tension lower than 35 dynes/cm.

In some embodiments, the second structure includes (644) a plurality of holding locations, the method comprising aligning the first structure and the second structure so that the plurality of discrete through holes defined in the sheet layer of the first structure is offset from the plurality of holding locations in the second structure.

In some embodiments, the mold is configured (646, FIG. 6D) so that a top surface of the sheet layer of the first structure is aligned with a top surface of the base layer of the second structure.

In some embodiments, the mold is configured (648) so that a top surface of the sheet layer of the first structure is above a top surface of the base layer of the second structure.

In some embodiments, the mold is configured (650) so that a top surface of the sheet layer of the first structure is below a top surface of the base layer of the second structure.

In some embodiments, the first surface of the mold has (652) one or more of: a plurality of indentations and a plurality of protrusions corresponding to the plurality of discrete through holes defined in the sheet layer.

In some embodiments, at least one of the side walls includes (654) one or more handles, each handle comprising a plurality of parallel fins.

Many modifications and variations are possible in view of the above teachings. For example, in accordance with some embodiments, a method for making an array plate includes providing a first structure. The first structure including a sheet layer with a plurality of discrete through holes. The method includes pressing the first structure against a first surface of a mold, and providing a heated plastic material into the mold. The method includes cooling the plastic material to form a second structure so that the first structure and the second structure are coupled. The second structure includes a base layer and one or more side walls along a periphery of the base layer, adjacent a first surface of the base layer. At least a portion of a first surface of the sheet layer of the first structure is exposed from the third structure, and a second surface of the sheet layer, opposite to the first surface of the sheet layer, is embedded in the base layer of the second structure adjacent the first surface of the base layer.

In some embodiments, an array plate includes a first structure. The first structure including a sheet layer with a plurality of discrete through holes. The array plate also includes a second structure coupled to the first structure. The second structure including a base layer and one or more side walls along a periphery of the base layer, adjacent a first surface of the base layer. At least a portion of a first surface of the sheet layer of the first structure is exposed from the second structure, and a second surface of the sheet layer, opposite to the first surface of the sheet layer, is embedded in the base layer of the second structure adjacent the first surface of the base layer.

In accordance with some embodiments, a method for making an array plate includes providing a first structure. The first structure includes a sheet layer with a plurality of discrete through holes. The first structure also includes one or more vertical structures along a periphery of the sheet layer. The method includes pressing the first structure against a first surface of a mold, and providing a heated plastic material into the mold. The method includes cooling the plastic material to form a second structure so that the first structure and the second structure are coupled. The second structure includes a base layer and one or more side walls formed over the one or more vertical structures. At least a portion of a first surface of the sheet layer of the first structure is exposed from the third structure, and a second surface of the sheet layer, opposite to the first surface of the sheet layer, is embedded in the base layer of the second structure adjacent the first surface of the base layer.

In some embodiments, an array plate includes a first structure. The first structure including a sheet layer with a plurality of discrete through holes. The first structure also includes one or more vertical structures along a periphery of the sheet layer. The array plate also includes a second structure coupled to the first structure. The second structure including a base layer and one or more side walls formed over the one or more vertical structures. At least a portion of a first surface of the sheet layer of the first structure is exposed from the second structure, and a second surface of the sheet layer, opposite to the first surface of the sheet layer, is embedded in the base layer of the second structure adjacent the first surface of the base layer.

Operations and characteristics described above with respect to the method 600 are also applicable to these methods and apparatuses. For brevity, such operations and characteristics are not repeated herein.

Methods for Using the Array Plates

In some embodiments, a method for using an array plate includes providing the array plate, wherein the array plate defines a reservoir. The method includes storing a liquid medium in the reservoir of the apparatus so that the first surface of the sheet layer is covered by the liquid medium, and dispensing respective liquid droplets on respective locations on the base layer. The respective locations correspond to locations of the plurality of discrete through holes defined in the sheet layer, and the respective liquid droplets are immiscible with the liquid medium.

In some embodiments, the method also includes adding one or more solutions to one or more liquid droplets of the respective liquid droplets.

In some embodiments, the method also includes performing an immunoassay by: immobilizing one of one or more antibodies and one or more antigens in one or more respective liquid droplets to the base layer, and adding one or more solutions to the one or more respective liquid droplets of the respective liquid droplets. At least one of the one or more solutions includes the other of the one or more antibodies and the one or more antigens. The method also includes detecting a binding of the at least one antigen with at least one antibody in the one or more respective liquid droplets.

In some embodiments, the method includes washing the respective liquid droplets on the apparatus by: removing a portion of the liquid medium, adding a wash buffer to the reservoir, shaking the apparatus so that the wash buffer and the respective liquid droplets are mixed, draining at least a portion of the wash buffer from the reservoir, and providing a liquid medium in the reservoir of the apparatus so that the first surface of the sheet layer is covered by the liquid medium.

Array Slides

Figure 7:
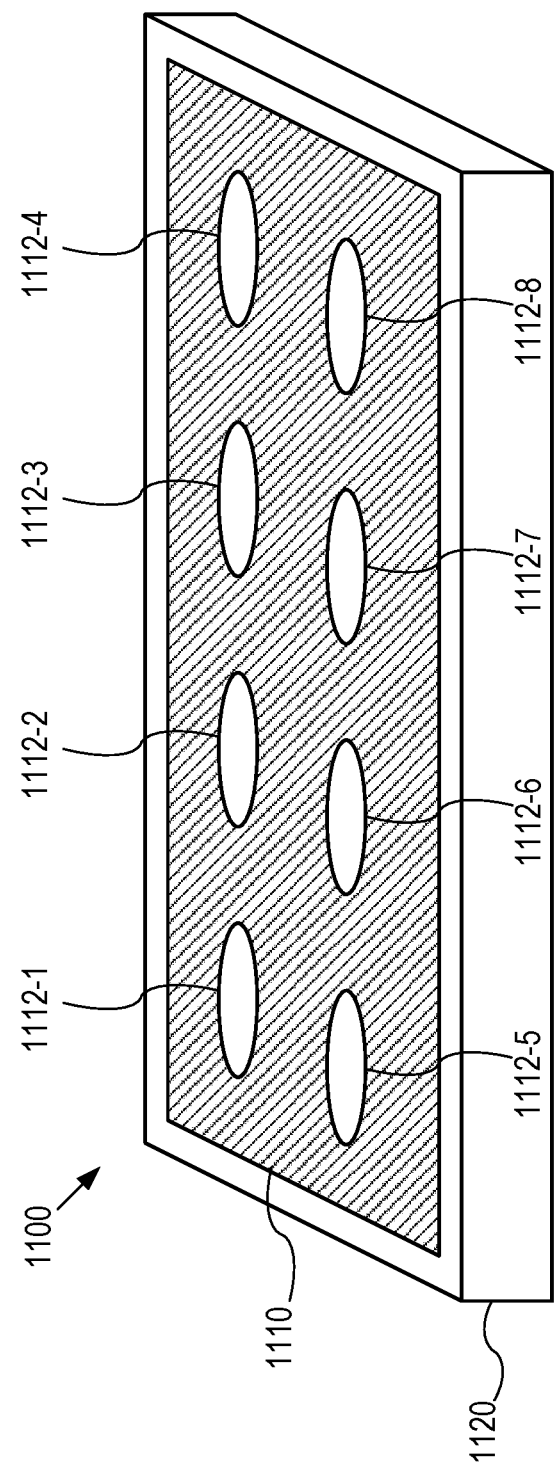
FIG. 7 is a perspective view of an exemplary array slide in accordance with some embodiments.

FIG. 7 is a perspective view of an exemplary array slide 1100 in accordance with some embodiments. The exemplary array slide 1100 includes at least a first structure 1110 (e.g., a sheet layer) and a second structure 1120 (e.g., a slide). The first structure 1110 includes fluorocarbon polymers. The first structure 1110 defines a plurality of discrete through-holes (e.g., 1112-1 through 1112-8). The second structure 1120 includes a plastic material (e.g., polycarbonate, cyclic olefin polymer or copolymer, polystyrene, etc.). The first structure 1110 covers one or more portions of the second structure 1120. One or more portions of the second structure 1120 are not covered by the first structure 1110. Thus, one or more portions of the second structure 1120 are exposed through the plurality of discrete through-holes 1112 defined by the first structure 1110. The details of the first structure and the second structure are described with respect to FIGS. 8A-8C, 10A-10C, and 11A-11B, below.

Figure 8A:
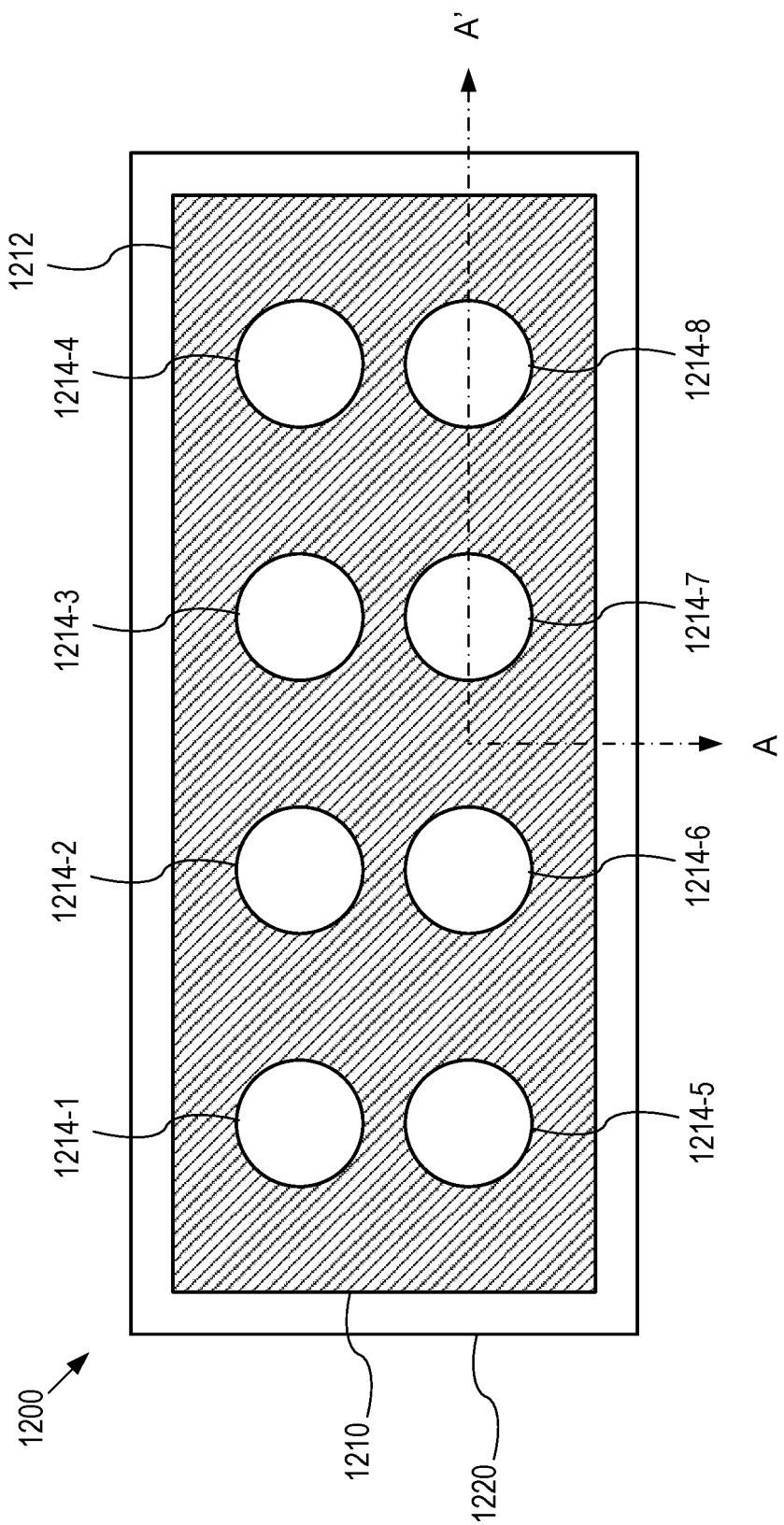
FIG. 8A is a top-down view of an exemplary array slide in accordance with some embodiments.

FIG. 8A is a top-down view of an exemplary array slide 1200 in accordance with some embodiments. The array slide 1200 includes a first structure 1210 and a second structure 1220. In some embodiments, the first structure 1210 has one or more characteristics of the first structure 1110 described above with respect to FIG. 7. In some embodiments, the second structure 1220 has one or more characteristics of the second structure 1120 described above with respect to FIG. 7. The descriptions of such characteristics are not repeated for brevity.

The first structure 1210 includes a sheet layer 1212 that typically has a square or rectangular shape (e.g., a sheet of PTFE cut into a rectangle). Alternatively, the sheet layer of the first structure 1210 may have a round shape, such as a disc, or any other shape (e.g., a generally rectangular shape with one or more chamfered corners).

The sheet layer 1212 defines a plurality of discrete through-holes (e.g., 1214-1 through 1214-8). Typically, a discrete through-hole 1214 has a round shape (e.g., a circle or an oval). Alternatively, the discrete through-hole 1214 may have a non-round shape (e.g., a triangle, a square, a rectangle, a pentagon, a hexagon, an octagon, a star, a slit, etc.). In some embodiments, the plurality of discrete through-holes 206 are formed by punching holes through the sheet layer 1212. Typically, the plurality of discrete through-holes have substantially the same diameter (e.g., with less than 50, 30, 20, 10, or 5% variation among the holes). In some embodiments, a respective through-hole has a 1 mm-5 mm diameter, or 2 mm-3 mm diameter. In some embodiments, the discrete through-holes are arranged in a pre-defined pattern. For example, when 96 discrete through-holes are defined in the sheet layer 1212, the 96 discrete through-holes may be arranged in an 8×12 array. In another example, when 8 discrete through-holes are arranged in the sheet layer 1212, the 8 discrete through-holes may be arranged in a 2×4 array, as illustrated in FIG. 8A. In some embodiments, the discrete through-holes have a predefined spacing.

The second structure 1220 typically has a rectangular shape. For example, the second structure 1220 may have a shape and size of a microscope slide. However, the second structure 1220 may have a larger or smaller size than a microscope slide. In some embodiments, the second structure 1220 has a square shape. In some embodiments, the second structure 1220 has a non-rectangular shape (e.g., a disc or a generally rectangular shape with one or more chamfered corners).

FIG. 8A also indicates a line A-A' across the array slide 1200. The line A-A' corresponds to the cross-sectional view illustrated in FIG. 8B.

Figure 8B:
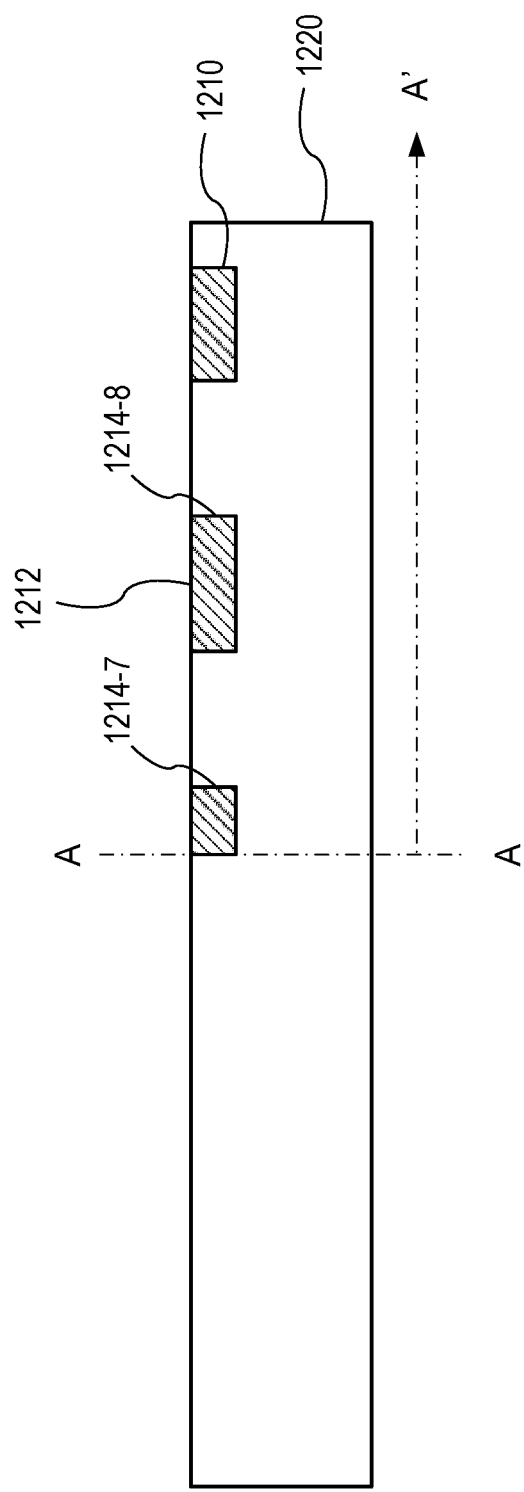
FIG. 8B is a partial cross-sectional view of an exemplary array slide in accordance with some embodiments.

FIG. 8B is a partial cross-sectional view of the exemplary array slide 1200 in accordance with some embodiments.

In some embodiments, the sheet layer 1212 solely constitutes the first structure 1210. In some other embodiments, the first structure 1210 includes additional features, such as one or more vertical structures (e.g., the first structure 1210 may be a tray including the sheet layer and one or more sidewalls) in addition to the sheet layer 1212.

In some embodiments, the sheet layer 1212 of the first structure 1210 has a uniform thickness across the sheet layer 1212. In some other embodiments, the sheet layer 1212 has a range of thicknesses across the sheet layer 1212. Typically, the thickness of the sheet layer 1212 is less than the width and length of the sheet layer 1212. In some embodiments, the thickness of the sheet layer 1212 is less than a predefined thickness. For example, the sheet layer has a thickness typically of 0.01-10 mm, 0.1-2 mm, 0.2-1 mm, or 1-2 mm.

In some embodiments, the sheet layer 1212 is a sheet of a preselected material. The preselected material typically includes a polymer (e.g., polytetrafluoroethylene, any other perfluorocarbon polymer, or any other fluorocarbon polymer). In some embodiments, the sheet layer 1212 includes a sheet of a preselected material. For example, the sheet layer 1212 may include multiple layers of different materials, wherein one of the multiple layers (e.g., typically a top layer) is a sheet of fluorocarbon (e.g., polytetrafluoroethylene). Alternatively, the sheet layer 1212 may include a core (e.g., a sheet metal) coated with fluorocarbon (e.g., polytetrafluoroethylene).

FIG. 8B also illustrates a cross-section of discrete through-holes 1214-7 and 1214-8 defined by the sheet layer 1212. As shown in FIG. 8B, a discrete through-hole has a first opening on a first planar surface of the sheet layer 1212 and a second opening on a second planar surface, opposite to the first planar surface, of the sheet layer 1212.

In some embodiments, the sheet layer 1212 includes at least 50% of fluorocarbon by weight. Alternatively, the sheet layer 1212 may include at least 80, 90, 95, or 99% of fluorocarbon by weight. In some embodiments, the sheet layer 1212 includes at least 90% of polytetrafluoroethylene by weight. Alternatively, the sheet layer 1212 may include at least 50, 80, 95, or 99% of polytetrafluoroethylene by weight.

In some embodiments, a top portion of the sheet layer 1212 includes at least 95% of fluorocarbon by weight. As used herein, a top portion of the sheet layer 1212 refers to a layer that is defined by an exposed surface of the sheet layer 1212 and a predefined thickness. Thus, the top portion includes the exposed surface of the sheet layer 1212 and has the predefined thickness. In some embodiments, a top surface of the top portion is the exposed surface of the sheet layer 1212 and the bottom surface of the top portion has the same shape and size as the top surface of the top portion. In some embodiments, the exposed surface of the sheet layer 1212 has a flatness of at most 400 μm. In some embodiments, the bottom surface of the sheet layer 1212 has a flatness of at most 400 μm. In some embodiments, the thickness of the top portion may be 1 μm or 100 nm. In some embodiments, the top portion of the sheet layer 1212 includes at least 99% of fluorocarbon by weight.

In some embodiments, at least 90% of the exposed portion of the first surface of the first structure 1210 (e.g., the surface of the sheet layer 1212 that faces away from the second structure) is covered by fluorocarbon. In some embodiments, at least 95% of the exposed surface is covered by fluorocarbon. In some embodiments, at least 99% of the exposed portion of the first surface is covered by fluorocarbon. The PTFE-matrix does not satisfy this requirement because the resin is included in the exposed portion of the first surface. In some embodiments, at least 90% of the exposed portion of the first surface is covered by PTFE. In some embodiments, at least 95% of the exposed portion of the first surface is covered by PTFE. In some embodiments, at least 99% of the exposed portion of the first surface is covered by PTFE.

In some embodiments, the exposed portion of the first surface is characterized by advancing and receding contact angles, for a liquid selected from a group including water, ethanol, and isopropanol. The advancing and receding contact angles for the selected liquid on the exposed portion of the first surface are substantially similar to advancing and receding contact angles for the selected liquid on PTFE (e.g., a PTFE sheet containing at least 99% PTFE by weight). For example, the difference between the advancing contact angle for the selected liquid on the exposed portion of the first surface and the advancing contact angle for the selected liquid on PTFE is less than 20% or 10% of the advancing and receding contact angles for the selected liquid on PTFE.

In some embodiments, a first surface (e.g., a surface facing away from the second structure 1220) of the first structure 1210 is roughened to increase the hydrophobicity and/or oleophobicity.

In some embodiments, the second structure 1220 includes a plurality of structures that correspond to the plurality of discrete through-holes in the first structure 1210.

The second structure 1220 typically includes a plastic material. In some embodiments, the plastic material includes polycarbonates. In some embodiments, the plastic material includes cyclic olefin polymer or copolymer or polystyrene.

In some embodiments, the plastic material of the second structure 1220 is optically transparent. This allows the second structure 1220 to be optically imaged from a bottom surface side of the second structure 1220.

Figure 8C:
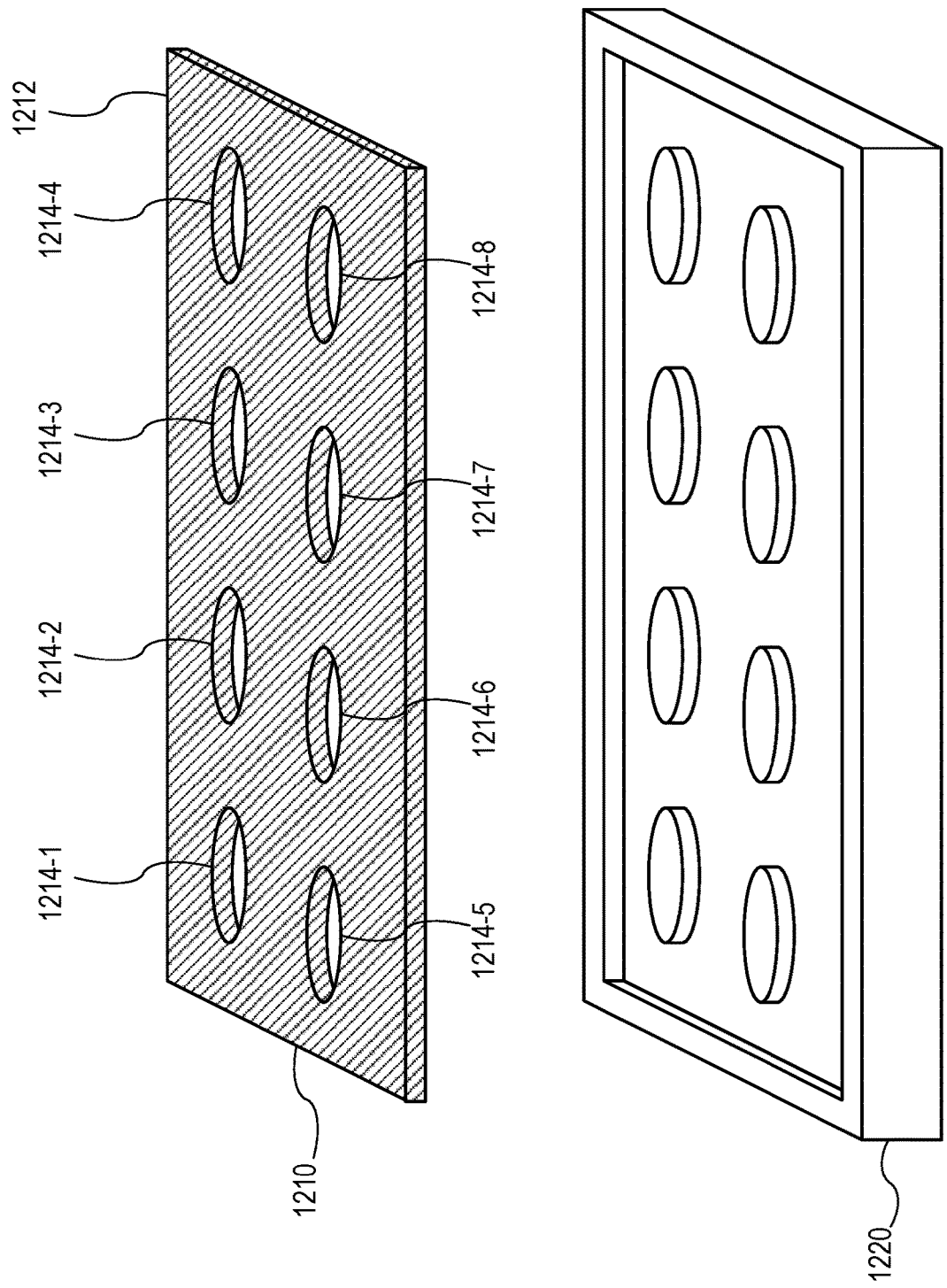
FIG. 8C is an exploded view of an exemplary array slide in accordance with some embodiments.

FIG. 8C is an exploded view of an exemplary array slide 1200 in accordance with some embodiments. In FIG. 8C, the plurality of discrete through-holes 1214 defined by the sheet layer 1212 of the first structure 1210 are shown. FIG. 8C also illustrates a plurality of protrusions in the second structure 1220 that correspond to the plurality of discrete through-holes 1214 defined by the sheet layer 1212.

Although the sheet layer 1212 is illustrated as having a width less than the width of the second structure 1220 and a length less than the length of the second structure 1220 in FIGS. 8A-8C, in some embodiments, the sheet layer 1212 has the same width and length as the second structure 1220. Thus, the sheet layer 1212 may run from one end of the second structure to the opposite end of the second structure 1220.

Methods for Making the Array Slides

FIGS. 9A-9D are schematic diagrams illustrating selected steps for manufacturing an exemplary array slide 1200 in accordance with some embodiments.

Figure 9A:
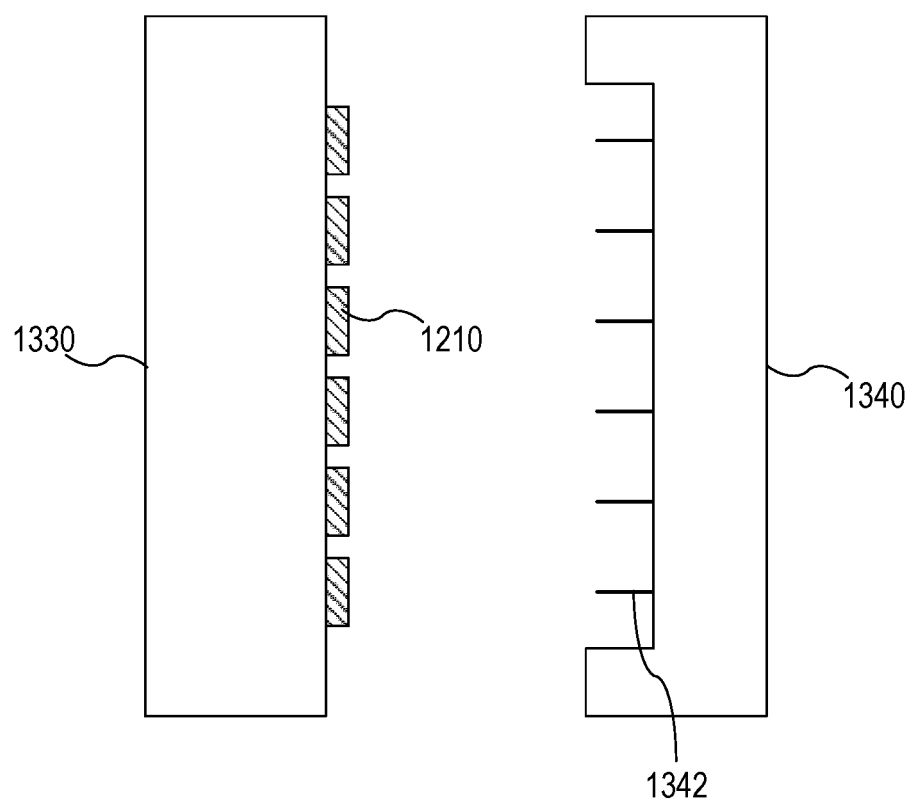
FIGS. 9A-9D are schematic diagrams illustrating selected steps for manufacturing an exemplary array slide in accordance with some embodiments.

FIG. 9A illustrates that the first structure 1210 is held in a first mold component 1330 by vacuum suction. The vacuum suction pulls the first structure 1210 toward the first mold component 1330 so that the first structure 1210 remains flat through the molding process. Typically, the vacuum suction is applied over a plurality of locations on the first structure 1210. The vacuum suction typically leaves one or more indentations on the surface of the first structure 1210 facing the first mold component 1330. In some embodiments, the first mold component 1330 includes a plurality of vacuum holes (not shown).

In some embodiments, a plurality of pins 1342 coupled with the second mold component 1340 are spring loaded so that the plurality of pins 1342 are configured to apply force on the first structure 1210 toward the first mold component 1330 when the first mold component 1330 and the second mold component 1340 are assembled together.

In some embodiments, the bottom surface of the first structure 1210 (e.g., the surface facing the second mold component 1340) is treated, typically before the first structure 1210 is held in the first mold component 1330, to facilitate coupling with the second structure 1220. In some embodiments, the bottom surface of the first structure 1210 is treated to reduce the hydrophobicity (e.g., increase the surface tension) of the first structure 1210. In some embodiments, the bottom surface of the first structure 1210 is roughened to increate the contact area with the second structure 1220.

In some embodiments, the first mold component 1330 has a flat surface or a portion of the surface that is flat facing the first structure 1210. In some embodiments, the surface of the first mold component 1330 has protrusions and/or indentations, the impact of which is described above with respect to FIGS. 5A-5C. For brevity, these descriptions are not repeated herein.

Figure 9B:
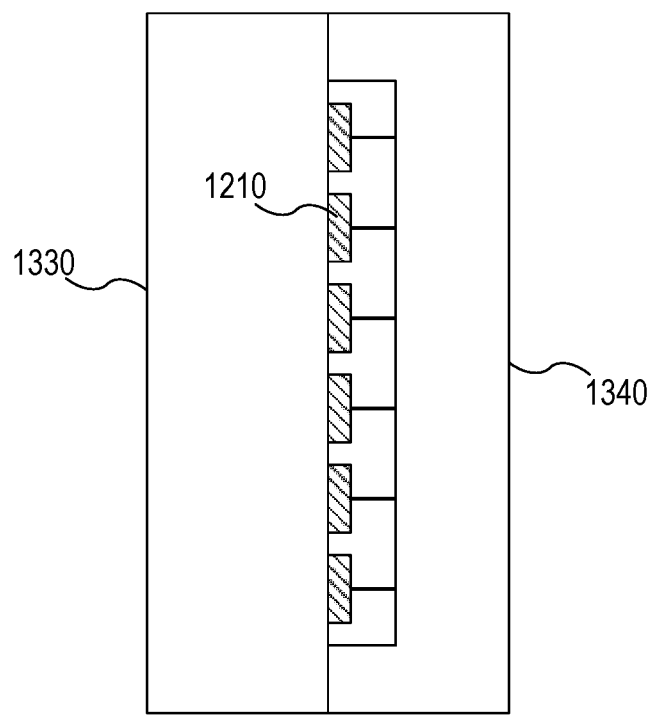

FIG. 9B illustrates that the first mold component 1330 and the second mold component 1340 are assembled, thereby forming a cavity inside, into which a heated plastic material is introduced for a molding process.

Figure 9C:
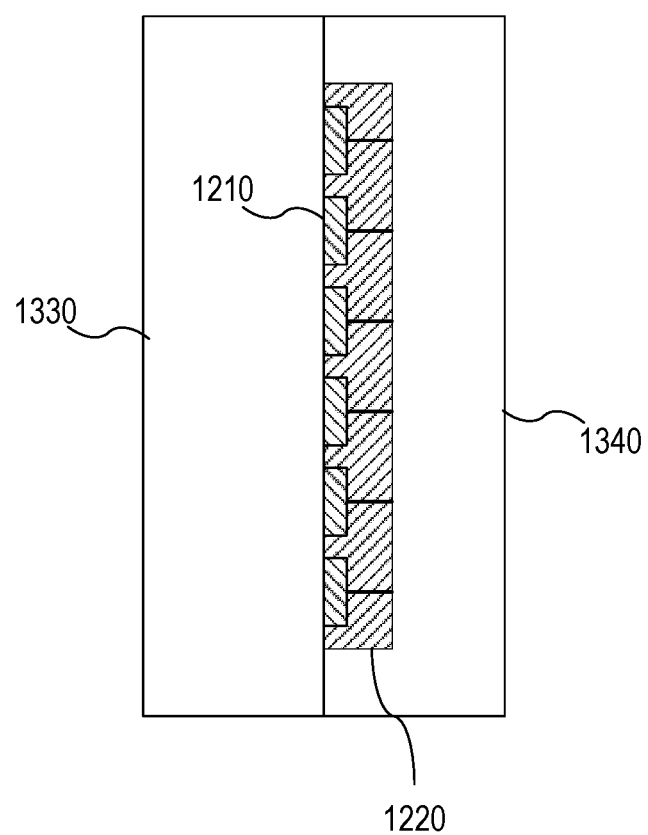

FIG. 9C illustrates that a heated plastic material is introduced into the cavity. In some embodiments, the plastic material includes polycarbonates. In some embodiments, the plastic material includes cyclic olefin polymer or copolymer or polystyrene. The heated plastic material fills the cavity.

Once the heated plastic material is cooled, the plastic material forms the second structure 1220. When the second structure 1220 is formed, the second structure 1220 is coupled with the first structure 1210 so as to form the array slide 1200.

Figure 9D:
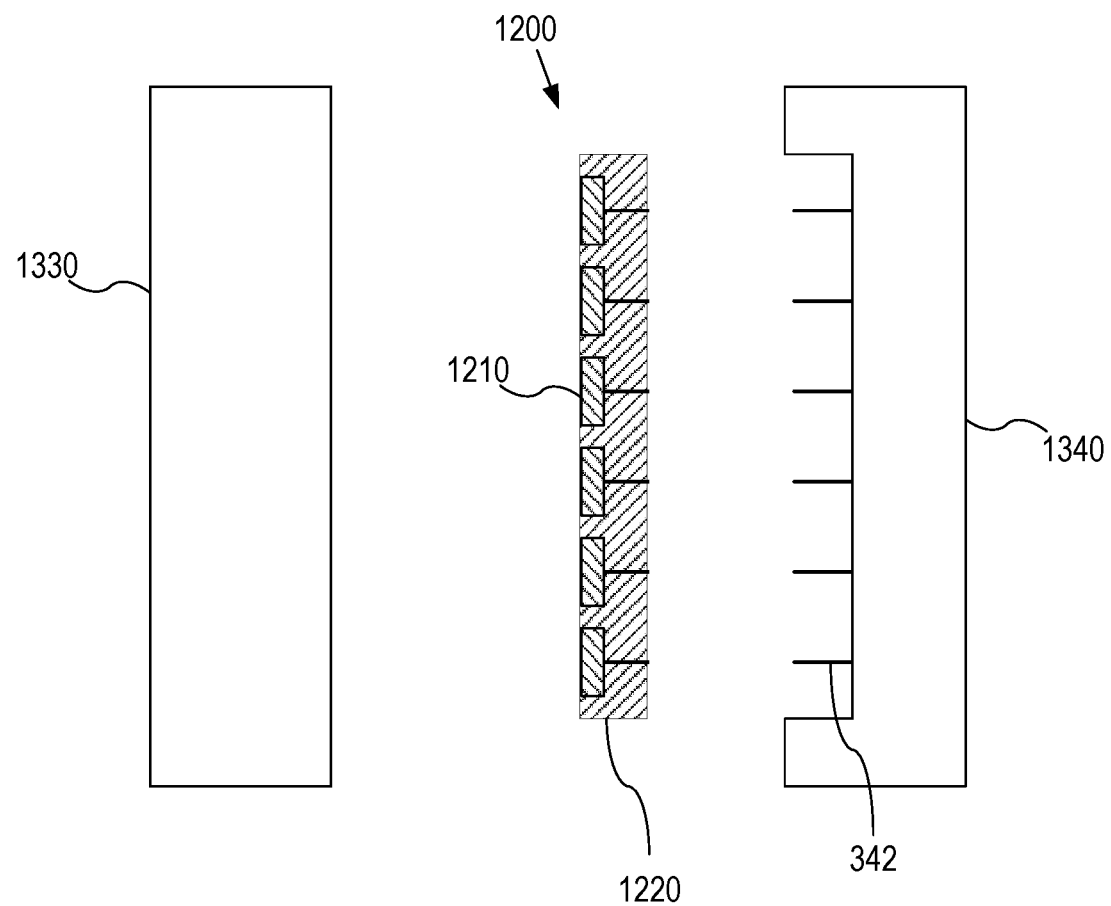

FIG. 9D illustrates that the array slide 1200 is removed from the first mold component 1330 and the second mold component 1340.

Note that the array slide 1200 removed from the first mold component 1330 and the second mold component 1340 has pin marks corresponding to the plurality of pins 1342 coupled with the second mold component 1340. When optical measurements (e.g., collection of optical images or optical signals) are performed through respective portions of the second structure 1220 corresponding to the plurality of discrete through-holes defined in the first structure 1210, if the pin marks are located at the respective portions of the second structure 1220 corresponding to the plurality of discrete through-holes defined in the first structure 1210, the pin marks interfere optical measurements. Thus, to avoid the interference by the pin marks, the plurality of pins 1342 are located offset from the plurality of discrete through-holes defined in the first structure 1210.

Although FIGS. 9A-9D illustrate forming the array slide 1200 by using both the vacuum suction and the plurality of pins 1342, in some embodiments, only one of the vacuum suction and the plurality of pins 1342 is used. For example, the vacuum suction may be used without using the plurality of pins 1342. Alternatively, the plurality of pins 1342 may be used without the vacuum suction.

Additional Features of Array Slides

Figure 10A:
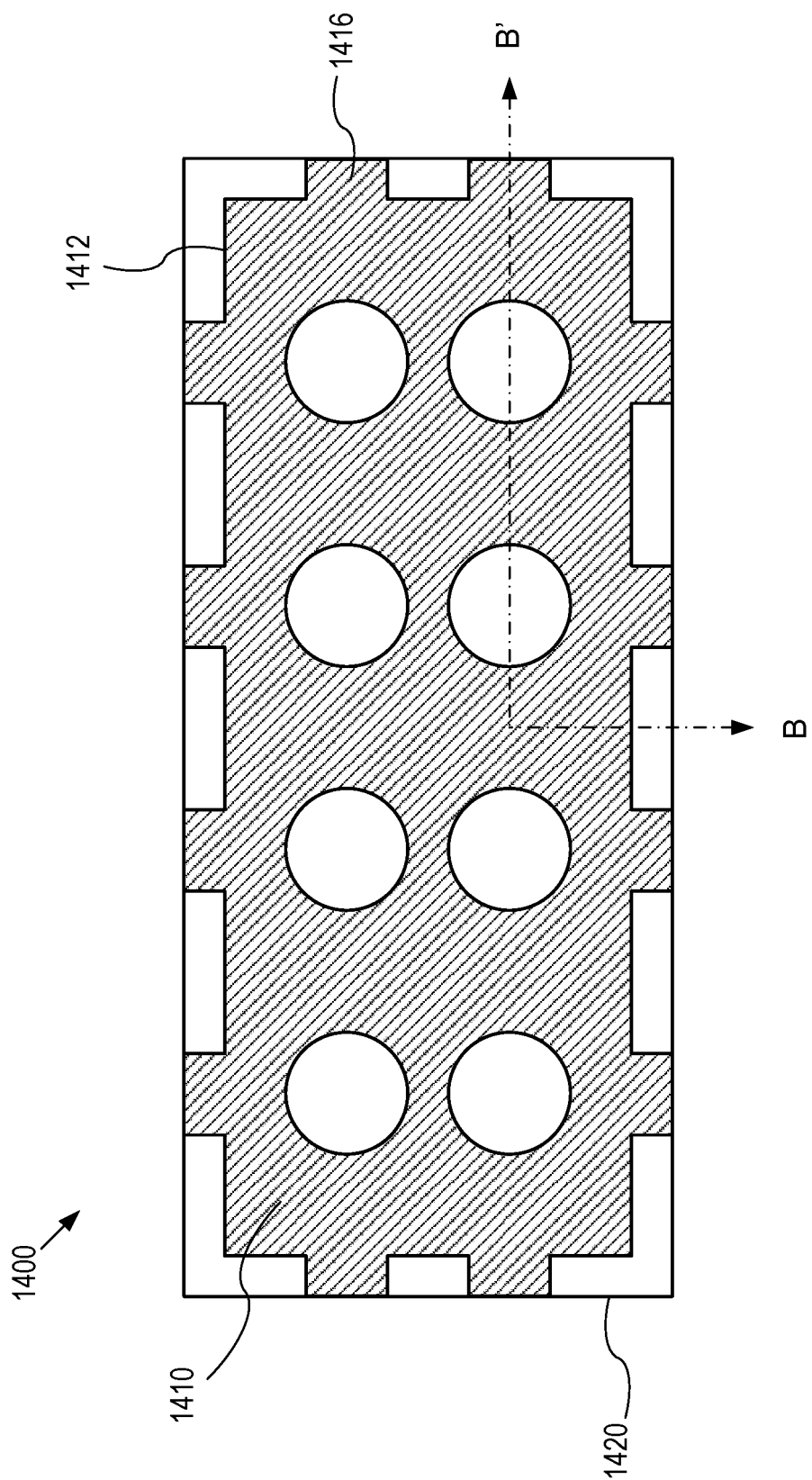
FIG. 10A is a top-down view of an exemplary array slide in accordance with some embodiments.

FIG. 10A is a top-down view of an exemplary array slide 1400 in accordance with some embodiments. The array slide 1400 has one or more characteristics of the array slide 1200 described above with respect to FIGS. 8A-8C. The descriptions of such characteristics are not repeated for brevity.

The array slide 1400 has a first structure 1410 and a second structure 1420. The first structure 1410 includes a sheet layer 1412 and one or more connectors 1416. In some embodiments, the one or more connectors 1416 are integrated in the sheet layer 1412.

FIG. 10A also indicates a line B-B' across the array slide 1400. The line B-B' corresponds to the cross-sectional view illustrated in FIG. 10B.

Figure 10B:
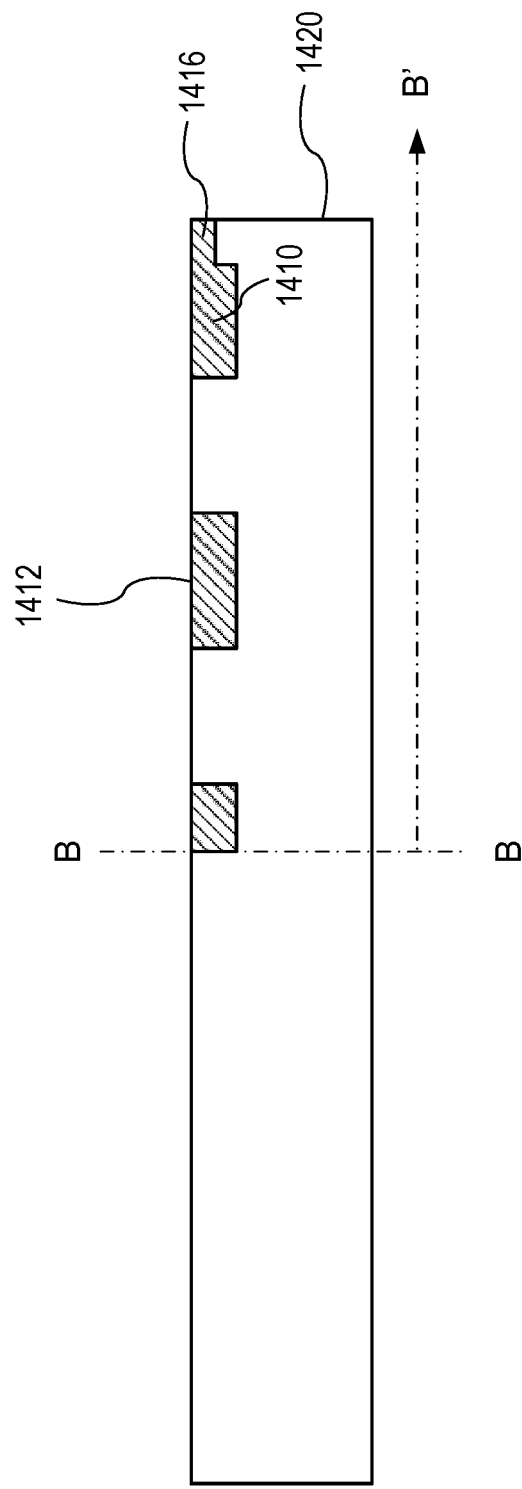
FIG. 10B is a partial cross-sectional view of an exemplary array slide in accordance with some embodiments.

FIG. 10B is a partial cross-sectional view of the exemplary array slide 1400 in accordance with some embodiments. The partial cross-sectional view shown in FIG. 10B has one or more characteristics of the partial cross-sectional view shown in FIG. 8B. The descriptions of such characteristics are not repeated for brevity.

The first structure 1410 includes one or more connectors 1416. In some embodiments, at least one of the connectors 1416 is positioned so that its top surface is aligned with the top surface of the sheet layer 1412. However, as explained below with respect to FIG. 11B, at least one of the connectors 1416 may be positioned that its top surface is positioned below the top surface of the second structure 1412 (e.g., the top surface of the connectors 1416 is embedded in the second structure 1420).

The one or more connectors 1416 serve multiple functions. For example, the one or more connectors 1416, in particular when the one or more connectors 1416 are embedded in the second structure 1420, prevents the peeling of the first structure 1410 from the second structure 1420. The one or more connectors 1416 also allow first structures for multiple array slides to be held together in the molding cavity. This facilitates the manufacturing of multiple array slides.

Figure 10C:
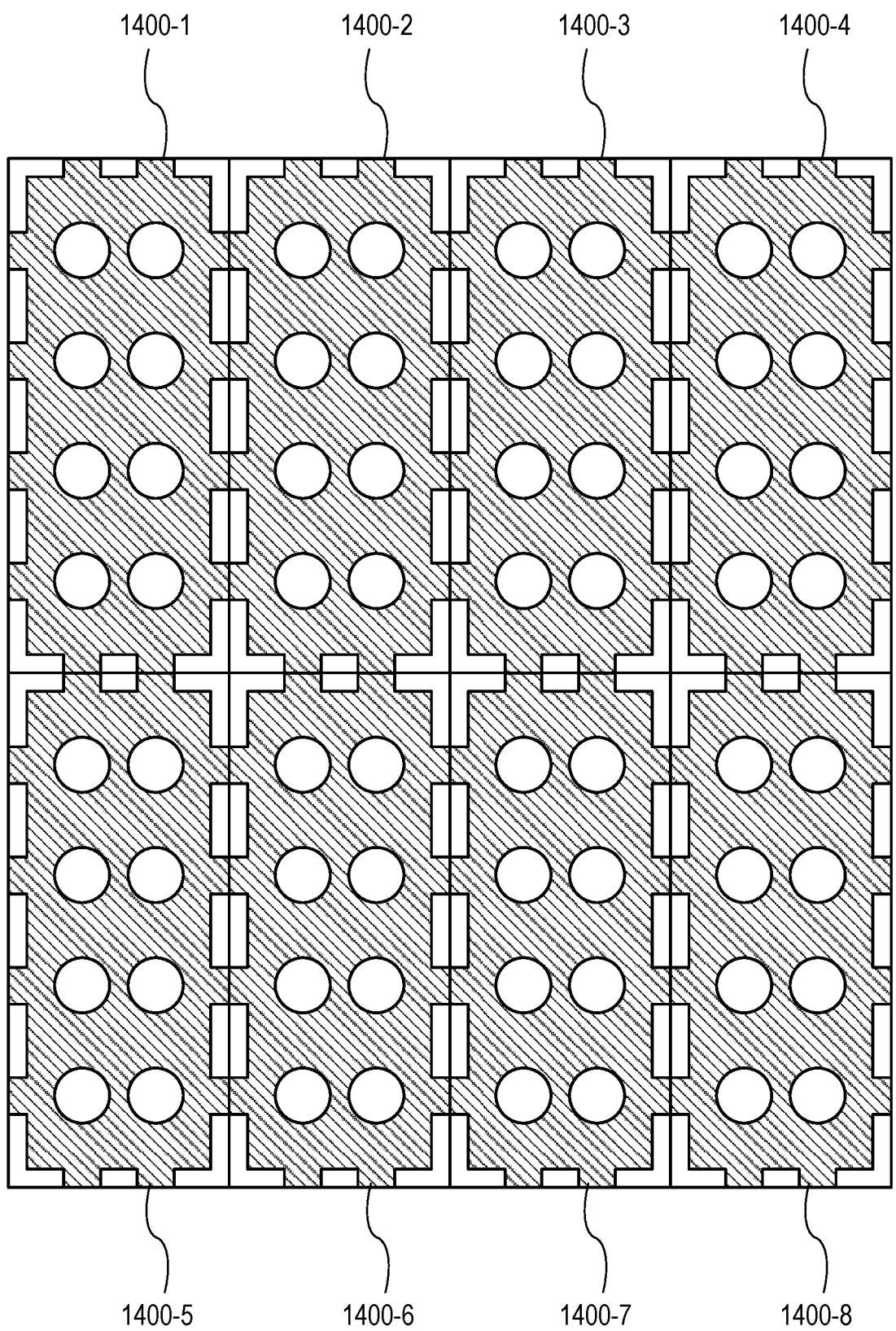
FIG. 10C is a top-down view of exemplary array slides in accordance with some embodiments.

FIG. 10C is a top-down view of exemplary array slides (1400-1 through 1400-8) in accordance with some embodiments. The array slides (1400-1 through 1400-8) shown in FIG. 10C can be formed in a single molding process. For example, in some embodiments, instead of placing a single first structure in a molding cavity as illustrated in FIGS. 9A-9D, an array of first structures is placed in a molding cavity, and the molding steps (e.g., filling the cavity with heated plastic material and cooling the plastic material to form second structures). After the array of array slides (1400-1 through 1400-8) is formed, the array slides may be separated (e.g., by cutting the array along boundary lines between array slides).

Figure 11A:
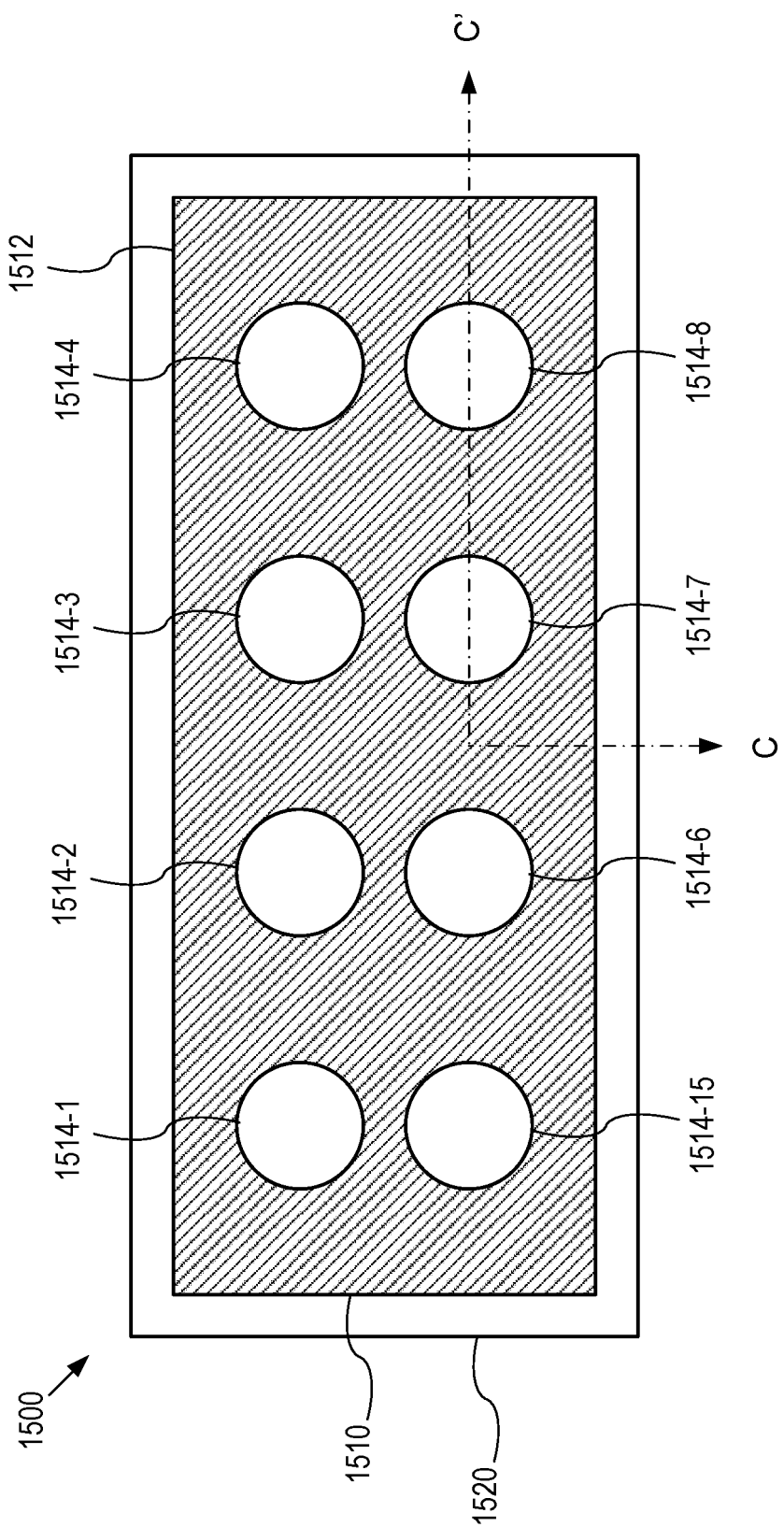
FIG. 11A is a top-down view of an exemplary array slide in accordance with some embodiments.

FIG. 11A is a top-down view of an exemplary array slide 1500 in accordance with some embodiments. The array slide 1500 has one or more characteristics of the array slides 1200 and 1400 described above with respect to FIGS. 8A-8C and FIGS. 10A-10C. The descriptions of such characteristics are not repeated for brevity.

The array slide 1500 has a first structure 1510 and a second structure 1520. The first structure 1510 includes a sheet layer 1512 and one or more connectors (not shown). The sheet layer 1512 defines a plurality of discrete through-holes (1514-1 through 1514-8).

FIG. 11A also indicates a line C-C' across the array slide 1500. The line C-C' corresponds to the cross-sectional view illustrated in FIG. 11B.

Figure 11B:
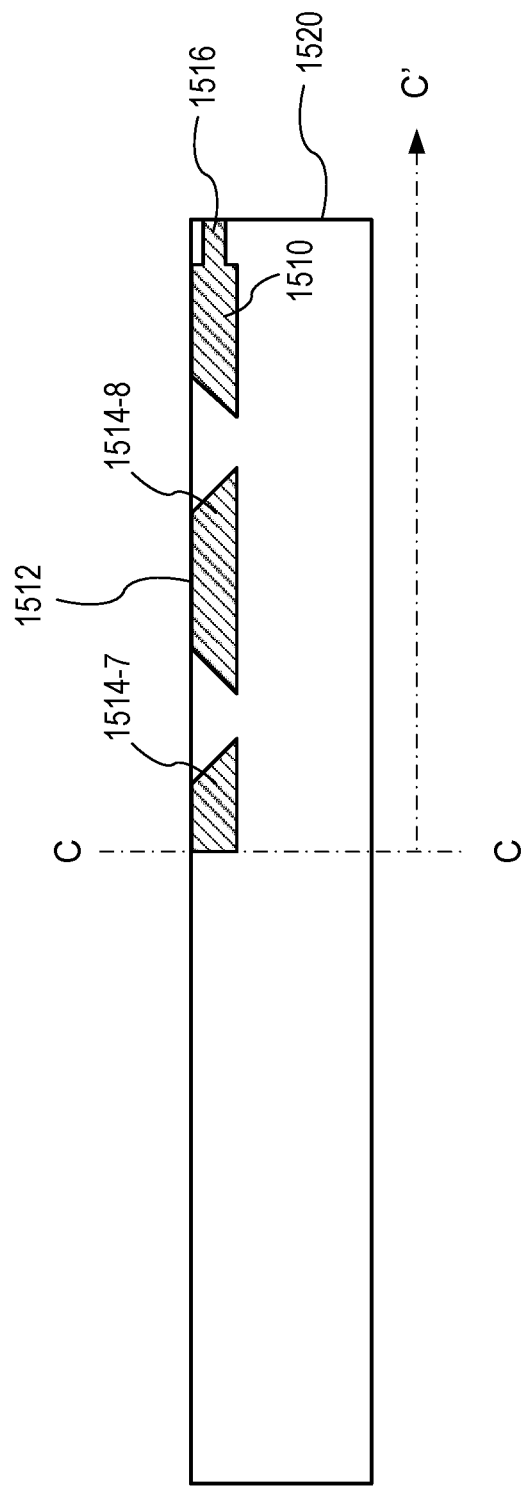
FIG. 11B is a partial cross-sectional view of an exemplary array slide in accordance with some embodiments.
Figure 12B:
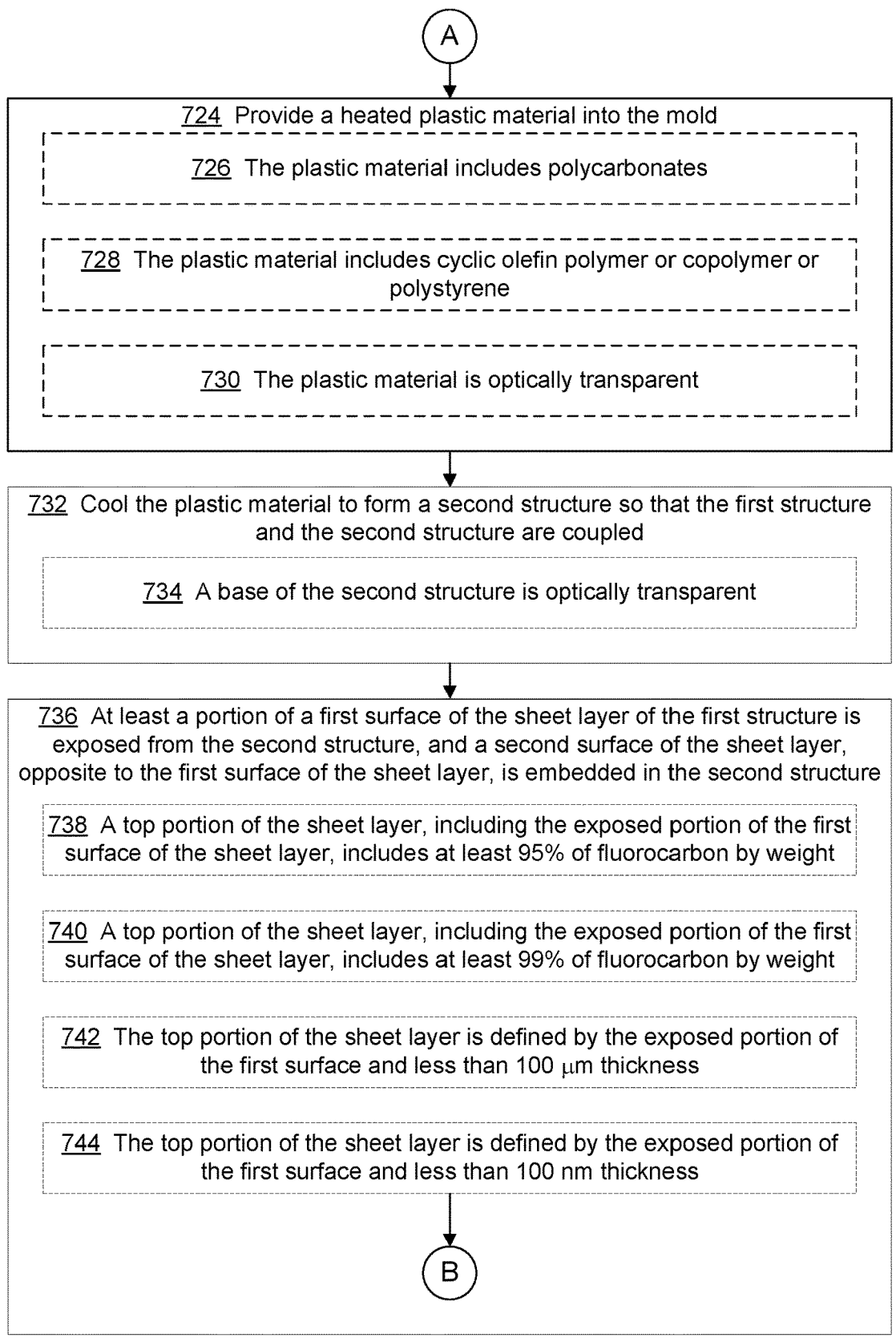

FIG. 11B is a partial cross-sectional view of the exemplary array slide 1500 in accordance with some embodiments. The partial cross-sectional view shown in FIG. 11B has one or more characteristics of the partial cross-sectional view shown in FIG. 11B. The descriptions of such characteristics are not repeated for brevity.

The first structure 1510 includes one or more connectors 1516. In FIG. 11B, at least one of the connectors 1416 is positioned so that its top surface is positioned below the top surface of the second structure 1520 (e.g., the top surface of the connectors 1416 is embedded in the second structure 1520). This reduces the peeling (i.e., separation) of the first structure 1510 from the second structure 1520.

FIG. 11B also illustrates that one or more sides of the first structure 1510 are angled. For example, the sides of the through-holes 1514-7 and 1514-8 are angled. As shown in FIG. 11B, a cross-sectional view of the sheet layer 1512 includes a trapezoidal shape. As a result, the top surface of the sheet layer 1512 has a smaller area than the bottom surface of the sheet layer 1512. This further reduces the peeling (i.e., separation) of the first structure 1510 from the second structure 1520.

Although FIG. 11B illustrates the angled sides of the first structure 1510 have having straight lines, in some embodiments, the sides of the first structure 1510 have curves (e.g., concave or convex).

Although FIGS. 11A-11B illustrate embodiments that implement both the connectors and the angled sides, it is possible to implement only one of two features. For example, as illustrated in FIGS. 10A-10C, the connectors may be implemented without the implementing angled sides. Alternatively, the angled sides may be implemented without implementing the connectors.

FIGS. 12A-12D are flow charts representing a method 700 of making an array slide in accordance with some embodiments.

The method includes (702) providing a first structure in a mold (e.g., FIG. 9A). The first structure includes a sheet layer with a plurality of discrete through-holes (e.g., FIG. 8C).

In some embodiments, the sheet layer includes (704) at least 50% of fluorocarbon by weight. In some embodiments, the sheet layer includes (706) at least 90% of fluorocarbon by weight. In some embodiments, the sheet layer includes (708) at least 95% of fluorocarbon by weight. In some embodiments, the sheet layer includes (710) at least 99% of fluorocarbon by weight.

In some embodiments, the sheet layer includes (712) at least 90% of polytetrafluoroethylene by weight. In some embodiments, the sheet layer includes (714) at least 95% of polytetrafluoroethylene by weight. In some embodiments, the sheet layer includes (716) at least 99% of polytetrafluoroethylene by weight.

In some embodiments, the method includes (718) pressing the first structure against a first surface of a mold prior to providing the heated plastic material (e.g., FIGS. 9A-9B).

In some embodiments, pressing the first structure against the first surface of the mold includes (720) pressing the first surface of the sheet layer against the first surface of the mold with a plurality of pins at least on the second surface of the sheet layer (e.g., FIG. 9B).

In some embodiments, the method includes (722) providing vacuum suction on the first surface of the sheet layer (e.g., FIG. 9A).

The method includes (724) providing a heated plastic material into the mold (e.g., FIG. 9C).

In some embodiments, the plastic material includes (726) polycarbonates.

In some embodiments, the plastic material includes (728) cyclic olefin polymer or copolymer or polystyrene.

In some embodiments, the plastic material is (730) optically transparent. In some embodiments, the plastic material is optically transparent for a wavelength range selected from the group consisting of: 250-900 nm, 35-850 nm, 400-800 m, 450-800 nm, and 500-800 nm.

The method includes (732) cooling the plastic material to form a second structure so that the first structure and the second structure are coupled (e.g., FIGS. 9C-9D).

In some embodiments, a base of the second structure is (734) optically transparent. A base of the second structure includes one or more portions of the second structure located below the plurality of discrete through-holes defined by the first structure. In some embodiments, the base is optically transparent for a wavelength range selected from the group consisting of: 250-900 nm, 35-850 nm, 400-800 m, 450-800 nm, and 500-800 nm.

At least a portion of a first surface of the sheet layer of the first structure is exposed (736) from the second structure, and a second surface of the sheet layer, opposite to the first surface of the sheet layer, is embedded in the second structure (e.g., FIGS. 8B, 10B, and 11B).

In some embodiments, a top portion of the sheet layer, including the exposed portion of the first surface of the sheet layer, includes (738) at least 95% of fluorocarbon by weight. In some embodiments, a top portion of the sheet layer, including the exposed portion of the first surface of the sheet layer, includes (740) at least 99% of fluorocarbon by weight.

In some embodiments, the top portion of the sheet layer is defined (742) by the exposed portion of the first surface and less than 1 µm thickness.

In some embodiments, the top portion of the sheet layer is defined (744) by the exposed portion of the first surface and less than 100 nm thickness.

In some embodiments, at least 90% of the exposed portion of the first surface is covered (746) by fluorocarbon. In some embodiments, at least 95% of the exposed portion of the first surface is covered (748) by fluorocarbon. In some embodiments, at least 99% of the exposed portion of the first surface is covered (750) by fluorocarbon.

In some embodiments, at least 90% of the exposed portion of the first surface is covered (752) by polytetrafluoroethylene. In some embodiments, at least 95% of the exposed portion of the first surface is covered (754) by polytetrafluoroethylene. In some embodiments, at least 99% of the exposed portion of the first surface is covered (756) by polytetrafluoroethylene.

In some embodiments, the exposed portion of the first surface is characterized (758) by advancing and receding contact angles, for a liquid selected from a group including water, ethanol, and isopropanol, that are similar to advancing and receding contact angles, for the selected liquid, on polytetrafluoroethylene.

In some embodiments, the second structure includes (760) a plurality of holding locations. The method includes aligning the first structure and the second structure so that the plurality of discrete through-holes defined in the sheet layer of the first structure is offset from the plurality of holding locations in the second structure.

In some embodiments, the mold is configured (762) so that a top surface of the sheet layer of the first structure is aligned with a top surface of a base layer of the second structure (e.g., FIG. 5A).

In some embodiments, the mold is configured (764) so that a top surface of the sheet layer of the first structure is above a top surface of a base layer of the second structure (e.g., FIG. 5C). In some embodiments, the mold is configured (766) so that a top surface of the sheet layer of the first structure is below a top surface of a base layer of the second structure (e.g., FIG. 5B). In some embodiments, the first surface of the mold has (768) one or more of: a plurality of indentations and a plurality of protrusions, corresponding to the plurality of discrete through-holes defined in the sheet layer.

In some embodiments, at least a portion of the first surface of the sheet layer is embedded (770) in the second structure. For example, the second structure covers along a periphery of discrete through-holes defined by the sheet layer over the first surface of the sheet layer. In some embodiments, a plurality of portions of the first surface of the sheet layer is embedded in the second structure.

In some embodiments, the first structure includes (772) one or more connectors coupled to one or more sides of the sheet layer (e.g., FIGS. 10A-10C and FIG. 11B). In some embodiments, the one or more connectors are embedded (774) in the second structure (e.g., FIG. 11B).

In some embodiments, at least a portion of the sides of the sheet layer is angled (776) (e.g., FIG. 11B). In some embodiments, the sides, other than the inner walls of the discrete through-holes, of the sheet layer are angled. In some embodiments, an inner wall of at least one discrete through-hole of the sheet layer is angled (778) (e.g., FIG. 11B).

In some embodiments, the second surface of the sheet layer has a larger area than the first surface of the sheet layer (780) (e.g., FIG. 11B)

In some embodiments, the method includes (782) coating a portion of the second structure with oil. In some embodiments, the method includes coating (784) a portion of the first surface of the sheet layer of the first structure with the oil. In some embodiments, the oil is selected (786) from the group consisting of a mineral oil, a silicone oil, a hydrocarbon compound, a hydroperfluorocarbon compound and a perfluorocarbon compound.

Methods for Using the Array Slides

In some embodiments, a method for using an array slide includes providing the array slide, and providing one or more biological and/or chemical samples for processing.

In some embodiments, a method for using an array slide includes placing the array slide in a reservoir. The method includes storing a liquid medium in the reservoir of the apparatus so that the first surface of the sheet layer is covered by the liquid medium, and dispensing respective liquid droplets on respective locations on the base layer. The respective locations correspond to locations of the plurality of discrete through-holes defined in the sheet layer, and the respective liquid droplets are immiscible with the liquid medium.

In some embodiments, a method includes processing a cell by placing a plurality of droplets on respective regions of the second structure that are not covered by the first structure. Respective droplets include cells for processing. The method also includes adding one or more biological and/or chemical reagents to the respective droplets.

Various aspects and characteristics of the methods of using the array plates described above are applicable to array slides (e.g., adding one or more solutions to one or more liquid droplets of the respective liquid droplets, performing an immunoassay, and washing a respective liquid droplets), and vice versa. Because these aspects and characteristics are described above, they are not repeated herein.

It is well known to a person having ordinary skill in the art that array slides and plates can be used in many other biological and chemical reactions. Therefore, such details and specific examples are omitted for brevity.

The foregoing description, for purpose of explanation, has been described with reference to specific embodiments.

However, the illustrative discussions above are not intended to be exhaustive or to limit the embodiments to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

For example, in accordance with some embodiments, a device includes a first structure including a sheet layer with a plurality of discrete through-holes; and a second structure coupled to the first structure. The second structure includes a hydrophilic material. At least a portion of a first surface of the sheet layer of the first structure is exposed from the second structure. A top portion of the sheet layer, including the exposed portion of the first surface of the sheet layer, includes fluorocarbon. A second surface of the sheet layer, opposite to the first surface of the sheet layer, is embedded in the second structure. The second structure extends at least partially into the plurality of discrete through-holes of the first structure.

In accordance with some embodiments, a method includes providing a first structure in a mold, the first structure including a sheet layer with a plurality of discrete through-holes. The method also includes providing a heated plastic material into the mold, and cooling the plastic material to form a second structure so that the first structure and the second structure are coupled. At least a portion of a first surface of the sheet layer of the first structure is exposed from the second structure. A top portion of the sheet layer, including the exposed portion of the first surface of the sheet layer, includes fluorocarbon. The second structure includes a material of a higher surface tension than the top of the sheet layer (e.g., a hydrophilic material). A second surface of the sheet layer, opposite to the first surface of the sheet layer, is embedded in the second structure. The second structure extends at least partially into the plurality of discrete through-holes of the first structure.

What is claimed is:

1. A device, comprising:
   a first structure including a sheet layer with a plurality of discrete through-holes, wherein the sheet layer has a first surface and a second surface that is opposite to the first surface; and
   a second structure coupled to the first structure, wherein:
      the second surface of the sheet layer is embedded in the second structure;
      a top portion of the sheet layer, including a portion of the first surface of the sheet layer, includes fluorocarbon;
      the second structure includes a material of a higher surface energy and a lower glass transition temperature than the top portion of the sheet layer;
      the second structure extends at least partially into the plurality of discrete through-holes of the first structure;
      the second structure includes a base layer and a plurality of protrusions that is integrated with, and extends from, the base layer;
      each of the base layer and the plurality of protrusions of the second structure includes the material of the higher surface energy and the lower glass transition temperature than the top portion of the sheet layer; and
      the plurality of protrusions of the second structure mates with the plurality of discrete through-holes of the first structure so that a respective protrusion of the plurality of protrusions extends at least partially into a corresponding discrete through-hole of the plurality of discrete through-holes of the first structure,
   wherein the respective protrusion has a length that matches a depth of the corresponding discrete through-hole.

2. The device of claim 1, wherein the top portion of the sheet layer includes at least 95% of fluorocarbon by weight.

3. The device of claim 1, wherein the top portion of the sheet layer has a thickness less than 1 µm.

4. The device of claim 1, wherein at least 90% of the top portion of the first surface is covered by fluorocarbon.

5. The device of claim 1, wherein the sheet layer includes at least 90% of polytetrafluoroethylene by weight.

6. The device of claim 1, wherein the second structure includes cyclic olefin polymer or copolymer or polystyrene.

7. The device of claim 1, wherein at least a portion of the first surface of the sheet layer is embedded in the second structure.

8. The device of claim 1, wherein:
   the second structure has a first surface adjacent to the first structure; and
   the first surface of the second structure has one or more indentations and one or more protrusions in regions corresponding to the plurality of discrete through-holes defined in the sheet layer when the second structure is coupled to the first structure.

9. A device, comprising:
   a first structure including a sheet layer with a plurality of discrete through-holes, wherein the sheet layer has a first surface and a second surface that is opposite to the first surface; and
   a second structure coupled to the first structure, wherein:
      the second surface of the sheet layer is embedded in the second structure;
      a top portion of the sheet layer, including a portion of the first surface of the sheet layer, includes fluorocarbon;
      the second structure includes a material of a higher surface energy and a lower glass transition temperature than the top portion of the sheet layer;
      the second structure extends at least partially into the plurality of discrete through-holes of the first structure;
      the second structure includes a base layer and a plurality of protrusions that is integrated with, and extends from, the base layer;
      each of the base layer and the plurality of protrusions of the second structure includes the material of the higher surface energy and the lower glass transition temperature than the top portion of the sheet layer; and
      the plurality of protrusions of the second structure mates with the plurality of discrete through-holes of the first structure so that a respective protrusion of the plurality of protrusions extends at least partially into a corresponding discrete through-hole of the plurality of discrete through-holes of the first structure,
   wherein the respective protrusion has a length that is less than a depth of the corresponding discrete through-hole.

10. The device of claim 9, wherein the top portion of the sheet layer includes at least 99% of fluorocarbon by weight.

11. The device of claim 9, wherein the top portion of the sheet layer has a thickness less than 100 nm.

12. The device of claim 9, wherein at least 90% of the top portion of the first surface is covered by polytetrafluoroethylene.

13. The device of claim 9, wherein the second structure includes polycarbonates.

14. The device of claim 9, wherein:
the second structure has a first surface and a second surface that is opposite to the first surface of the second structure;
the first surface of the second structure is adjacent to the first structure; and
the first surface of the second structure has the plurality of protrusions.

15. The device of claim 9, wherein the second structure includes one or more vertical structures along a periphery of the base layer, adjacent to a first surface of the base layer.

16. The device of claim 15, wherein the one or more vertical structures, the base layer, and the first structure define a reservoir.

17. The device of claim 9, wherein the base layer and the plurality of protrusions of the second structure are filled with the material of the higher surface energy and the lower glass transition temperature than the top portion of the sheet layer.

18. The device of claim 9, wherein:
the second structure has a first surface adjacent to the first structure; and
the first surface of the second structure has one or more indentations and one or more protrusions in regions corresponding to the plurality of discrete through-holes defined in the sheet layer when the second structure is coupled to the first structure.

19. A device, comprising:
a first structure including a sheet layer with a plurality of discrete through-holes, wherein the sheet layer has a first surface and a second surface that is opposite to the first surface; and
a second structure coupled to the first structure, wherein:
the second surface of the sheet layer is embedded in the second structure;
a top portion of the sheet layer, including a portion of the first surface of the sheet layer, includes fluorocarbon;
the second structure includes a material of a higher surface energy and a lower glass transition temperature than the top portion of the sheet layer;
the second structure extends at least partially into the plurality of discrete through-holes of the first structure;
the second structure includes a base layer and a plurality of protrusions that is integrated with, and extends from, the base layer;
each of the base layer and the plurality of protrusions of the second structure includes the material of the higher surface energy and the lower glass transition temperature than the top portion of the sheet layer; and
the plurality of protrusions of the second structure mates with the plurality of discrete through-holes of the first structure so that a respective protrusion of the plurality of protrusions extends at least partially into a corresponding discrete through-hole of the plurality of discrete through-holes of the first structure,
wherein the respective protrusion has a length that is greater than a depth of the corresponding discrete through-hole.

20. The device of claim 19, wherein:
the second structure has a first surface adjacent to the first structure; and
the first surface of the second structure has one or more indentations and one or more protrusions in regions corresponding to the plurality of discrete through-holes defined in the sheet layer when the second structure is coupled to the first structure.

* * * * *